United States Patent
Wang et al.

(10) Patent No.: US 12,407,847 B2
(45) Date of Patent: Sep. 2, 2025

(54) COEFFICIENT CODING METHOD, ENCODER, AND DECODER

(71) Applicant: GUANGDONG OPPO MOBILE TELECOMMUNICATIONS CORP., LTD., Guangdong (CN)

(72) Inventors: Fan Wang, Dongguan (CN); Zhihuang Xie, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/421,530

(22) Filed: Jan. 24, 2024

(65) Prior Publication Data

US 2024/0187628 A1 Jun. 6, 2024

Related U.S. Application Data

(63) Continuation of application No. 18/473,645, filed on Sep. 25, 2023, now Pat. No. 11,924,455, which is a (Continued)

(51) Int. Cl.
*H04N 19/46* (2014.01)
*H04N 19/176* (2014.01)

(52) U.S. Cl.
CPC .......... *H04N 19/46* (2014.11); *H04N 19/176* (2014.11)

(58) Field of Classification Search
CPC .... H04N 19/46; H04N 19/176; H04N 19/132; H04N 19/129; H04N 19/18; H04N 19/70; (Continued)

(56) References Cited

U.S. PATENT DOCUMENTS 9,565,435 B2   2/2017 Fang et al.
9,794,591 B2  10/2017 Strum et al.
(Continued)

FOREIGN PATENT DOCUMENTS

CN   102752592 A  10/2012
CN   104469378 A   3/2015
(Continued)

OTHER PUBLICATIONS

Office action issued in corresponding RU application No. 2024100542 dated Oct. 3, 2024. 18 pages. (with English translation).
(Continued)

*Primary Examiner* — Francis Geroleo
(74) *Attorney, Agent, or Firm* — PERKINS COIE LLP

(57) ABSTRACT

Embodiments of the present disclosure provide a coefficient coding method, an encoder, and a decoder. The method includes the following. A bitstream is parsed to obtain a video flag. When the video flag indicates that a video satisfies a preset condition, the bitstream is parsed to obtain a last-significant-coefficient position-reverse flag and coordinate information of a last significant coefficient. When the last-significant-coefficient position-reverse flag indicates that a position of the last significant coefficient is reversed for a current block, the position of the last significant coefficient is determined by calculation with the coordinate information of the last significant coefficient. According to a preset scanning order, all coefficients before the position of the last significant coefficient are decoded to determine coefficients of the current block.

17 Claims, 11 Drawing Sheets

Related U.S. Application Data continuation of application No. PCT/CN2021/086710, filed on Apr. 12, 2021.

(58) Field of Classification Search
CPC ........ H04N 19/91; H04N 19/13; H04N 19/42; H04N 19/146
See application file for complete search history.

(56) References Cited

U.S. PATENT DOCUMENTS

| | | | |
|---|---|---|---|
| 10,405,000 | B2 | 9/2019 | Kao et al. |
| 10,523,968 | B2 | 12/2019 | He |
| 2015/0078432 | A1 | 3/2015 | Wang et al. |
| 2015/0358621 | A1 | 12/2015 | He et al. |
| 2020/0396486 | A1 | 12/2020 | He |
| 2020/0396488 | A1 | 12/2020 | Koo et al. |
| 2022/0201335 | A1* | 6/2022 | Chiang ................ H04N 19/159 |
| 2023/0026492 | A1 | 1/2023 | Ikai et al. |
| 2023/0239504 | A1* | 7/2023 | Zhou ....................... H04N 19/70 375/240.18 |
| 2023/0291906 | A1* | 9/2023 | Jhu ........................ H04N 19/91 375/240.03 |
| 2023/0291936 | A1* | 9/2023 | Jhu ...................... H04N 19/174 375/240.26 |
| 2024/0031604 | A1 | 1/2024 | Yoo et al. |

FOREIGN PATENT DOCUMENTS

| | | |
|---|---|---|
| CN | 107211146 A | 9/2017 |
| CN | 104093020 B | 11/2017 |
| CN | 108353179 A | 7/2018 |
| CN | 112543338 A | 3/2021 |
| JP | 2013545415 A | 12/2013 |
| RU | 2609750 C1 | 2/2017 |
| RU | 2714108 C1 | 2/2020 |
| WO | 2018011295 A1 | 1/2018 |
| WO | 2018173862 A1 | 9/2018 |

OTHER PUBLICATIONS

Substantive examination result issued in corresponding AE application No. P6002573/2023 dated Jan. 29, 2025. 5 pages.

Versatile video coding, H.266 (Aug. 2020), ITU-T, international telecommunication union, dated Aug. 29, 2020. 513 pages.

Fan Wang et al. "AHG8: on coding of last significant coefficient position for high bit depth and high bit rate extensions", OPPO, Document: JVET-V0121-v1, Joint Video Experts Team (JVET) of ITU-T SG 16 WP 3 and ISO/IEC JTC 1/SC 29 22nd Meeting, by teleconference, Apr. 20-28, 2021. 4 pages.

Extended European search report issued in corresponding European application No. 21936337.1 dated Jan. 30, 2025. 16 pages.

Fan Wang et al. "CE-1.1: coding of last significant coefficient position for high bit depth and high bit rate extensions", OPPO, Document: JVET-W0046, Joint Video Experts Team (JVET) of ITU-T SG 16 WP 3 and ISO/IEC JTC 1/SC 29 23rd Meeting, by teleconference, Jul. 7-16, 2021. 7 pages.

Notice of allowance issued in corresponding U.S. Appl. No. 18/513,932 dated Jun. 13, 2024. 26 pages.

Non Final Rejection issued in corresponding U.S. Appl. No. 18/513,932 dated Feb. 15, 2024. 21 pages.

Office action issued in corresponding RU application No. 2023128759 dated Jun. 14, 2024. 12 pages. (with English translation).

WIPO, International Search Report and Written Opinion for International Application No. PCT/CN2021/103250, Mar. 17, 2022. 16 pages (with English translation).

The first office action issued in corresponding CN application No. 202311525745.5 dated May 15, 2025. 24 pages. (with English translation).

Notice of Reasons for Refusal issued in corresponding JP application No. 2023572244 dated May 9, 2025. 12 pages (with English translation).

Extended European search report issued in corresponding European application No 21947474.9 dated Apr. 7, 2025. 9 pages.

The first office action issued in corresponding CN application No. 202410395839.3 dated May 23, 2025. 19 pages. (with English translation).

* cited by examiner

COEFFICIENT CODING METHOD, ENCODER, AND DECODER

CROSS-REFERENCE TO RELATED APPLICATION(S)

This application is a continuation of U.S. Non-provisional application patent Ser. No. 18/473,645, filed Sep. 25, 2023, which is a continuation of International Application No. PCT/CN2021/086710, filed Apr. 12, 2021, the entire disclosure of which is hereby incorporated by reference.

TECHNICAL FIELD

Embodiments of the present disclosure relate to the field of video coding technology, and in particular to a coefficient coding method, an encoder, and a decoder.

BACKGROUND

Computer vision-related fields have received more and more attention as people demand for a higher quality of video display. In recent years, picture processing technology has successful applications in all walks of life. In a coding process of a video picture, at an encoding side, picture data to-be-encoded is transformed and quantized and then is subjected to compression encoding by an entropy coding unit, and a bitstream generated from the entropy encoding will be transmitted to a decoding side. At the decoding side, the bitstream is parsed and then inverse quantization and inverse transformation is performed, so that the original input picture data may be recovered.

At present, compared with video coding with low bit depth, low quality, and low bitrate (referred to as "conventional video"), video coding with high bit depth, high quality, and high bitrate (referred to as "triple-high video") usually needs to code more and larger coefficients. In this case, using existing related solutions for the triple-high video may cause greater overhead and wastes and even affect the speed and throughput of coding.

SUMMARY

In a first aspect, a coefficient decoding method is provided in embodiments of the disclosure, which is applied to a decoder and includes the following. A bitstream is parsed to obtain a video flag. When the video flag indicates that a video satisfies a preset condition, the bitstream is parsed to obtain a last-significant-coefficient position-reverse flag. The bitstream is parsed to obtain prefix information of a horizontal coordinate of a last significant coefficient, prefix information of a vertical coordinate of the last significant coefficient, suffix information of the horizontal coordinate of the last significant coefficient, and suffix information of the vertical coordinate of the last significant coefficient. The horizontal coordinate of the last significant coefficient is determined according to the prefix information of the horizontal coordinate of the last significant coefficient and the suffix information of the horizontal coordinate of the last significant coefficient. The vertical coordinate of the last significant coefficient is determined according to the prefix information of the vertical coordinate of the last significant coefficient and the suffix information of the vertical coordinate of the last significant coefficient. Coordinate information of the last significant coefficient is determined according to the horizontal coordinate of the last significant coefficient and the vertical coordinate of the last significant coefficient. When the last-significant-coefficient position-reverse flag indicates that a position of the last significant coefficient is reversed for a current block, the position of the last significant coefficient is determined by calculation with the coordinate information of the last significant coefficient. According to a preset scanning order, all coefficients before the position of the last significant coefficient are decoded to determine coefficients of the current block.

In a second aspect, a coefficient encoding method is provided in embodiments of the disclosure, which is applied to an encoder and includes the following. A video flag and a position of a last significant coefficient are determined. When the video flag indicates that a video satisfies a preset condition, a last-significant-coefficient position-reverse flag is determined. Coordinate information of the last significant coefficient is determined according to the position of the last significant coefficient and the last-significant-coefficient position-reverse flag. Prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient are determined according to the coordinate information of the last significant coefficient. All coefficients before the position of the last significant coefficient are encoded according to a preset scanning order, and bit information obtained by the encoding, the video flag, the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient are signalled into a bitstream.

In a third aspect, an encoder is provided in embodiments of the present disclosure. The encoder includes a memory and a processor. The memory is configured to store a computer program executable on the processor. The processor is configured to perform the method of the second aspect when executing the computer program.

In a fourth aspect, a decoder is provided in embodiments of the present disclosure. The decoder includes a memory and a processor. The memory is configured to store a computer program executable on the processor. The processor is configured to perform the method of the first aspect when executing the computer program.

DETAILED DESCRIPTION

In order to be able to understand the features and technical contents of the embodiments of the present disclosure in more detail, the following is a detailed description of the embodiments of the present disclosure in conjunction with the accompanying drawings. The accompanying drawings are attached for illustrative purposes only and are not intended to limit the embodiments of the present disclosure.

Unless otherwise defined, all technical and scientific terms used herein have the same meaning as commonly understood by those skilled in the art. The terms used herein are for the purpose of describing embodiments of the present disclosure only and are not intended to limit the disclosure.

In the following description, "some embodiments" referred to herein describe a subset of all possible embodiments. It should be understood that "some embodiments" may be a same subset or a different subset of all possible embodiments, and may be combined with each other in case of no conflict. It is also necessary to point out that, the terms "first/second/third" in the embodiments of the present disclosure are only used to distinguish similar objects and do not represent a specific order for the objects. It should be understood that "first/second/third" may be interchanged in a particular order when permitted, and therefore the embodiments of the present disclosure described herein may be implemented in an order other than that illustrated or described herein.

In a video picture, a first colour component, a second colour component, and a third colour component are generally used to characterize a coding block (CB). The three colour components are a luminance component, a blue chrominance component, and a red chrominance component, respectively. Specifically, the luminance component is usually represented by symbol Y, the blue chrominance component is usually represented by symbol Cb or U, and the red chrominance component is usually represented by symbol Cr or V. In this case, the video picture can be represented in YCbCr format or in YUV format.

Before the embodiments of the present disclosure are described in further detail, the terms and terminology involved in the embodiments of the present disclosure are explained, and the terms and terminology involved in the embodiments of the present disclosure are applicable to the following explanations:

moving picture experts group (MPEG)
international standardization organization (ISO)
international electrotechnical commission (IEC)
joint video experts team (JVET)
alliance for open media (AOM)
next generation video coding standard H.266/versatile video coding (VVC)
VVC reference software test platform (VVC Test Model, VTM)
audio video standard (AVS)
high-performance model (HPM) for AVS
context-based adaptive binary arithmetic coding (CABAC)
regular residual coding (RRC)
transform skip residual coding (TSRC)

Figure 1:
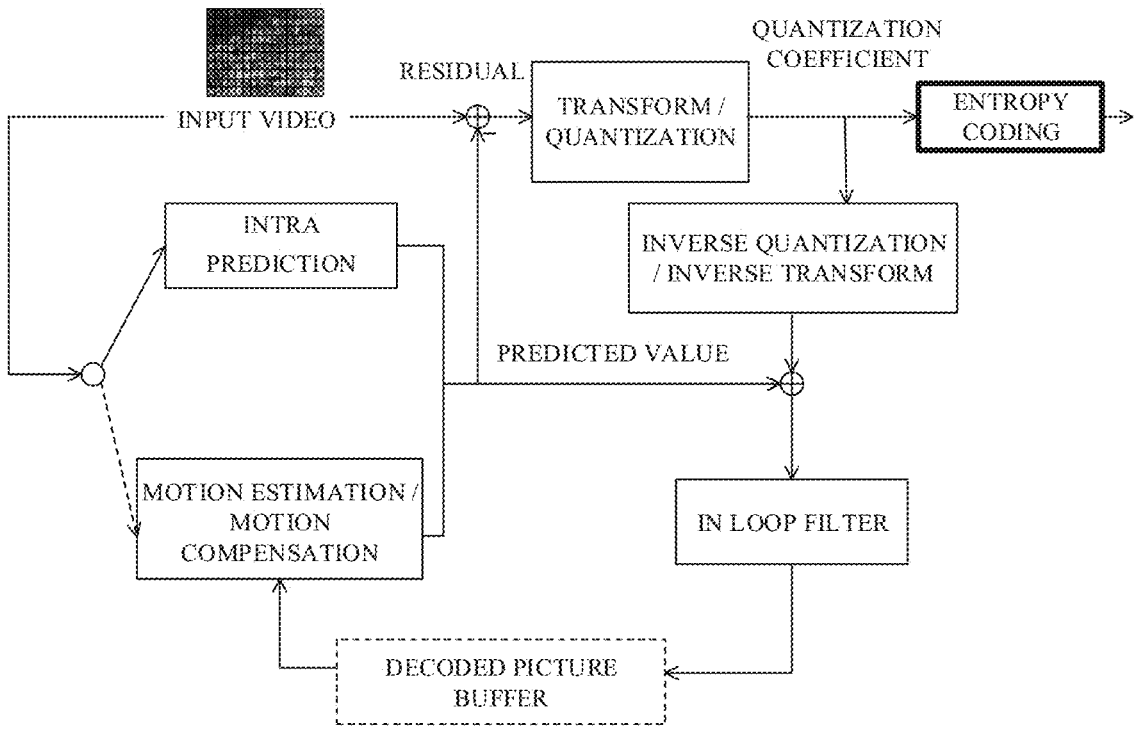
FIG. 1 is a schematic application diagram of a coding framework provided in the related art.

It can be understood that currently universal video coding standards (such as VVC) generally use block-based hybrid coding frameworks. Each picture of a video is partitioned into largest coding units (LCUs), which are squares of equal size (e.g., 128×128, 64×64, etc.). Each LCU may also be partitioned into rectangular coding units (CUs) according to a certain rule. Furthermore, the CU may be partitioned into smaller prediction units (PUs) or transform units (TUs), etc. Specifically, as illustrated in FIG. 1, the hybrid coding framework may include modules for such as prediction, transform, quantization, entropy coding, and in-loop filter. The prediction module may include intra prediction and inter prediction, and the inter prediction may include motion estimation and motion compensation. Since there is strong correlation among neighbouring samples in a picture in a video, using intra prediction in video coding can eliminate spatial redundancy between neighbouring samples. Moreover, since there is also strong similarity between neighbouring pictures in the video, using inter prediction in video coding can eliminate temporal redundancy between neighbouring pictures. Thus coding efficiency can be improved.

The basic process of a video coder is as follows. In an encoder, a picture is partitioned into blocks. The intra prediction or the inter prediction is applied to the current block to generate a prediction block of the current block. The prediction block is subtracted from the original block of the current block to obtain a residual block. The residual block is then subjected to transformation and quantization to generate a quantization coefficient matrix. The quantization coefficient matrix is entropy-encoded and output to a bitstream. In a decoder, the intra prediction or the inter prediction is applied to the current block to generate the prediction block of the current block. In addition, the bitstream is decoded to obtain the quantization coefficient matrix. The quantization coefficient matrix is inverse-quantized and inverse-transformed to obtain the residual block, which is added to the prediction block to obtain a reconstructed block. The reconstructed blocks form a reconstructed picture. The reconstructed picture is in-loop filtered on a picture or block basis to obtain a decoded picture. The encoder also requires similar operations as the decoder to obtain the decoded picture. The decoded picture may be used as a reference picture in the inter prediction for subsequent pictures. Block partition information, and mode information or parameter information (such as for prediction, transform, quantization, entropy coding, and in-loop filter) determined by the encoder, are output to the bitstream if necessary. By parsing and analysing based on available information, the decoder determines the same block partition information, and mode information or parameter information (such as for prediction, transform, quantization, entropy coding, and in-loop filter) as those of the encoder, thereby ensuring that the decoded picture obtained by the encoder is the same as the decoded picture obtained by the decoder. The decoded picture obtained by the encoder is also typically called the reconstructed picture. The current block may be partitioned into PUs during prediction. The current block may be partitioned into TUs during transformation. The partition of the PUs and the partition of the TUs may be different. The above is the basic process of the video coder under the block-based hybrid coding framework. With the development of technology, some modules or operations of the framework or the process may be optimized. The embodiments of the present disclosure are applicable to the basic process of the video coder under the block-based hybrid coding framework, but is not limited to the framework and the process.

The current block may be a current CU, a current PU, a current TU, etc.

The block partition information, the mode information or parameter information for prediction, transformation, and quantization, coefficients and the like are signalled into the bitstream through entropy encoding. Assuming that probabilities of different elements are different, a shorter codeword is allocated to an element with a larger probability of occurrence, and a longer codeword is allocated to an element with a smaller probability of occurrence, so that higher coding efficiency than that of fixed-length coding can be obtained. However, if the probabilities of different elements are close or substantially the same, the entropy coding results in limited compression. CABAC is a common entropy coding method, which is used in both HEVC and VVC for entropy coding. The CABAC can improve compression efficiency by using a context model. However, using and updating the context model lead to more complex operations. The CABAC has a bypass mode, in which there is no need to use or update the context model, and thus higher throughput can be achieved. In embodiments of the present disclosure, a mode requiring using and updating the context model in the CABAC may be called a context mode.

Figure 2:
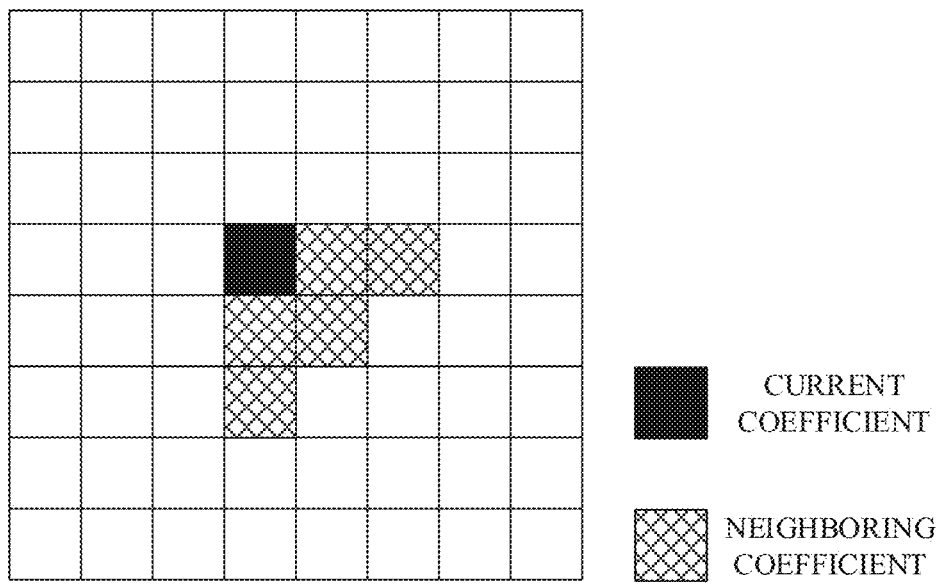
FIG. 2 is a schematic diagram illustrating position relationship among a current coefficient and neighboring coefficients provided in the related art.

Generally, the context model needs to be determined according to a specified method. When invoking a specified arithmetic decoding process for a binary decision, parameters of the context model may be used as inputs. There is also a dependency relationship among neighboring coefficients in selection of the context model. For example, FIG. 2 is a schematic diagram illustrating position relationship among a current coefficient and neighboring coefficients provided in the related art. In FIG. 2, a block in black indicates the current coefficient, and blocks with grid lines indicate the neighboring coefficients. As illustrated in FIG. 2, which context model is selected for sig_coeff_flag of the current coefficient needs to be determined according to information of five neighbouring coefficients to the right, lower, and lower right of the current coefficient. As can be seen from FIG. 2, operations for the context mode are more complex than operations for the bypass mode, and there is dependence between neighboring coefficients.

For an arithmetic coding engine of the CABAC, if the context mode is used, the specified arithmetic decoding process for a binary decision needs to be invoked, which includes a state transition process, namely the updating of the context model. During the arithmetic decoding process for a binary decision, a renormalization process of the arithmetic decoding engine is invoked. If the bypass mode is used, a bypass decoding process needs to be invoked.

The CABAC used in the VVC is introduced as an example as follows.

For the arithmetic coding engine of CABAC, inputs to the arithmetic decoding process are ctxTable, ctxIdx, bypassFlag, and state variables ivlCurrRange and ivlOffset of the arithmetic decoding engine, and an output of the arithmetic decoding process is a value of bin.

ctxTable is a table used in selection of the context mode. ctxIdx is an index of the context model.

Figure 3:
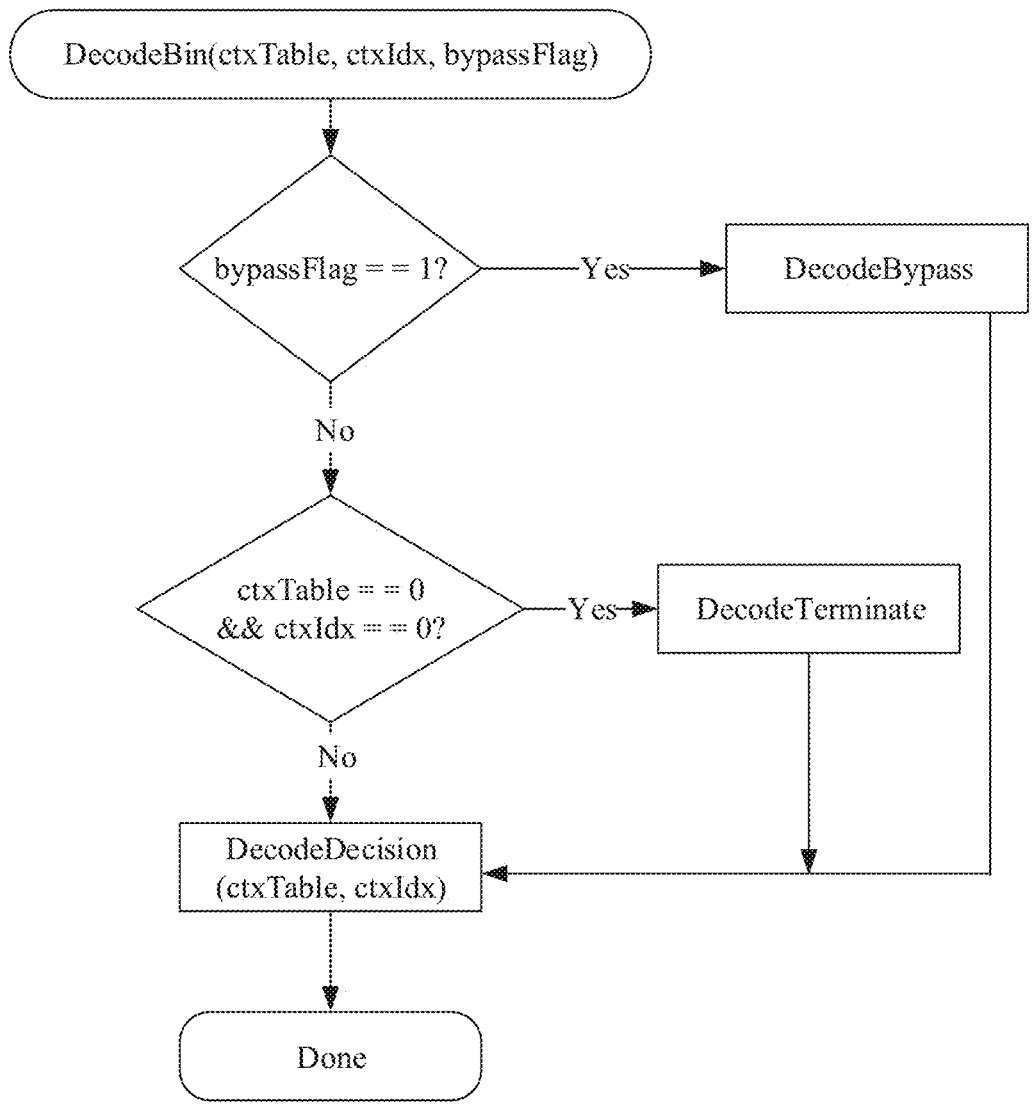
FIG. 3 is a schematic flowchart of an arithmetic decoding process for bin provided in the related art.

FIG. 3 is a schematic flowchart of an arithmetic decoding process for a bin provided in the related art. As illustrated in FIG. 3, in order to decode the value of a bin, the context index table ctxTable, ctxIdx, bypassFlag are passed as inputs to the arithmetic decoding process DecodeBin (ctxTable, ctxIdx, bypassFlag), which is specified as follows:

If bypassFlag is equal to 1, then a bypass decoding process DecodeBypass( ) is invoked.

Otherwise, if bypassFlag is equal to 0, ctxTable is equal to 0, and ctxIdx is equal to 0, then DecodeTerminate( ) is invoked.

Otherwise (bypassFlag is equal to 0 and ctxIdx is not equal to 0), a specified arithmetic decoding process for a binary decision DecodeDecision(ctxTable, ctxIdx) is invoked.

Further, inputs to the arithmetic decoding process for a binary decision are the variables ctxTable, ctxIdx, ivlCurrRange, and ivlOffset, and outputs of the arithmetic decoding process are a decoded value binVal and updated variables ivlCurrRange and ivlOffset.

Figure 4:
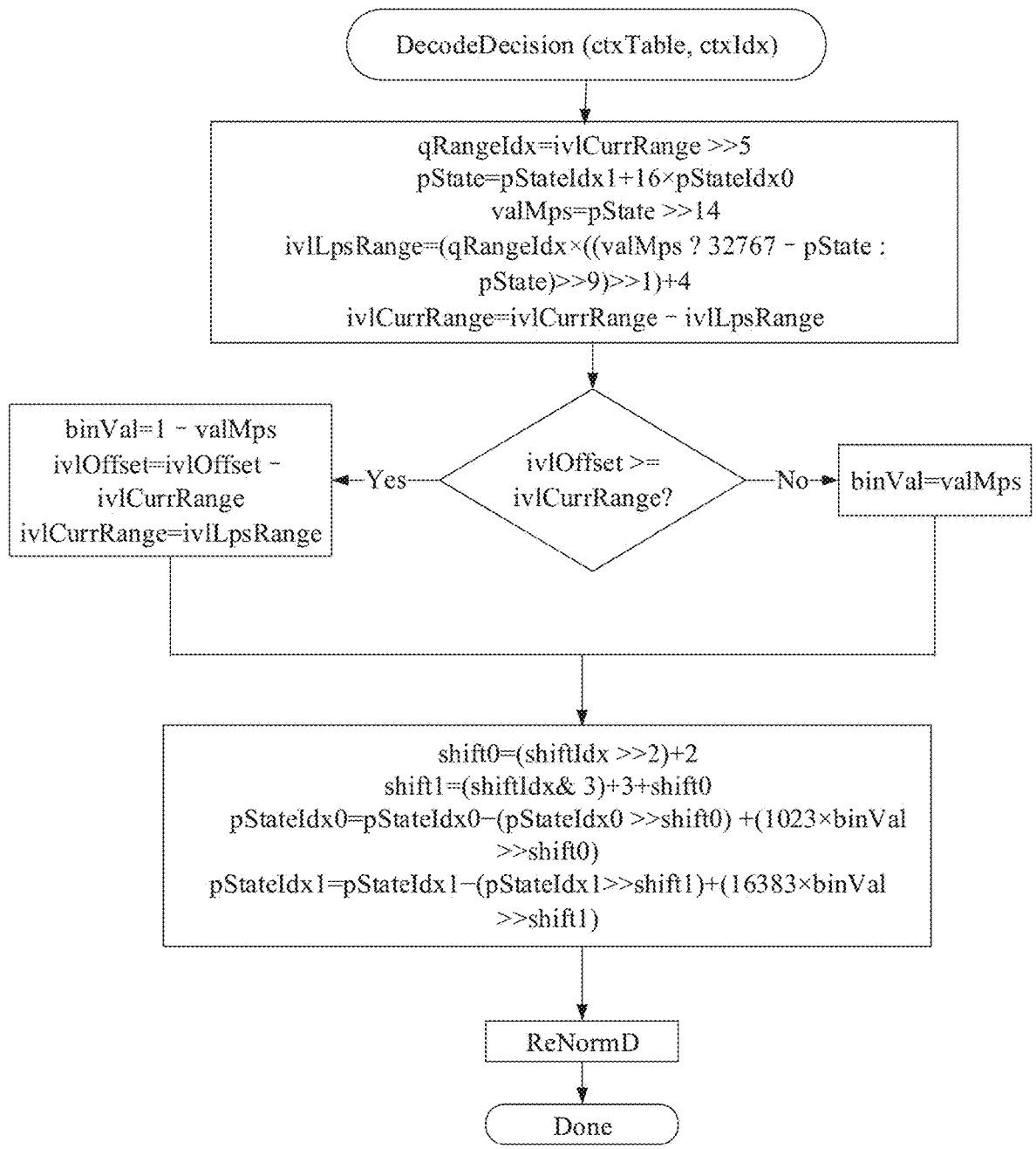
FIG. 4 is a schematic flowchart of an arithmetic decoding process for a binary decision provided in the related art.

FIG. 4 is a schematic flowchart of an arithmetic decoding process for a binary decision provided in the related art. As illustrated in FIG. 4, pStateIdx0 and pStateIdx1 are two states of the current context model.

(1) A value of variable ivlLpsRange is derived as follows:
Given a current value of ivlCurrRange, variable qRangeIdx is derived as follows:
qRangeIdx=ivlCurrRange>>5.
Given qRangeIdx, pStateIdx0 and pStateIdx1 associated with ctxTable and ctxIdx, valMps and ivlLpsRange are derived as follows:

pState=pStateIdx1+16×pStateIdx0;

valMps=pState>>14;

ivlLpsRange=(qRangeIdx×((valMps ? 32767−pState: pState)>>9)>>1)+4.

(2) The variable ivlCurrRange is set equal to ivlCurrRange−ivlLpsRange, and the following applies:
If ivlOffset is greater than or equal to ivlCurrRange, then the value of variable binVal is set equal to 1-valMps, ivlOffset is decremented by ivlCurrRange, and ivlCurrRange is set equal to ivlLpsRange.
Otherwise (ivlOffset is less than ivlCurrRange), the value of variable binVal is set equal to valMps.
Given the value of binVal, a specified state transition is performed. Depending on the current value of ivlCurrRange, a specified renormalization may be performed.

Further, inputs to the state transition process are the current pStateIdx0 and pStateIdx1, and the decoded value binVal. Outputs of the process are updated pStateIdx0 and pStateIdx1 of the context variables associated with ctxTable and ctxIdx. Variables shift0 and shift1 are derived from shiftIdx that is associated with ctxTable and ctxIdx:

shift0=(shiftIdx>>2)+2;

shift1=(shiftIdx & 3)+3+shift0.

Depending on the decoded value binVal, the update of the two variables pStateIdx0 and pStateIdx1 associated with ctxTable and ctxIdx are as follows:

pStateIdx0=pStateIdx0−(pStateIdx0>>shift0)+(1023× binVal>>shift0);

pStateIdx1=pStateIdx1−(pStateIdx1>>shift1)+ (16383×binVal>>shift1).

Further, inputs to the renormalization process of the arithmetic decoding engine are bits from slice data and the variables ivlCurrRange and ivlOffset. Outputs of the process are updated variables ivlCurrRange and ivlOffset.

Figure 5:
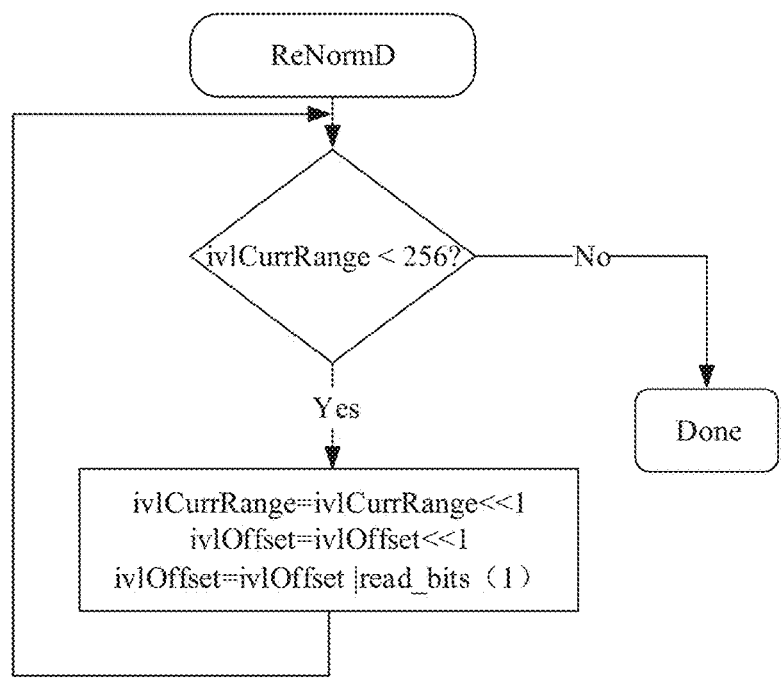
FIG. 5 is a schematic flowchart of a renormalization of an arithmetic decoding engine provided in the related art.

FIG. 5 is a schematic flowchart of the renormalization of the arithmetic decoding engine provided in the related art. As illustrated in FIG. 5, the current value of ivlCurrRange is first compared to 256, and subsequent operations are as follows:

If ivlCurrRange is greater than or equal to 256, no renormalization is needed and the RenormD process is finished.

Otherwise (ivlCurrRange is less than 256), a renormalization loop is entered. Within this loop, the value of ivlCurrRange is doubled, i.e. left-shifted by 1. The value of ivlOffset is doubled, i.e. left-shifted by 1. A single bit is shifted into ivlOffset by using read_bits (1).

The bitstream shall not contain data that result in a value of ivlOffset being greater than or equal to ivlCurrRange upon completion of this process.

Further, inputs to the bypass decoding process for binary decisions are bits from the slice data and the variables ivlCurrRange and ivlOffset. Outputs of this process are updated variable ivlOffset and the decoded value binVal.

Figure 6:
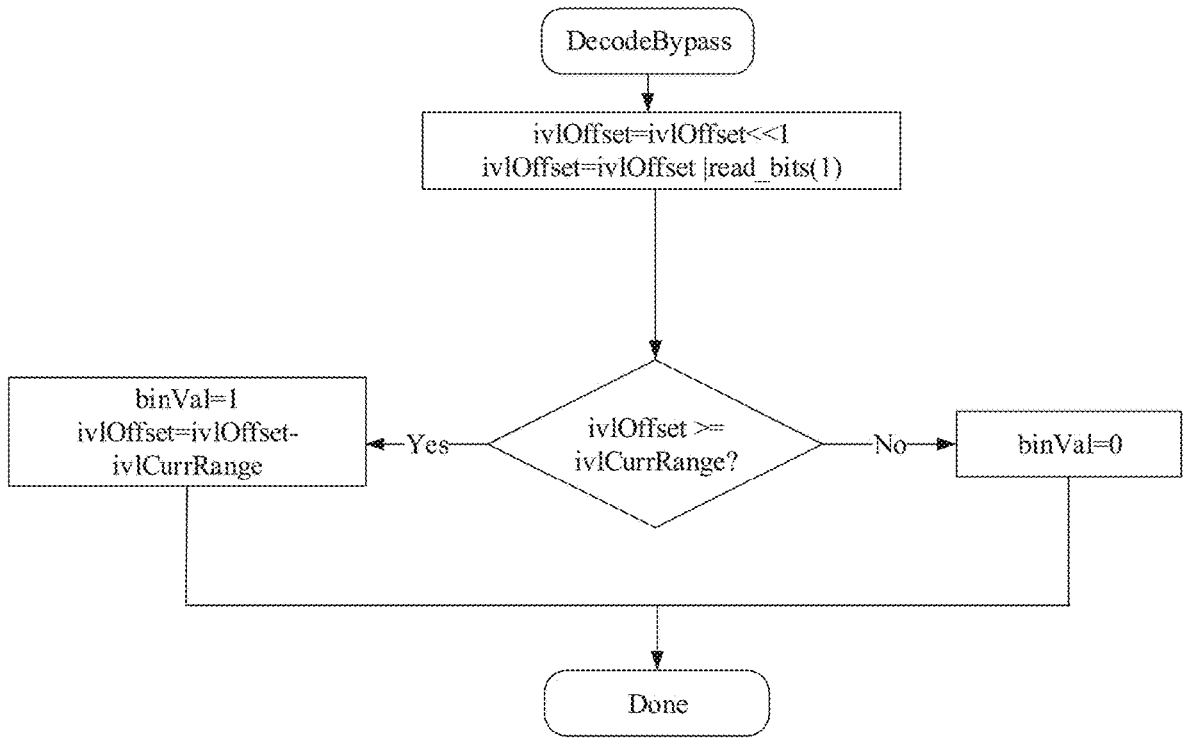
FIG. 6 is a schematic flowchart of a bypass decoding process provided in the related art.

The bypass decoding process is invoked when bypassFlag is equal to 1. FIG. 6 is a schematic flowchart of a bypass decoding process provided in the related art. As illustrated in FIG. 6, first, the value of ivlOffset is doubled, i.e. left-shifted by 1 and a single bit is shifted into ivlOffset by using read_bits(1). Then, the value of ivlOffset is compared to the value of ivlCurrRange and subsequent steps are as follows:

If ivlOffset is greater than or equal to ivlCurrRange, the value of binVal is set equal to 1, ivlOffset is equal to ivlOffset is decremented by ivlCurrRange.

Otherwise (ivlOffset is less than ivlCurrRange), binVal is set equal to 0.

The bitstream shall not contain data that result in a value of ivlOffset being greater than or equal to ivlCurrRange upon completion of this process.

It should also be understood that in current video coding standards, one or more transforms and transform skips are typically supported for residuals. The transforms include discrete cosine transform (DCT), etc. A transformed residual block usually exhibit certain characteristics after transform (and quantization). For example, after some transforms (and quantization), since energy is mostly concentrated in a low frequency region, coefficients in an upper-left region are relatively large, and coefficients in a lower-right region are relatively small or even equal to 0. For transform skip, transform is not performed. The distribution pattern of coefficients after the transform skip is different from that of coefficients after the transform, so that different coefficient coding methods may be used. For example, in the VVC, RRC is used for the coefficients after the transform, and TSRC is used for the coefficients after the transform skip.

Figure 7:
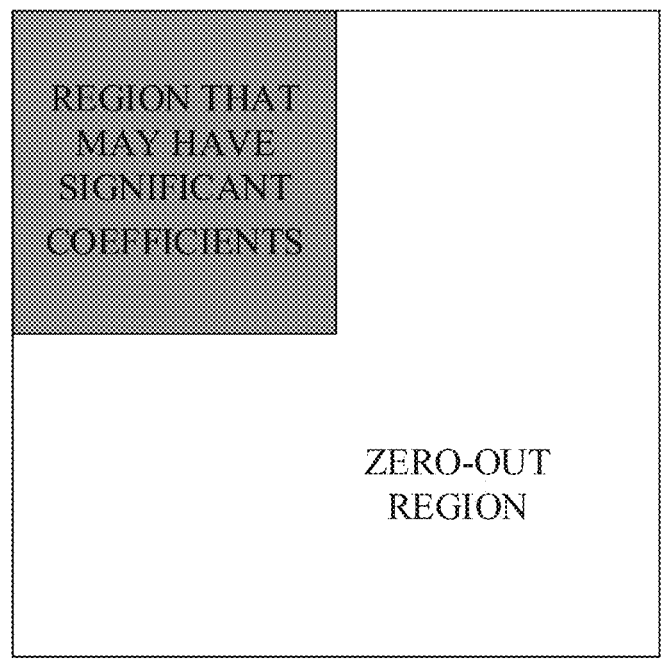
FIG. 7 is a schematic diagram illustrating position relationship between a region that may have significant coefficients and a zero-out region provided in the related art.

For general transforms such as DCT transform, in a transformed block, frequencies increase from left to right and from top to bottom. The upper left corner represents lower frequency, and the lower right corner represents higher frequency. Human eyes are more sensitive to low-frequency information and less sensitive to high-frequency information. With this property, processing heavily or removing some high-frequency information are less visually affecting. Some technologies, such as zero-out, may force some high-frequency information to be 0. For example, for a 64×64 block, coefficients at positions with horizontal coordinates greater than or equal to 32 or with vertical coordinates greater than or equal to 32 are forced to be 0. The foregoing is only a simple example, and there may be more complicated methods for deriving the range of the zero-out, which are not described herein. As illustrated in FIG. 7, non-zero (or called significant) coefficients may exist in the upper-left corner (namely, the region that possibly have significant coefficients), and all the coefficients in the lower-right corner are set equal to zero (namely, the zero-out region). In this way, for the subsequent coefficient coding, the coefficients of the zero-out region do not need to be encoded because the coefficients must be 0.

Further, since the distribution of coefficients shows a characteristic that coefficients at the upper-left corner are larger and many coefficients at the lower-right corner are equal to 0 after the residuals are transformed (and quantized) in a common video, during coefficients coding, some methods are generally used to code coefficients within a certain range of the upper-left corner, and not code coefficients within a certain range of the lower-right corner (these coefficients are default to 0). One method is to, when coding the coefficients of the block, first determine the position of the last significant coefficient of a block in a scanning order. After this position is determined, all coefficients following the position of the last significant coefficient in the scanning order are considered as 0, that is, no coding is required. Only the last significant coefficient and the previous coefficients thereof need to be encoded. For example, in the VVC, the position of the last significant coefficient (LastSignificantCoeffX, LastSignificantCoeffY) is determined using last_sig_coeff_x_prefix, last_sig_coeff_y_prefix, last_sig_coeff_x_suffix, and last_sig_coeff_y_suffix.

(a) last_sig_coeff_x_prefix specifies a prefix of a horizontal (or column) coordinate of the last significant coefficient in scanning order within the current block. The value of last_sig_coeff_x_prefix shall be in the range of 0 to (log 2ZoTbWidth<<1)−1, inclusive.

If last_sig_coeff_x_prefix is not present, then last_sig_coeff_x_prefix is equal to 0.

(b) last_sig_coeff_y_prefix specifies a prefix of a vertical (or row) coordinate of the last significant coefficient in scanning order within the current block. The value of last_sig_coeff_y_prefix shall be in the range of 0 to (log 2ZoTbHeight<<1)−1, inclusively.

If last_sig_coeff_y_prefix is not present, then last_sig_coeff_y_prefix is equal to 0.

(c) last_sig_coeff_x_suffix specifies a suffix of the horizontal (or column) coordinate of the last significant coefficient in scanning order within the current block. The value of last_sig_coeff_x_suffix shall be in the range of 0 to (1<<((last_sig_coeff_x_prefix>>1)−1))−1, inclusively.

LastSignificantCoeffX, i.e., the value of the horizontal (or column) coordinate of the last significant coefficient in scanning order within the current transform block, is derived as follows:

```
If last_sig_coeff_x_suffix is not present, then
    LastSignificantCoeffX = last_sig_coeff_x_prefix;
Otherwise (last_sig_coeff_x_suffix is present),
    LastSignificantCoeffX=(1<< ((last_sig_coeff_x_prefix>>1)−1))*(2+(last_
sig_coeff_x_prefix&1)) + last_sig_coeff_x_suffix.
```

(d) last_sig_coeff_y_suffix specifies the suffix of the vertical (or row) coordinate of the last significant coefficient of the current transform block in scanning order. The value of last_sig_coeff_y_suffix shall be in the range of 0 to (1<< ((last_sig_coeff_y_prefix>>1)−1))−1, inclusively.

LastSignificantCoeffY, i.e., the value of the vertical (or row) coordinate of the last significant coefficient of the current transform block in scanning order, is derived as follows:

```
If last_sig_coeff_y_suffix is not present, then
    LastSignificantCoeffY = last_sig_coeff_y_prefix;
Otherwise (last_sig_coeff_y_suffix is present),
    LastSignificantCoeffY = (1<< ((last_sig_coeff_y_prefix>>1)−1))*(2+(last_
sig_coeff_y_prefix&1)) + last_sig_coeff_y_suffix.
```

Further, the last significant coefficient and the previous coefficients thereof need to be coded. However, in a common video, a certain percentage of these coefficients are still equal to 0. In VVC, a flag sb_coded_flag indicating whether a current sub-block is coded is used to determine whether the coefficients of the current sub-block need to be coded. If no coding is needed, then all the coefficients of the current sub-block are considered as 0. Here, the sub-block is typically an n×n sub-block, such as 4×4 sub-block.

sb_coded_flag[xS][yS] specifies the following for the subblock at location (xS, yS) within the current transform block, where a subblock is an array of transform coefficient levels:

When sb_coded_flag[xS][yS] is equal to 0, all transform coefficient levels of the subblock at location (xS, yS) are inferred to be equal to 0.

When sb_coded_flag[xS][yS] is not present, it is inferred to be equal to 1.

Further, when dealing with coefficient coding, the compression efficiency can be improved by utilizing the properties of the coefficients. For example, for the common video, a certain percentage of the coefficients to-be-coded are 0. Thus, a syntax element may be used to indicate whether the current coefficient is 0. This syntax element is usually a binary symbol (bin). If the current coefficient is 0, then it means that coding of the current coefficient has ended. Otherwise, coding of the current coefficient needs to be continued. As another example, for the common video, a certain percentage of the significant coefficients have an absolute value of 1. Thus, a syntax element may be used to indicate whether an absolute value of a current coefficient is greater than 1. This syntax element is usually a bin. If the absolute value of the current coefficient is not greater than 1, then it means that coding of the current coefficient has ended. Otherwise, coding of the current coefficient needs to be continued. For example, the syntax element(s) involved in VVC is as follows.

sig_coeff_flag[xC][yC] specifies for the transform coefficient location (xC, yC) within the current transform block whether the corresponding transform coefficient level at the location (xC, yC) is non-zero as follows:

If sig_coeff_flag[xC][yC] is equal to 0, the transform coefficient level at the location (xC, yC) is set equal to 0;

Otherwise (sig_coeff_flag[xC][yC] is equal to 1), the transform coefficient level at the location (xC, yC) has a non-zero value.

When sig_coeff_flag[xC][yC] is not present, it is inferred as follows:

If transform_skip_flag[x0][y0][cIdx] is equal to 0 or sh_ts_residual_coding_disabled_flag is equal to 1, the following applies:

If (xC, yC) is the last significant location (LastSignificantCoeffx, LastSignificantCoeffY) in scan order or all of the following conditions are true, sig_coeff_flag[xC][yC] is inferred to be equal to 1:
  (xC & ((1<<log 2SbW)−1), yC & ((1<<log 2SbH)−1)) is equal to (0,0);
  inferSbDcSigCoeffFlag is equal to 1; and
  sb_coded_flag[xS][yS] is equal to 1;
Otherwise, sig_coeff_flag[xC][yC] is inferred to be equal to 0;

Otherwise (transform_skip_flag[x0][y0][cIdx] is equal to 1 and sh_ts_residual_coding_disabled_flag is equal to 0), the following applies:
  If all of the following conditions are true, sig_coeff_flag[xC][yC] is inferred to be equal to 1:
    (xC & ((1<<log 2SbW)−1), yC & ((1<<log 2SbH)−1)) is equal to ((1<<log 2SbW)−1, (1<<log 2SbH)−1);
    inferSbSigCoeffFlag is equal to 1; and
    sb_coded_flag[xS][yS] is equal to 1;
  Otherwise, sig_coeff_flag[xC][yC] is inferred to be equal to 0.

abs_level_gtx_flag[n][j] specifies whether the absolute value of the transform coefficient level (at scanning position n) is greater than (j<<1)+1. When abs_level_gtx_flag[n][j] is not present, abs_level_gtx_flag[n][j] is equal to 0.

In this way, if the coding of the current coefficient is not ended after the above flags (or called syntax elements) are processed, then a remaining value of an absolute value of the coefficient needs to be encoded, such as abs_remainder in VVC.

abs_remainder[n] is the remaining absolute value of a transform coefficient level that is coded with Golomb-Rice code at the scanning position n. When abs_remainder[n] is not present, abs_remainder[n] is equal to 0.

Further, in VVC, syntax elements such as sig_coeff_flag and abs_level_gtx_flag are coded using the context mode, while abs_remainder is coded using the bypass mode. As mentioned above, context mode coding is more complex than bypass mode coding, which intuitively means a lower processing speed. If there are a larger number of coefficients to be coded, heavy used of the context mode coding will affect the decoding speed. Therefore, the number of syntax elements coded using context mode may be limited. For example, if the number of bins coded using the context mode exceeds a threshold, subsequent coefficients are forced to be coded using the bypass mode. Such as dec_abs_level in VVC.

dec_abs_level[n] is an intermediate value that is coded with Golomb-Rice code at the scanning position n. ZeroPos [n] can be derived during the parsing of dec_abs_level[n], the absolute value of a transform coefficient level at location (xC, yC) AbsLevel[xC][yC] is derived as follows:

If dec_abs_level[n] is not present or equal to ZeroPos[n], AbsLevel[xC][yC] is set equal to 0.

Otherwise, if dec_abs_level[n] is less than ZeroPos[n], AbsLevel[xC][yC] is set equal to dec_abs_level[n]+1;

Otherwise (dec_abs_level[n] is greater than ZeroPos[n]), AbsLevel[xC][yC] is set equal to dec_abs_level[n].

The above values are the absolute values of the coefficients. The sign of a significant coefficient may be determined by using a coefficient sign flag coeff sign_flag or some methods for sign derivation. coeff sign_flag[n] may be used to determine the sign of a transform coefficient at a scanning position n as follows:

If coeff sign_flag[n] is 0, then the corresponding transform coefficient is positive;

Otherwise (coeff sign_flag[n] is 1), the corresponding transform coefficient is negative.

If coeff_sign_flag[n] is not present, then coeff sign_flag [n] is 0. In this case, the sign of the transform coefficient on the coordinates (xC, yC) is determined from CoeffSignLevel [xC][yC]:

If CoeffSignLevel[xC][yC] is 0, then the corresponding transform coefficient is 0;

Otherwise, if CoeffSignLevel[xC][yC] is 1, then the corresponding transform coefficient is positive; otherwise (CoeffSignLevel[xC][yC] is −1), the corresponding transform coefficient is negative.

It should also be noted that CoeffSignLevel[xC][yC] may be derived using other methods, which will not be repeated herein.

In addition, VVC uses a parity flag par_level_flag for a coefficient value. The flag indicates the parity of the current coefficient and is used in determining the current coefficient value and in dependent quantization.

par_level_flag[n] specifies the parity of the transform coefficient level at scanning position n. When parlevel_flag [n] is not present, par_level_flag[n] is equal to 0.

In addition to determining the parity of the transform coefficient, par level flag may be further used to determine the value of the coefficient in conjunction with abs_level_gtx_flag, abs_remainder, etc.

Here, since context mode coding requires selecting, using, and updating context modes, whereas bypass mode encoding does not require, it is common practice to place the syntax elements coded in context mode together and the syntax elements coded in bypass mode together within a certain range, which is more friendly to the hardware design. For example, all the context mode-coded syntax elements in a block are processed first, and then the bypass mode-coded syntax elements are processed. All the context mode-coded syntax elements in the current block may be further divided into several groups, and all the bypass mode-coded syntax elements in the block may be further divided into several groups.

In one specific example, the specific syntax of RRC is illustrated in Table 1.

TABLE 1

| | Descriptor |
|---|---|
| residual_coding(x0, y0, log2TbWidth, log2TbHeight, cIdx){ | |
| if(sps_mts_enabled_flag && cu_sbt_flag && cIdx==0 && | |
|     log2TbWidth == 5 && log2TbHeight<6) | |
|   log2ZoTbWidth=4 | |
| else | |
|   log2ZoTbWidth=Min(log2TbWidth,5) | |
| if(sps_mts_enabled_flag && cu_sbt_flag && cIdx==0 && | |
|     log2TbWidth<6 && log2TbHeight == 5) | |
|   log2ZoTbHeight=4 | |
| else | |
|   log2ZoTbHeight=Min(log2TbHeight,5) | |
| if(log2TbWidth >0) | |
|   last_sig_coeff_x_prefix | ae(v) |
| if(log2TbHeight >0) | |
|   last_sig_coeff_y_prefix | ae(v) |
| if(last_sig_coeff_x_prefix> 3) | |
|   last_sig_coeff_x_suffix | ae(v) |
| if(last_sig_coeff_y_prefix> 3) | |
|   last_sig_coeff_y_suffix | ae(v) |
| log2TbWidth=log2ZoTbWidth | |
| log2TbHeight=log2ZoTbHeight | |
| remBinsPass1=((1<<(log2TbWidth+log2TbHeight))×7)>>2 | |
| log2SbW=(Min(log2TbWidth, log2TbHeight)< 2 ? 1 : 2) | |
| log2SbH=log2SbW | |
| if(log2TbWidth+log2TbHeight>3) | |
|   if(log2TbWidth<2){ | |
|     log2SbW=log2TbWidth | |
|     log2SbH=4−log2SbW | |
|   } elseif(log2TbHeight<2){ | |
|     log2SbH=log2TbHeight | |
|     log2SbW=4−log2SbH | |
|   } | |
| numSbCoeff=1<<(log2SbW+log2SbH) | |
| lastScanPos=numSbCoeff | |

TABLE 1-continued

| | Descriptor |
|---|---|

```
lastSubBlock=(1<<(log2TbWidth+log2TbHeight−(log2SbW+log2SbH)))−1
do {
   if(lastScanPos ==0){
      lastScanPos=numSbCoeff
      lastSubBlock−−
   }
   lastScanPos−−
   xS=DiagScanOrder[log2TbWidth−log2SbW][log2TbHeight−log2SbH]
               [lastSubBlock][0]
   yS=DiagScanOrder[log2TbWidth−log2SbW][log2TbHeight−log2SbH]
               [lastSubBlock][1]
   xC=(xS<<log2SbW)+DiagScanOrder[log2SbW][log2SbH][lastScanPos][0]
   yC=(yS<<log2SbH)+DiagScanOrder[log2SbW][log2SbH][lastScanPos][1]
} while((xC != LastSignificantCoeffX) || (yC != LastSignificantCoeffY))
if(lastSubBlock ==0 && log2TbWidth>=2 && log2TbHeight>=2 &&
   !transform_skip_flag[x0][y0][cIdx] && lastScanPos >0)
   LfnstDcOnly=0
if((lastSubBlock >0 && log2TbWidth>=2 && log2TbHeight>=2) ||
   (lastScanPos>7 && (log2TbWidth == 2 || log2TbWidth == 3) &&
   log2TbWidth == log2TbHeight))
   LfnstZeroOutSigCoeffFlag=0
if((lastSubBlock >0 || lastScanPos >0) && cIdx==0)
   MtsDcOnly=0
QState=0
for(i=lastSubBlock; i >=0; i−−){
   startQStateSb=QState
   xS=DiagScanOrder[log2TbWidth−log2SbW][log2TbHeight−log2SbH]
               [i][0]
   yS=DiagScanOrder[log2TbWidth−log2SbW][log2TbHeight−log2SbH]
               [i][1]
   inferSbDcSigCoeffFlag=0
   if(i<lastSubBlock && I >0){
      sb_coded_flag[xS][yS]                                              ae(v)
      inferSbDcSigCoeffFlag=1
   }
   if(sb_coded_flag[xS][yS] && (xS>3 || yS>3) && cIdx==0)
      MtsZeroOutSigCoeffFlag=0
   firstSigScanPosSb=numSbCoeff
   lastSigScanPosSb=−1
   firstPosMode0=(i == lastSubBlock ? lastScanPos : numSbCoeff−1)
   firstPosMode1=firstPosMode0
   for(n=firstPosMode0; n>=0 && remBinsPass1>=4; n−−){
      xC=(xS<<log2SbW)+DiagScanOrder[log2SbW][log2SbH][n][0]
      yC=(yS<<log2SbH)+DiagScanOrder[log2SbW][log2SbH][n][1]
      if(sb_coded_flag[xS][yS] && (n >0) || !inferSbDcSigCoeffFlag) &&
         (xC != LastSignificantCoeffX || yC != LastSignificantCoeffY)){
         sig_coeff_flag[xC][yC]                                          ae(v)
         remBinsPass1−−
         if(sig_coeff_flag[xC][yC])
            inferSbDcSigCoeffFlag=0
      }
      if(sig_coeff_flag[xC][yC]){
         abs_level_gtx_flag[n][0]                                        ae(v)
         remBinsPass1−−
         if(abs_level_gtx_flag[n][0]){
            par_level_flag[n]                                            ae(v)
            remBinsPass1−−
            abs_level_gtx_flag[n][1]                                     ae(v)
            remBinsPass1−−
         }
         if(lastSigScanPosSb == −1)
            lastSigScanPosSb=n
         firstSigScanPosSb=n
      }
      AbsLevelPass1[xC][yC]=sig_coeff_flag[xC][yC]+par_level_flag[n]+
            abs_level_gtx_flag[n][0]+2×abs_level_gtx_flag[n][1]
      if(sh_dep_quant_used_flag)
         QState=QStateTransTable[QState][AbsLevelPass1[xC][yC]&1]
      firstPosMode1=n−1
   }
   for(n=firstPosMode0 ; n>firstPosMode1 ; n−−){
      xC=(xS<<log2SbW)+DiagScanOrder[log2SbW][log2SbH][n][0]
      yC=(yS<<log2SbH)+DiagScanOrder[log2SbW][log2SbH][n][1]
      if(abs_level_gtx_flag[n][1])
         abs_remainder[n]                                                ae(v)
      AbsLevel[xC][yC]=AbsLevelPass1[xC][yC]+2×abs_remainder[n]
   }
   for(n=firstPosMode1; n>=0; n−−){
```

TABLE 1-continued

|  | Descriptor |
|---|---|
| ``` 
    xC=(xS<<log2SbW)+DiagScanOrder[log2SbW][log2SbH][n][0]
    yC=(yS<<log2SbH)+DiagScanOrder[log2SbW][log2SbH][n][1]
    if(sb_coded_flag[xS][yS])
      dec_abs_level[n]
    if(AbsLevel[xC][yC]>0){
       if(lastSigScanPosSb == -1)
          lastSigScanPosSb=n
       firstSigScanPosSb=n
    }
    if(sh_dep_quant_used_flag)
      QState=QStateTransTable[QState][AbsLevel[xC][yC]&1]
  }
  signHiddenFlag=sh_sign_data_hiding_used_flag &&
      (lastSigScanPosSb-firstSigScanPosSb>3 ?1:0)
  for(n=numSbCoeff-1; n>=0; n--){
    xC=(xS<<log2SbW)+DiagScanOrder[log2SbW][log2SbH][n][0]
    yC=(yS<<log2SbH)+DiagScanOrder[log2SbW][log2SbH][n][1]
    if((AbsLevel[xC][yC]>0) &&
        (!signHiddenFlag || (n != firstSigScanPosSb)))
      coeff_sign_flag[n]
  }
  if(sh_dep_quant_used_flag){
    QState=startQStateSb
    for(n=numSbCoeff-1; n>=0; n--){
      xC=(xS<<log2SbW)+DiagScanOrder[log2SbW][log2SbH][n][0]
      yC=(yS<<log2SbH)+DiagScanOrder[log2SbW][log2SbH][n][1]
      if(AbsLevel[xC][yC]>0)
        TransCoeffLevel[x0][y0][cIdx][xC][yC]=
            (2×AbsLevel[xC][yC]-(QState>1?1:0))×
            (1-2×coeff_sign_flag[n])
      QState=QStateTransTable[QState][AbsLevel[xC][yC]&1]
    }
  } else{
    sumAbsLevel=0
    for(n=numSbCoeff-1; n>=0; n--){
      xC=(xS<<log2SbW)+DiagScanOrder[log2SbW][log2SbH][n][0]
      yC=(yS<<log2SbH)+DiagScanOrder[log2SbW][log2SbH][n][1]
      if(AbsLevel[xC][yC]>0){
        TransCoeffLevel[x0][y0][cIdx][xC][yC] =
            AbsLevel[xC][yC]×(1-2×coeff_sign_flag[n])
        if(signHiddenFlag){
          sumAbsLevel += AbsLevel[xC][yC]
          if(n == firstSigScanPosSb && sumAbsLevel % 2 ==1)
            TransCoeffLevel[x0][y0][cIdx][xC][yC] =
                -TransCoeffLevel[x0][y0][cIdx][xC][yC]
        }
      }
    }
  }
 }
}
}
``` | ae(v)<br><br><br><br><br><br><br><br><br><br><br><br>ae(v) |

The array AbsLevel[xC][yC] represents an array of absolute values of the transform coefficients of the current transform block. The array AbsLevelPsl[xC][yC] represents an array of the absolute values of the partial reconstruction of the transform coefficients of the current transform block. The indexes xC and yC of the array represent the position (xC, yC) in the current transform block.

After entering the function residual_coding (x0, y0, log 2TbWidth, log 2TbHeight, cIdx), it is necessary to determine some information about the block size, such as determining the logarithms log 2ZoTbWidth and log 2ZoTbHeight of the block size after zero-out, where coefficients with a horizontal coordinate in a range [0, (l<<log 2ZoTbWidth)−1] and a vertical coordinate in a range [0, (1<<log 2ZoTbHeight)−1] may be significant coefficients. Here, (1<<log 2ZoTbWidth) represents the width of the transform block after zero-out, and (1<<log 2ZoTbHeight) represents the height of the transform block after zero-out. Then the position of the last significant coefficient is determined based on last_sig_coeff_x_prefix, last_sig_coeff_y_prefix, last_sig_coeff_x_suffix, last_sig_coeff_y_suffix, and so on. The coefficients before (preceding) the last significant coefficient in scanning order may be significant coefficients. Then the value of remBinsPass1 is determined, i.e., determined using a remBinsPass1=((1<<(log 2TbWidth+log 2TbHeight))×7)>>2. remBinsPass1 specifies the number of syntax elements that are coded using the context mode in the current block. In the embodiments of the present disclosure, it can be understood that remBinsPass1 means remaining binaries inpass1, that is, the number of bins remaining in the first round. The coefficients before the last significant coefficient in scanning order need to be coded. For the sub-blocks containing these coefficients, it is determined whether each current sub-block needs to be coded, and if so, the method sets the syntax elements coded in context mode in a sub-block in the first round, and the syntax elements coded in bypass mode later. For each coefficient, it may need to process at most 4 context-mode coded syntax elements, i.e., one sig_coeff_flag, two abs_level_gtx_flag, and one par level flag. In the first round, remBinsPass1 is decremented by 1 each time a context-mode coded syntax element is processed. If a coefficient is large enough, the remaining value, i.e., abs_remainder, need to be processed after the syntax elements coded in context mode in the first round are processed. If remBinsPass1 is already small enough (does not satisfy remBinsPass1>=4), the first round ends, and the remaining coefficients are processed directly in bypass mode, i.e., dec_abs_level.

In another specific example, the specific syntax of TSRC is illustrated in Table 2.

TABLE 2

| | Descriptor |
|---|---|
| residual_ts_coding( x0, y0, log2TbWidth, log2TbHeight, cIdx ) { | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastSubBlock = ( | |
| 1 << ( log2TbWidth + log2TbHeight − ( log2SbW + log2SbH ) ) ) − 1 | |
|   inferSbCbf = 1 | |
|   RemCcbs = ( ( 1 << ( log2TbWidth + log2TbHeight ) ) * 7 ) >> 2 | |
|   for( i =0; i <= lastSubBlock; i++ ) { | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     if( i != lastSubBlock \|\| !inferSbCbf ) | |
|       sb_coded_flag[ xS ][ yS ] | ae(v) |
|     if( sb_coded_flag[ xS ][ yS ] && i < lastSubBlock ) | |
|       inferSbCbf = 0 | |
|     /* First scan pass */ | |
|     inferSbSigCoeffFlag = 1 | |
|     lastScanPosPass1 = −1 | |
|     for( n = 0; n <= numSbCoeff − 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       lastScanPosPass1 = n | |
|       if( sb_coded_flag[ xS ][ yS ] && | |
|         ( n != numSbCoeff − 1 \|\| !inferSbSigCoeffFlag ) ) { | |
|         sig_coeff_flag[ xC ][ yC ] | ae(v) |
|         RemCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] ) { | |
|         coeff_sign_flag[ n ] | ae(v) |
|         RemCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         RemCcbs− − | |
|         if( abs_level_gtx_flag[ n ][ 0 ] ) { | |
|           par_level_flag[ n ] | ae(v) |
|           RemCcbs− − | |
|         } | |
|       } | |
|       AbsLevelPass1[ xC ][ yC ] = | |
|         sig_coeff_flag[ xC ][ yC ] + par_level_flag[ n ] + abs_level_gtx_flag[ n ][ 0 ] | |
|     } | |
|     /* Greater than X scan pass (numGtXFlags=5) */ | |
|     lastScanPosPass2 = −1 | |
|     for( n = 0; n <= numSbCoeff − 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       AbsLevelPass2[ xC ][ yC ] = AbsLevelPass1[ xC ][ yC ] | |
|       for( j = 1; j < 5; j++ ) { | |
|         if( abs_level_gtx_flag[ n ][ j − 1 ] ) { | |
|           abs_level_gtx_flag[ n ][ j ] | ae(v) |
|           RemCcbs− − | |
|         } | |
|         AbsLevelPass2[ xC ][ yC ] += 2 * abs_level_gtx_flag[ n ][ j ] | |
|       } | |
|       lastScanPosPass2 = n | |
|     } | |
|     /* remainder scan pass */ | |

TABLE 2-continued

Descriptor

```
        for( n = 0; n <= numSbCoeff - 1; n++ ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( ( n <= lastScanPosPass2 && AbsLevelPass2[ xC ][ yC ] >= 10 ) ||
                ( n > lastScanPosPass2 && n <= lastScanPosPass1 &&
                  AbsLevelPass1[ xC ][ yC ] >= 2 ) ||
                ( n > lastScanPosPass1 && sb_coded_flag[ xS ][ yS ] ) )
                abs_remainder[ n ]                                                    ae(v)
            if( n <= lastScanPosPass2 )
                AbsLevel[ xC ][ yC ] =
AbsLevelPass2[ xC ][ yC ] + 2 * abs_remainder[ n ]
            else if(n <= lastScanPosPass1 )
                AbsLevel[ xC ][ yC ] =
AbsLevelPass1[ xC ][ yC ] + 2 * abs_remainder[ n ]
            else { /* bypass */
                AbsLevel[ xC ][ yC ] = abs_remainder[ n ]
            if( abs_remainder[ n ] )
                coeff_sign_flag[ n ]                                                  ae(v)
            }
            if( BdpcmFlag[ x0 ][ y0 ][ cIdx ] = = 0 && n <= lastScanPosPass1 ) {
                absLeftCoeff = xC > 0 ? AbsLevel[ xC - 1 ][ yC ] : 0
                absAboveCoeff = yC > 0 ? AbsLevel[ xC ][ yC - 1 ] : 0
                predCoeff = Max( absLeftCoeff, absAboveCoeff )
                if( AbsLevel[ xC ][ yC ] = = 1 && predCoeff > 0 )
                    AbsLevel[ xC ][ yC ] = predCoeff
                else if( AbsLevel[ xC ][ yC ] > 0 && AbsLevel[ xC ][ yC ] <= predCoeff
)
                    AbsLevel[ xC ][ yC ]- -
            }
            TransCoeffLevel[ x0 ][ y0 ][ cIdx ][ xC ][ yC ] = ( 1 - 2 *
coeff_sign_flag[ n ] ) *
                AbsLevel[ xC ][ yC ]
        }
    }
}
```

After entering the function residual_ts_coding (x0, y0, log 2TbWidth, log 2TbHeight, cIdx), some information about the block size needs to be determined. The value of RemCcbs is then determined using the equation RemCcbs= ((1<<(log 2TbWidth+log 2TbHeight))×7)>>2. RemCcbs specifies the number of syntax elements in the current block that are coded using the context mode. In the embodiments of the present disclosure, it can be understood that RemCcbs means remaining context coded binaries, that is, the number of remaining context mode bins. For each sub-block, it is determined whether the current sub-block requires to be coded. If coding is required, different from the RRC described above, the TSRC method sets the syntax elements coded in the context mode in a sub-block in two rounds, with up to four context-mode coded syntax elements are processed for each coefficient in the first and second rounds, respectively. The syntax elements coded in bypass mode are set later. In the first and second rounds, remBinsPass1 is decremented by 1 each time a context-mode coded syntax element is processed. If a coefficient is large enough, the remaining value, i.e., abs_remainder, needs to be processed after the context-mode coded syntax elements have been processed in the first and second rounds. If remBinsPass1 is small enough (does not satisfy remBinsPass1>=4), the first two rounds will be ended and the remaining coefficients will be processed directly in bypass mode, in this case still abs_remainder.

In short, the current coefficient coding method available in the related art has good compression efficiency for videos that are commonly used today, such as consumer videos. Consumer video usually has a bit depth of 8 or 10 bits per pixel, and the bitrate is usually not too high, usually a few megabits per second (MB/s) or less. However, there are some applications where the video require a higher bit depth, such as 12, 14, or 16 bits per pixel or higher. The higher bit depth usually results in larger coefficients, more significant coefficients, and thus higher bitrate. There are also applications where the video requires higher quality, which usually results in larger coefficients, more significant coefficients, and thus higher bitrate. The higher bitrate requires stronger processing power, such as throughput, of the decoder.

High bit depth, high quality, and high bitrate video (referred to as "triple-high video") usually requires more and larger coefficients to be coded than low bit depth, low quality, and low bitrate video (referred to as "conventional video"). For example, for a block of the same size, the number of coefficients that need to be coded in the triple-high video is much larger than that in the conventional video. This is because for the conventional video, many of the coefficients in a block after prediction, transformation, and quantization become 0, while for the triple-height video, many of the coefficients in a block after prediction, transformation, and quantization are still significant coefficients. For the conventional video, since a large percentage of the coefficients to be coded in the block after prediction, transformation, and quantization are 0, it is very effective to use the last significant coefficient position (LastSignificantCoeffX, LastSignificantCoeffY) to distinguish between regions with coefficients to be coded or not. Further, a large percentage of the coefficients before the last significant coefficient position are also zero, and thus it is very effective to further distinguish whether the current sub-block needs to be coded or not by using the sb_coded_flag to indicate whether the sub-block is coded. However, when there are a larger number of significant coefficients in the current block, or even most or all of the coefficients are significant coefficients, using the last significant coefficient position and the flag indicating whether the sub-block is coded as mentioned above cannot filter out too many significant coefficients. Further, the coding of significant-coefficient positions and the flag indicating whether the sub-block is coded in the bitstream will cause some overheads, thus resulting in wastes.

On the other hand, the position of the last significant coefficient and the flag indicating whether a sub-block is coded are coded in context mode, which is more complex than bypass mode. Processing such information also affects the speed and throughput of the software and hardware coding.

In another aspect, the current method of coding the position of last significant coefficient (LastSignificantCoeffX, LastSignificantCoeffY) is to code the coordinates of the position of the last significant coefficient. In the conventional video, the values of LastSignificantCoeffX and LastSignificantCoeffY are usually small because most of the significant coefficients are concentrated in the upper-left corner while a large region in the lower-right corner has zero coefficients. However, in triple-high video, a large number of significant coefficients are also present in the lower-right corner, which results in typically larger values of LastSignificantCoeffX and LastSignificantCoeffY, and thus greater overhead when coding larger values in the bitstream. In addition, the present method may be used in lossless compression, where quantization cannot be used, in which case the coefficients are usually more numerous and larger. In this case, using the existing related schemes may bring more overheads and waste, and even affect the speed and throughput of coding.

Embodiments of the present disclosure provide a coefficient decoding method, which is applied to a decoder. A bitstream is parsed to obtain a video flag. When the video flag indicates that a video satisfies a preset condition, the bitstream is parsed to obtain a last-significant-coefficient position-reverse flag and coordinate information of a last significant coefficient. When the last-significant-coefficient position-reverse flag indicates that a position of the last significant coefficient is reversed for a current block, the position of the last significant coefficient is determined by calculation with the coordinate information of the last significant coefficient. According to a preset scanning order, all coefficients before the position of the last significant coefficient are decoded to determine coefficients of the current block.

Embodiments of the present disclosure further provide a coefficient encoding method which is applied to an encoder. A video flag and a position of a last significant coefficient are determined. When the video flag indicates that a video satisfies a preset condition, a last-significant-coefficient position-reverse flag is determined. Coordinate information of the last significant coefficient is determined according to the position of the last significant coefficient and the last-significant-coefficient position-reverse flag. All coefficients before the position of the last significant coefficient are encoded according to a preset scanning order, and bit information obtained by the encoding, the video flag, and the coordinate information of the last significant coefficient are signalled into a bitstream.

In this way, in the video coding scenarios with high bit depth, high bitrate, high quality, or lossless compression, since the coefficient distribution pattern is different from that of conventional video scenarios, during coefficient coding, by reducing or even eliminating the number of syntax elements coding in context mode, such as syntax elements about the position of the last significant coefficient, the sub-block coded flags, etc., or further performing coordinate transformation in the case that the values of the coordinates of the last significant coefficient are too large, the overhead caused by coding in the bitstream can be reduced, and thus the throughput and coding speed of coefficient coding can be improved. In addition, the compression efficiency can also be improved since the reduced or eliminated syntax elements have less impact in the video coding with high bit-depth, high bit-rate, high-quality, or lossless compression.

Embodiments of the present disclosure will be described in detail below in conjunction with the accompanying drawings.

Figure 8A:
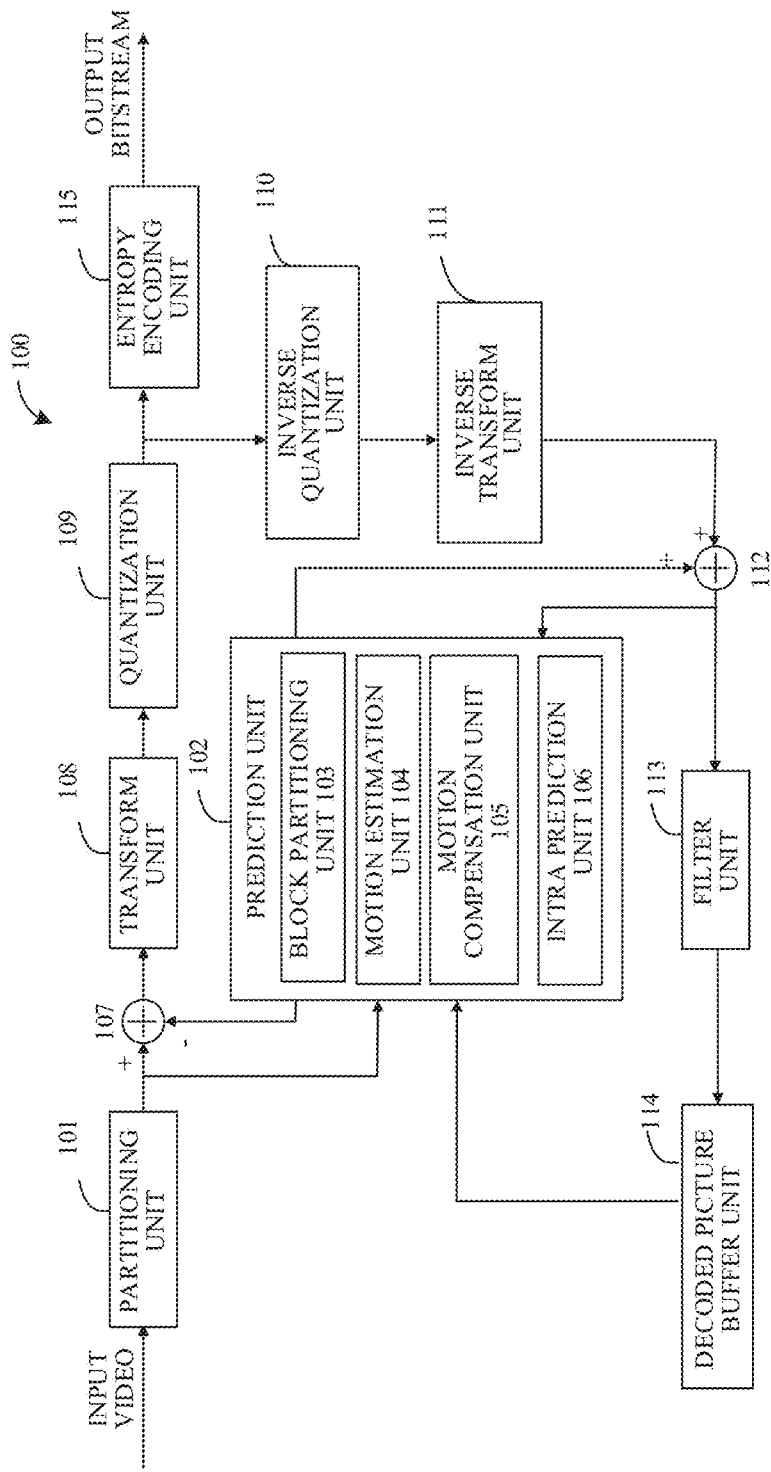
FIG. 8A is a schematic diagram of a system composition of an encoder provided in embodiments of the disclosure.

Referring to FIG. 8A, FIG. 8A illustrates an example block diagram of a system composition of an encoder provided in embodiments of the present disclosure. As illustrated in FIG. 8A, the encoder 100 may include a partitioning unit 101, a prediction unit 102, a first adder 107, a transform unit 108, a quantization unit 109, an inverse quantization unit 110, an inverse transform unit 111, a second adder 112, a filter unit 113, a decoded picture buffer (DPB) unit 114, and an entropy encoding unit 115. Here, an input to the encoder 100 may be a video including a series of pictures or a still picture, and an output of the encoder 100 may be a bitstream representing a compressed version of the input video.

The partitioning unit 101 partitions a picture in the input video into one or more coding tree units (CTUs). The partitioning unit 101 partitions the picture into multiple tiles, and may further partition one tile into one or more bricks, where a tile or a brick may include one or more complete and/or partial CTUs. In addition, the partitioning unit 101 may generate one or more slices, where one slice may include one or more tiles in a raster order in the picture, or one or more tiles covering a rectangular region in the picture. The partitioning unit 101 may also generate one or more sub-pictures, where one sub-picture may include one or more slices, tiles, or bricks.

During the encoding process of the encoder 100, the partitioning unit 101 passes the CTUs to the prediction unit 102. Typically, the prediction unit 102 may include a block partitioning unit 103, a motion estimation (ME) unit 104, a motion compensation (MC) unit 105, and an intra prediction unit 106. Specifically, the block partitioning unit 103 further partitions the input CTU into smaller coding units (CUs) by iteratively using quad tree partitioning, binary tree partitioning, and triple tree partitioning. The prediction unit 102 may use the ME unit 104 and the MC unit 105 to obtain an inter prediction block of the CU. The intra prediction unit 106 may obtain an intra prediction block of the CU using various intra prediction modes including the MIP mode. In examples, the rate-distortion optimization (RDO)-based motion estimation method may be invoked by the ME unit 104 and the MC unit 105 to obtain the inter prediction block, and the RDO-based mode determination method may be invoked by the intra prediction unit 106 to obtain the intra prediction block.

The prediction unit 102 outputs the prediction block of the CU, and the first adder 107 calculates a difference, i.e., a residual CU, between the CU output by the partitioning unit 101 and the prediction block of the CU. The transform unit 108 reads the residual CU and performs one or more transformations on the residual CU to obtain coefficients. The quantization unit 109 quantizes the coefficients and outputs quantized coefficients (i.e., levels). The inverse quantization unit 110 performs scaling operations on the quantized coefficients to output reconstructed coefficients. The inverse transform unit 111 performs one or more inverse transformations corresponding to the transformations in the transform unit 108 and outputs reconstructed residuals. The second adder 112 calculates a reconstructed CU by summing the reconstructed residuals and the prediction block of the CU from the prediction unit 102. The second adder 112 also passes its output to the prediction unit 102 to be used as reference for intra prediction. After all CUs in the picture or sub-picture have been reconstructed, the filter unit 113 performs loop filtering on the reconstructed picture or sub-picture. Here, the filter unit 113 includes one or more filters, such as a de-blocking filter, a sample adaptive offset (SAO) filter, an adaptive loop filter (ALF), a luma mapping with chroma scaling (LMCS) filter, a neural network-based filter, and the like. Alternatively, if the filter unit 113 determines that the CU is not to be used as a reference for coding of other CUs, the filter unit 113 performs loop filtering on one or more target pixels in the CU.

The output of the filter unit 113 is decoded pictures or sub-pictures that are buffered into the DPB unit 114. The DPB unit 114 outputs the decoded pictures or sub-pictures based on timing and control information. Here, the pictures stored in the DPB unit 114 may also be used as reference for the prediction unit 102 to perform inter prediction or intra prediction. Finally the entropy encoding unit 115 converts the parameters necessary for decoding the pictures (e.g., control parameters and supplementary information, etc.) from the encoder 100 to the binary form and signals such binary form into the bitstream according to the syntax structure of each data unit, i.e., the encoder 100 finally outputs the bitstream.

Further, the encoder 100 may include a first processor and a first memory that records a computer program. When the first processor reads and runs the computer program, the encoder 100 reads the input video and generates a corresponding bitstream. Alternatively, the encoder 100 may be a computing device having one or more chips. These units implemented as integrated circuits on a chip have connectivity and data exchange functions similar to the corresponding units in FIG. 8A.

Figure 8B:
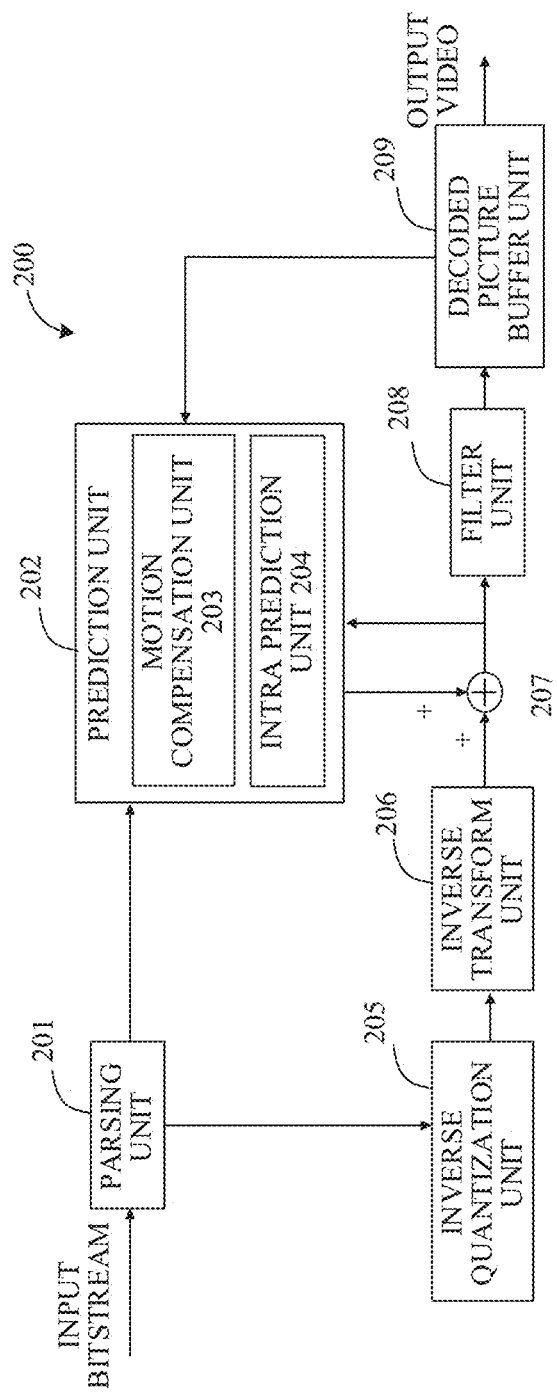
FIG. 8B is a schematic diagram of a system composition of a decoder provided in embodiments of the disclosure.

Referring to FIG. 8B, FIG. 8B illustrates an example block diagram of a decoder system composition of a decoder provided in embodiments of the present disclosure. As illustrated in FIG. 8B, the decoder 200 may include a parsing unit 201, a prediction unit 202, an inverse quantization unit 205, an inverse transform unit 206, an adder 207, a filter unit 208, and a DPB unit 209. Here, the input to the decoder 200 is a bitstream representing a compressed version of a video or a still picture, and the output of the decoder 200 may be a bitstream including a decoded video including a series of pictures or a decoded still picture.

The input bitstream of the decoder 200 may be a bitstream generated by the encoder 100. The parsing unit 201 parses the input bitstream and obtains values of syntax elements from the input bitstream. The parsing unit 201 converts the binary representation of the syntax element into a numeric value and sends the numeric value to a unit in the decoder 200 to obtain one or more decoded pictures. The parsing unit 201 may also parse the one or more syntax elements from the input bitstream to display the decoded picture.

During the decoding process of the decoder 200, the parsing unit 201 sends to the unit in the decoder 200 the values of the syntax elements and one or more variables set or determined according to the values of the syntax elements for obtaining one or more decoded pictures.

The prediction unit 202 determines a prediction block for a current decoding block (e.g., CU). Here, the prediction unit 202 may include a motion compensation unit 203 and an intra prediction unit 204. Specifically, when the inter decoding mode is indicated for decoding the current decoding block, the prediction unit 202 passes related parameters from the parsing unit 201 to the motion compensation unit 203 to obtain an inter prediction block. When the intra prediction mode (including a MIP mode indicated by an MIP index value) is indicated for decoding the current decoding block, the prediction unit 202 passes related parameters from the parsing unit 201 to the intra prediction unit 204 to obtain an intra prediction block.

The inverse quantization unit 205 has the same function as the inverse quantization unit 110 in the encoder 100. The inverse quantization unit 205 performs scaling operations on the quantization coefficients (i.e., levels) from the parsing unit 201 to obtain reconstructed coefficients.

The inverse transform unit 206 has the same function as the inverse transform unit 111 in the encoder 100. The inverse transform unit 206 performs one or more transformations (i.e., inverse operations of one or more transformations performed by the inverse transform unit 111 in the encoder 100) to obtain reconstructed residuals.

The adder 207 performs a summing operation on its inputs (the prediction block from the prediction unit 202 and the reconstructed residuals from the inverse transform unit 206) to obtain a reconstructed block of the current decoding block. The reconstructed block is also sent to the prediction unit 202 to be used as a reference for other blocks coded in the intra prediction mode.

After all CUs in the picture or sub-picture have been reconstructed, the filter unit 208 performs loop filtering on the reconstructed picture or sub-picture. The filtering unit 208 includes one or more filters, such as de-blocking filters, sampling adaptive compensation filters, adaptive loop filters, luminance mapping and chroma scaling filters, and neural network based filters. Alternatively, when the filter unit 208 determines that the reconstructed block is not to be used as a reference for decoding other blocks, the filter unit 208 performs loop filtering on one or more target pixels in the reconstructed block. Here, the output of the filtering unit 208 is a decoded picture or sub-picture, and the decoded picture or sub-picture is buffered into the DPB unit 209. The DPB unit 209 outputs the decoded picture or sub-picture based on timing and control information. The picture stored in the DPB unit 209 may also be used as a reference for performing inter prediction or intra prediction by the prediction unit 202.

Further, the decoder 200 may include a second processor and a second memory that records a computer program. When the first processor reads and runs the computer program, the decoder 200 reads the input bitstream and generates a corresponding decoded video. Alternatively, the decoder 200 may be a computing device having one or more chips. These units implemented as integrated circuits on a chip have connectivity and data exchange functions similar to the corresponding units in FIG. 8B.

It is also to be noted that when the embodiments of the present disclosure are applied to the encoder 100, a "current block" specifically refers to the current block to-be-encoded in the video picture (which may also be referred to as an "encoding block"). When the embodiments of the present disclosure are applied to the decoder 200, the "current block" specifically refers to the current block to-be-decoded in the video picture (which may also be referred to as a "decoding block").

Figure 9:
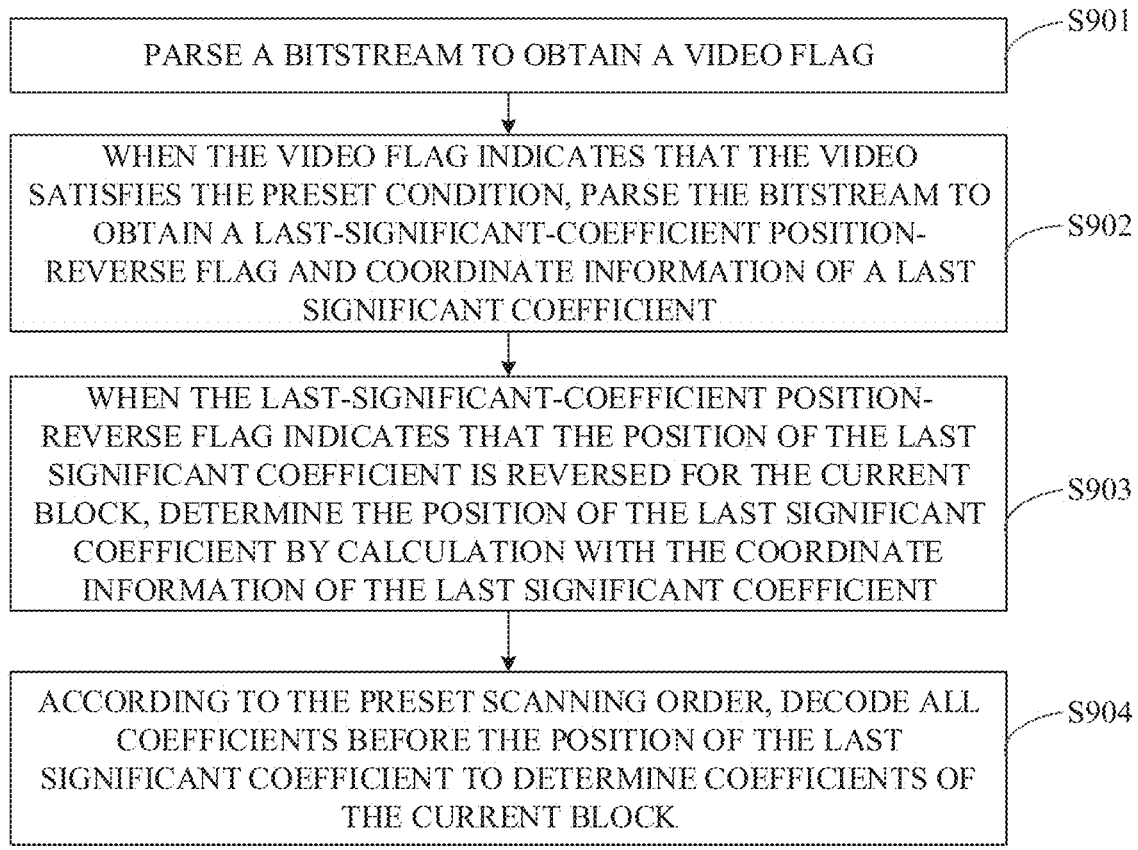
FIG. 9 is a schematic flowchart of a coefficient decoding method provided in embodiments of the disclosure.

In an embodiment of the present disclosure, referring to FIG. 9, FIG. 9 illustrates a schematic flowchart of a coefficient decoding method provided in embodiments of the present disclosure. As illustrated in FIG. 9, the method may include the following.

At S901, a bitstream is parsed to obtain a video flag.

It should be noted that the coefficient decoding method in the embodiments of the present disclosure is applied to a decoder. Specifically, based on the composition structure of the decoder 200 illustrated in FIG. 8B, the coefficient decoding method in the embodiments of the present disclosure is mainly applied to the "parsing unit 201" of the decoder 200. The parsing unit 201 may use an adaptive binary arithmetic coding mode based on a context model or a bypass mode to decode values of related flags (or syntax elements), and thus determine coefficients of a current block.

It should also be noted that coefficient coding, as commonly referred to in video standards, may include both encoding and decoding. Thus coefficient coding includes a coefficient encoding method at the encoder side and a coefficient decoding method at the decoder side. The embodiment of the present disclosure is described with respect to the coefficient decoding method at the decoder side.

Typically, such as for conventional video, the coefficient decoding method is the same as the methods available in the related art. However, for a certain case, such as a video coding scenario with high bit depth, high quality, high bit rate, or lossless compression, the embodiments of the present disclosure may modify the method of deriving a position of a last significant coefficient.

In embodiments of the present disclosure, first, it is necessary to determine whether a current video satisfies a preset condition, which may be represented by the video flag. In some embodiments, the bitstream may be parsed to obtain the video flag as follows.

If the video flag has a first value, it is determined that the video flag indicates that the video satisfies the preset condition.

Alternatively, if the video flag has a second value, it is determined that the video flag indicates that the video does not satisfy the preset condition.

Here, the first value is 1 and the second value is 0.

It should be noted that in another specific example, the first value may also be set to true and the second value may also be set to false. In yet another specific example, the first value may also be set to 0 and the second value may also be set to 1. Optionally, the first value may also be set to false and the second value may also be set to true. The present disclosure is not limited hereto.

It is also noted that the preset condition includes at least one of: high bit depth, high quality, high bitrate, high frame rate, or lossless compression.

That is, compared to conventional videos, the video described in the embodiments of the present disclosure has the characteristic of high bit depth, high quality, high bitrate, high frame rate, or lossless compression.

Further, the video flag may be a sequence level flag or even a higher level flag, such as video usability information (VUI), supplemental enhancement information (SEI), etc. Whether the video satisfies the preset condition may be determined by determining whether the video satisfies high bit depth, or whether the video satisfies high bitrate, or whether the video satisfies high quality, or whether the video satisfies lossless compression, etc. The following describes each of these four cases as examples.

In some embodiments, when the video flag is a high bit-depth flag, the method may further include the following.

If the high bit-depth flag indicates that the video satisfies high bit depth, it is determined that the video satisfies the preset condition.

In some embodiments, when the video flag is a high bitrate flag, the method may further include the following.

If the high bitrate flag indicates that the video satisfies high bitrate, it is determined that the video satisfies the preset condition.

In some embodiments, when the video flag is a high quality flag, the method may further include the following.

If the high quality flag indicates that the video satisfies high quality, it is determined that the video satisfies the preset condition.

In some embodiments, when the video flag is a lossless compression flag, the method may further include the following.

If the lossless compression flag indicates that the video satisfies lossless compression, it is determined that the video satisfies the preset condition.

Exemplarily, taking the sequence level as an example, the video flag may be the high bit-depth flag (represented by sps_high_bit_depth_flag) for indicating whether a current video sequence is a high bit-depth sequence. The video flag may also be the high bitrate flag (represented by sps_high_bit_rate_flag) for indicating whether the current video sequence is a high bitrate sequence. The video flag may also be another flag indicating high bit depth, high bitrate, high quality, or lossless compression, which is not specifically limited in the embodiments of the present disclosure.

At S902, when the video flag indicates that the video satisfies the preset condition, the bitstream is parsed to obtain a last-significant-coefficient position-reverse flag and coordinate information of a last significant coefficient.

It should be noted that when the video flag indicates that the video satisfies the preset condition, the bitstream may be further parsed to obtain the last-significant-coefficient position-reverse flag and the coordinate information of the last significant coefficient.

The coordinate information of the last significant coefficient may be determined from last_sig_coeff_x_prefix, last_sig_coeff_x_suffix, last_sig_coeff_y_prefix, and last_sig_coeff_y_suffix. Thus, in some embodiments, the bitstream may be parsed to obtain the coordinate information of the last significant coefficient as follows.

The bitstream is parsed to obtain prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient. The horizontal coordinate of the last significant coefficient is determined according to the prefix information of the horizontal coordinate of the last significant coefficient and the suffix information of the horizontal coordinate of the last significant coefficient. The vertical coordinate of the last significant coefficient is determined according to the prefix information of the vertical coordinate of the last significant coefficient and the suffix information of the vertical coordinate of the last significant coefficient. The coordinate information of the last significant coefficient is determined according to the horizontal coordinate of the last significant coefficient and the vertical coordinate of the last significant coefficient.

It should be noted that the prefix information of the horizontal coordinate of the last significant coefficient is represented by last_sig_coeff_x_prefix, which specifies the prefix of the horizontal (or column) coordinate of the last significant coefficient in preset scanning order within the current block. The prefix information of the vertical coordinate of the last significant coefficient is represented by last_sig_coeff_y_prefix, which specifies the prefix of the vertical (or row) coordinate of the last significant coefficient in preset scanning order within the current block. The suffix information of the horizontal coordinate of the last significant coefficient is represented by last_sig_coeff_x_suffix, which specifies the suffix of the horizontal (or column) coordinate of the last significant coefficient in preset scanning order within the current block. The suffix information of the vertical coordinate of the last significant coefficient is represented by last_sig_coeff_y_suffix, which specifies the suffix of the vertical (or row) coordinate of the last significant coefficient in preset scanning order within the current block.

It should also be noted that last_sig_coeff_x_prefix and last_sig_coeff_x_suffix specify an abscissa (i.e., horizontal coordinate) of the last significant coefficient, and last_sig_coeff_y_prefix and last_sig_coeff_y_suffix specify an ordinate (i.e., vertical coordinate) of the last significant coefficient. Thus the coordinate information of the last significant coefficient is obtained.

The last-significant-coefficient position-reverse flag may be represented by reverse_last_sig_coeff_flag. In embodiments of the present disclosure, the last-significant-coefficient position-reverse flag may be at least a flag of: a sequence level, a picture level, a slice level, or a block level, or even a higher level (e.g., VUI, SEI, etc.) flag, which will not be limited herein.

That is, the reverse_last_sig_coeff_flag may be a sequence-level or higher-level flag, or may also be a picture-level flag, a slice-level flag, a block-level flag, or the like. In addition, the block-level flag may include a flag of a largest coding unit (LCU) level or a flag of a coding unit (CU) level or other block-level flag, which is not limited in the embodiments of the present disclosure.

In some embodiments, the method may further include the following.

If the last-significant-coefficient position-reverse flag has a first value, it is determined that the last-significant-coefficient position-reverse flag indicates that the position of the last significant coefficient is reversed for the current block. If the last-significant-coefficient position-reverse flag has a second value, it is determined that the last-significant-coefficient position-reverse flag indicates that the position of the last significant coefficient is not reversed for the current block.

That is, in an example that the first value is 1 and the second value is 0, if reverse_last_sig_coeff_flag has the value 1, then it can be determined that reverse_last_sig_coeff_flag indicates that the position of the last significant coefficient is reversed for the current block. Alternatively, if reverse_last_sig_coeff_flag has the value 0, then it can be determined that reverse_last_sig_coeff_flag indicates that the position of the last significant coefficient is not reversed for the current block.

At S903, when the last-significant-coefficient position-reverse flag indicates that the position of the last significant coefficient is reversed for the current block, the position of the last significant coefficient is determined by calculation with the coordinate information of the last significant coefficient.

At S904, according to the preset scanning order, all coefficients before the position of the last significant coefficient are decoded to determine coefficients of the current block.

It is noted that in embodiments of the present disclosure, when the last-significant-coefficient position-reverse flag indicates that the position of the last significant coefficient is reversed for the current block, the coordinate information of the last significant coefficient may be determined as a horizontal distance and a vertical distance from the position of the last significant coefficient to a lower-right corner of the current block.

In this case, in some embodiments, the position of the last significant coefficient may be determined by calculation with the coordinate information of the last significant coefficient as follows.

A width and a height of the current block are determined. A horizontal coordinate of the last significant coefficient is obtained by subtracting, from the width of the current block, the horizontal distance from the position of the last significant coefficient to the lower-right corner of the current block. A vertical coordinate of the last significant coefficient is obtained by subtracting, from the height of the current block, the vertical distance from the position of the last significant coefficient to the lower-right corner of the current block. The position of the last significant coefficient is determined according to the horizontal coordinate of the last significant coefficient and the vertical coordinate of the last significant coefficient.

It should be noted that the coordinate information of the last significant coefficient is usually a horizontal distance and a vertical distance between the position of the last significant coefficient and an upper-left corner of the current block. For a conventional video, most of the significant coefficients are concentrated in the upper-left corner, and a large region in the lower-right corner has 0 coefficients. However, for high bit depth, high quality, or high bitrate video coding, a large number of significant coefficients also appear in the lower-right corner, such that the coordinate information of the last significant coefficient usually has larger values. In this case, in order to save overhead, coordinate transformation (which could be coordinate reversing calculation, that is, after the coordinate reversing the coordinate information of the last significant coefficient is the horizontal distance and vertical distance between the position of the last significant coefficient and the lower-right corner of the current block) is needed during coefficient encoding. In this case, coordinate reversing calculation is also needed during the coefficient decoding. After reversing again, the coordinate information of the last significant coefficient can be recovered as the horizontal and vertical distances between the position of the last significant coefficient and the upper-left corner of the current block. In this way, the position of the last significant coefficient can be determined, and then the coefficients before the position of the last significant coefficient in the current block can be decoded according to the preset scanning order.

It should also be noted that the current block here may be a block without zero-out transformation or a block after zero-out transformation. Taking the block after zero-out transformation as an example, the width of the current block is 1<<log 2ZoTbWidth, and the height of the current block is 1<<log 2ZoTbHeight. Then, in the case where reverse_last_sig_coeff_flag indicates that the position of the last significant coefficient is reversed for the current block (i.e., the value of reverse_last_sig_coeff_flag is 1):

LastSignificantCoeffX=(1<<log 2ZoTbWidth)−1−LastSignificantCoeffX;

LastSignificantCoeffY=(1<<log 2ZoTbHeight)−1−LastSignificantCoeffY.

In the above, (LastSignificantCoeffX, LastSignificantCoeffY) on the right side of the equation represents the coordinate information of the last significant coefficient obtained through decoding, and (LastSignificantCoeffX, LastSignificantCoeffY) on the left side of the equation represents the position of the last significant coefficient (which can also be regarded as target coordinate information of the last significant coefficient).

In some embodiments of the present disclosure, in the case where the value of reverse_last_sig_coeff_flag is 0, the method may further include the following.

When the last-significant-coefficient position-reverse flag indicates that the position of the last significant coefficient is not reversed for the current block, the coordinate information of the last significant coefficient is determined as the horizontal distance and the vertical distance from the position of the last significant coefficient to the upper-left corner of the current block. The position of the last significant coefficient is determined according to the horizontal distance and the vertical distance from the position of the last significant coefficient to the upper-left corner of the current block.

It should be noted that if the reverse_last_sig_coeff_flag indicates that the position of the last significant coefficient is not reversed for the current block, then the coordinate information of the last significant coefficient obtained through decoding may be regarded as the target coordinate information of the last significant coefficient. In the embodiments of the present disclosure, the target coordinate information of the last significant coefficient is the horizontal distance and the vertical distance between the position of the last significant coefficient and the upper-left corner of the current block.

Further, in some embodiments, the method may further include the following.

When the last-significant-coefficient position-reverse flag indicates that the position of the last significant coefficient is not reversed for the current block, the position of the last significant coefficient is determined directly according to the coordinate information of the last significant coefficient. All coefficients before the position of the last significant coefficient in the preset scanning order are decoded to determine the coefficients of the current block.

It is noted that the preset scanning order may be a diagonal order, a zigzag order, a horizontal order, a vertical order, a 4×4 sub-block scanning order or any other scanning order, which is not limited in the embodiments of the disclosure.

It should also be noted that after reverse_last_sig_coeff_flag is obtained, if the value of reverse_last_sig_coeff_flag is 1, i.e., the position of the last significant coefficient needs to be reversed, then after obtaining the coordinate information of the last significant coefficient through decoding, further calculation needs to be performed using the coordinate information of the last significant coefficient to determine the position of the last significant coefficient. Then all coefficients before the position of the last significant coefficient are decoded according to the preset scanning order. If the value of reverse_last_sig_coeff_flag is 0, i.e., there is no need to reverse the position of the last significant coefficient, then after the coordinate information of the last significant coefficient is obtained through decoding, the position of the last significant coefficient may be determined directly according to the coordinate information of the last significant coefficient. Then all the coefficients before the position of the last significant coefficient are decoded according to the preset scanning order.

Figure 10A:
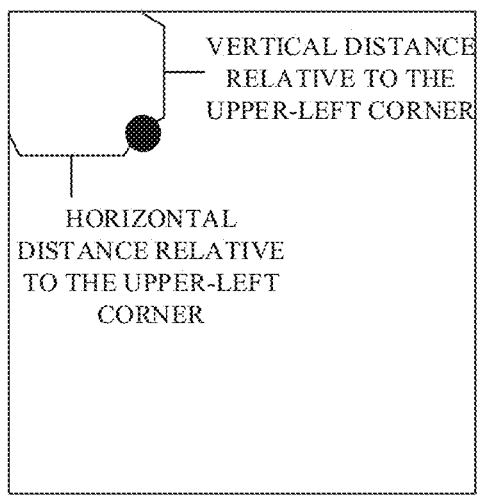
FIG. 10A is a schematic diagram of a position of a last significant coefficient relative to an upper-left corner of a current block provided in embodiments of the disclosure.
Figure 10B:
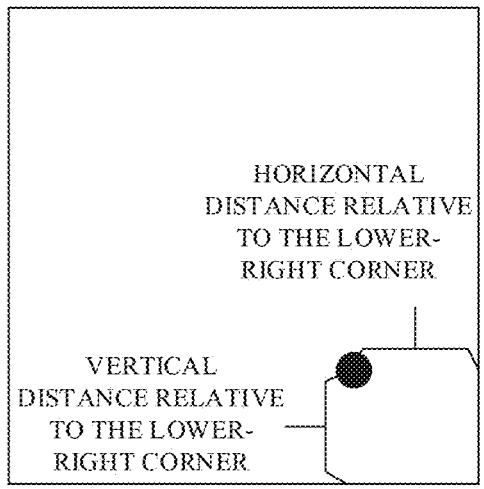
FIG. 10B is a schematic diagram of a position of a last significant coefficient relative to a lower-right corner of a current block provided in embodiments of the disclosure.

In this way, for certain cases, the embodiments of the present disclosure provide a modified method for deriving the position of the last significant coefficient during coefficient coding. That is to say, in usual cases, the coefficient coding method is still the same as the method available in the related art. For example, the certain cases may refer to high bit depth, high quality, or high bitrate video, or lossless compression in video coding. Typically, as illustrated in FIG. 10A, the horizontal coordinate of the position of the last significant coefficient, i.e., the horizontal distance relative to the upper-left corner of the current block, are encoded in last_sig_coeff_x_prefix and last_sig_coeff_x_suffix, while the vertical coordinate of the position of the last significant coefficient, i.e., the vertical distance relative to the upper-left corner of the current block, are encoded in last_sig_coeff_y_prefix and last_sig_coeff_y_suffix. In comparison, in the case of high bit depth, high quality, high bitrate, or lossless compression in video coding, the position of the last significant coefficient is generally close to a lower-right corner of a region of all possible significant coefficients of the current block. In this case, as illustrated in FIG. 10B, the horizontal distance of the position of the last significant coefficient relative to the lower-right corner of the region of all possible significant coefficients of the current block are encoded in last_sig_coeff_x_prefix and last_sig_coeff_x_suffix, and the vertical distance of the position of last significant coefficient relative to the lower-right corner of the region of all possible significant coefficients of the current block are encoded in last_sig_coeff_y_prefix, last_sig_coeff_y_suffix. For example, if the region of all possible significant coefficients of the current block is a rectangular region from (0, 0) to ((1<<log 2ZoTbWidth)−1, (1<<log 2ZoTbHeight)−1), then the last_sig_coeff_x_prefix and last_sig_coeff_x_suffix are encoded to represent the horizontal distance of the position of the last significant coefficient relative to the current block ((1<<log 2ZoTbWidth)−1, (1<<log 2ZoTbHeight)−1). last_sig_coeff_y_prefix and last_sig_coeff_y_suffix are encoded to represent the vertical distance of the position of the last significant coefficient relative to the current block ((1<<log 2ZoTbWidth)−1, (1<<log 2ZoTbHeight)−1).

Modifications to the semantics are as follows.

The value LastSignificantCoeffX of the horizontal (or column) coordinate of the last significant coefficient in the preset scanning order within the current block is derived as follows:

If last_sig_coeff_x_suffix is not present, then:
   LastSignificantCoeffX = last_sig_coeff_x_prefix;
Otherwise (last_sig_coeff_x_suffix is present):
   LastSignificantCoeffX = (1<<((last_sig_coeff_x_prefix>>1) −1)) * (2+(last_sig_coeff_x_prefix&1)) + last_sig_coeff_x_suffix.

-continued

If reverse_last_sig_coeff_flag is equal to 1, then:
   LastSignificantCoeffX = (1<<log2ZoTbWidth) −1−LastSignificantCoeffX.

The value LastSignificantCoeffY of the vertical (or row) coordinate of the last significant coefficient in the preset scanning order within the current block is derived as follows:

If last_sig_coeff_y_suffix is not present, then:
   LastSignificantCoeffY = last_sig_coeff_y_prefix;
Otherwise (last_sig_coeff_y_suffix is present), the following applies:
   LastSignificantCoeffY= (1<<((last_sig_coeff_y_prefix>>1) −1)) *
   (2+(last_sig_coeff_y_prefix&1)) + last_sig_coeff_y_suffix.
If reverse_last_sig_coeff_flag is equal to 1, then:
   LastSignificantCoeffY= (1<<log2ZoTbHeight) −1−LastSignificantCoeffY.

In the above, reverse_last_sig_coeff_flag is the last-significant-coefficient position-reverse flag, which indicates whether the position of the last significant coefficient needs to be reversed or not. If the value of reverse_last_sig_coeff_flag is 1, it indicates that the position of the last significant coefficient needs to be reversed; otherwise, it indicates that the position of the last significant coefficient does not need to be reversed.

It should also be noted that reverse_last_sig_coeff_flag may be a sequence-level or higher-level flag, or may also be a picture-level flag, a slice-level flag, a block-level flag, or the like. The block-level flag may include a LCU-level flag or a CU-level flag or other block-level flag.

In addition, reverse_last_sig_coeff_flag may depend on some other flags, such as high bit-depth flag or high bitrate flag. That is, when the value of the high bit-depth flag or the high bitrate flag is 1, it is necessary to decode the reverse_last_sig_coeff_flag; otherwise, it is not necessary to decode the reverse_last_sig_coeff_flag.

In a specific example, taking the sequence level as an example, assume that there is a sequence-level flag sps_high_bit_depth_flag indicating whether the current video sequence is a high bit-depth sequence. If the value of sps_high_bit_depth_flag is 1, then it indicates that the current video sequence is a high bit-depth sequence; otherwise, it indicates that the current video sequence is not a high bit-depth sequence. At the sequence level, if the value of sps_high_bit_depth flag is 1, then it is necessary to decode sps_reverse_last_sig_coeff_flag. Here, sps_reverse_last_sig_coeff_flag is the last-significant-coefficient position-reverse flag of the current sequence. If the value of sps_reverse_last_sig_coeff_flag is 1, then it indicates that the position of the last significant coefficient is reversed for blocks in the current sequence; otherwise (i.e., the value of sps_reverse_last_sig_coeff_flag is 0), it indicates that the position of the last significant coefficient is not reversed for blocks in the current sequence. The reverse_last_sig_coeff_flag in the above syntax table changes to sps_reverse_last_sig_coeff_flag.

The syntax elements are as follows (Sequence parameter set RBSP syntax), see Table 3.

TABLE 3

| ... | |
|---|---|
| sps_high_bit_depth_flag | u(1) |
| if( sps_high_bit_depth_flag ) | |
|    sps_default_last_coeff_enabled_flag | u(1) |
| ... | |

In another specific example, taking the slice level as an example, assume that there is a slice-level flag sps_high_bit_depth_flag indicating whether the current video sequence is a high bit-depth sequence or not. If the value of sps_high_bit_depth_flag is 1, then it indicates that the current video sequence is a high bit-depth sequence; otherwise, it indicates that the current video sequence is not a high bit-depth sequence. At the slice level, if the value of sps_high_bit_depth_flag is 1, then it is necessary to decode sh_reverse_last_sig_coeff_flag. Here, sh_reverse_last_sig_coeff_flag is the last-significant-coefficient position-reverse flag of the current slice. If the value of sh_reverse_last_sig_coeff_flag is 1, then it means that the position of the last significant coefficient is reversed for blocks in the current slice; otherwise (i.e., the value of sh_reverse_last_sig_coeff_flag is 0), it means that the position of the last significant coefficient is not reversed for blocks in the current slick. The reverse_last_sig_coeff_flag in the above syntax table changes to sh_reverse_last_sig_coeff_flag.

The syntax elements are as follows (Slice header syntax), see Table 4.

TABLE 4

| ... | |
|---|---|
| if( sps_high_bit_depth_flag ) | |
|    sh_reverse_last_sig_coeff_flag | u(1) |
| ... | |

It is also to be understood that when the video flag indicates that the video satisfies the preset condition, all the coefficients that may need to be coded are default to requiring coding. In other words, the position of the last significant coefficient is no longer used, but rather all the possible significant coefficients of the current block are scanned in the preset scanning order. Thus, embodiments of the present disclosure may also introduce a last-coefficient enabled flag for determining whether the last-coefficient position is used for the current block.

In some embodiments, when the video flag indicates that the video satisfies the preset condition, the method may further include the following.

The bitstream is parsed to obtain the last-coefficient enabled flag. When the last-coefficient enabled flag indicates that the last-coefficient position is used for the current block, all coefficients before a last-coefficient position are decoded according to the preset scanning order to determine the coefficients of the current block.

It is noted that the last-coefficient enabled flag may be represented by default_last_coeff_enabled_flag. In embodiments of the present disclosure, the last-coefficient enabled flag may be at least a flag of one of: a sequence level, a picture level, a slice level, and a block level; or even higher-level (e.g., VUI, SEI, etc.) flag, which is not limited herein.

That is, the default_last_coeff_enabled_flag may be a sequence-level or higher-level flag, or may also be a picture-level flag, a slice-level flag, a block-level flag, or the like. In addition, the block-level flag may include a LCU-level flag or a CU-level flag or other block-level flag, which is not limited herein.

In some embodiments, the method may further include the following.

When the last-coefficient enabled flag has a first value, it is determined that the last-coefficient enabled flag indicates the last-coefficient position is used for the current block. When the last-coefficient enabled flag has a second value, it is determined that the last-coefficient enabled flag indicates the last-coefficient position is not used for the current block.

Here, the first value is 1 and the second value is 0.

It is noted that in another specific example, the first value may also be set to true and the second value may also be set to false. In yet another specific example, the first value may also be set to 0 and the second value may also be set to 1. Optionally, the first value may also be set to false and the second value may also be set to true. The present disclosure is not limited hereto.

Thus, in an example that the first value is 1 and the second value is 0, if default_last_coeff_enabled_flag has the value of 1, then it can be determined that default_last_coeff_enabled_flag indicates that the last-coefficient position is used for the current block. Alternatively, if default_last_coeff_enabled_flag has the value 0, then it can be determined that default_last_coeff_enabled_flag indicates that the last-coefficient position is not used for the current block.

In the case where the last-coefficient position is used for the current block, all coefficients before the last-coefficient position may be decoded according to the preset scanning order, and thus determining the coefficients of the current block.

Further, in the case where the last-coefficient position is not used for the current block, i.e., the last-coefficient enabled flag has the value 0, in some embodiments, the method may further include the following.

The bitstream is parsed to obtain prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient. The position of the last significant coefficient is determined according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient. All coefficients before the position of the last significant coefficient are decoded according to the preset scanning order, thus determining the coefficients of the current block.

It should be noted that if the last-coefficient position is not used for the current block, then it is necessary to decode the position of the last significant coefficient. Specifically, last_sig_coeff_x_prefix, last_sig_coeff_x_suffix, last_sig_coeff_y_prefix, and last_sig_coeff_y_suffix are obtained by parsing the bitstream, and then the location of the last significant coefficient is determined based on the last_sig_coeff_x_prefix, last_sig_coeff_x_suffix, last_sig_coeff_y_prefix, and last_sig_coeff_y_suffix. Otherwise, if the last-coefficient position is used for the current block, it is unnecessary to determine the position of the last significant coefficient, and then it is no longer necessary to obtain last_sig_coeff_x_prefix, last_sig_coeff_x_suffix, last_sig_coeff_y_prefix, and last_sig_coeff_y_suffix.

It should also be noted that if the last-coefficient position is used for the current block, then all coefficients before the last-coefficient position may be decoded in the preset scanning order. If the last-coefficient position is not used for the current block, then all coefficients before the position of the last significant coefficient may be decoded in the preset scanning order. Here, the preset scanning order may be a diagonal order, a zigzag order, a horizontal order, a vertical order, a 4×4 sub-block scanning order or any other scanning order, which is not limited in the embodiments of the disclosure.

Further, for the last-coefficient position, in some embodiments, the last-coefficient position is a position at a lower-right corner of a matrix formed by all possible significant coefficients in the current block. Alternatively, the last-coefficient position is a last position in scanning all possible significant coefficients in the current block according to the preset scanning order.

It should be noted that in the embodiments of the disclosure, the last-coefficient position does not represent the position of the last significant coefficient. This is because the coefficient at the last-coefficient position may be 0, while the coefficient at the last-significant-coefficient position must not be 0.

In a particular example, the method may further include setting the position of the last significant coefficient to be the last-coefficient position.

That is, in the embodiments of the present disclosure, the position of the last significant coefficient can still be used, in which case the position of the last significant coefficient should be set to be the last position of all coefficients that may not be zero in the current block in the preset scanning order.

Further, the last-coefficient position may be represented by (LastCoeffX, LastCoeffY), i.e., the last position of all possible significant coefficients in the current block in the preset scanning order. In some embodiments, the method may further include the following.

A width and a height of a transform block obtained by a preset operation on the current block are determined. Coordinate information of a lower-right corner of the transform block is obtained by coordinate calculation according to the width and height of the transform block. The last-coefficient position is determined according to the coordinate information of the lower-right corner of the transform block.

Here, the preset operation includes at least a zero-out operation.

It should be noted that (LastCoeffX, LastCoeffY) represents the coordinate information of the lower-right corner of the transform block after zero-out, where (LastCoeffX, LastCoeffY) is derived as follows:

LastCoeffX=(1<<log 2ZoTbWidth)−1;

LastCoeffY=(1<<log 2ZoTbHeight)−1.

Thus, if default_last_coeff_enabled_flag has the value 1, then the last-coefficient position may be determined based on (LastCoeffX, LastCoeffY).

In a particular example, the position of the last significant coefficient is still used, in which case the position of the last significant coefficient may be set to be the last position of all possible zero coefficients in the current block in the preset scanning order. In some embodiments, the method may further include the following.

When the position of the last significant coefficient is set to be the last-coefficient position, the position of the last significant efficient is determined according to the coordinate information of the lower-right corner of the transform block.

That is, the position of the last significant coefficient may be represented by (LastSignificantCoeffX, LastSignificantCoeffY), where (LastSignificantCoeffX, LastSignificantCoeffY) is derived as follows:

LastSignificantCoeffX=(1<<log 2ZoTbWidth)−1;

LastSignificantCoeffY=(1<<log 2ZoTbHeight)−1.

In the above, (LastSignificantCoeffX, LastSignificantCoeffY) represents the coordinate information of the lower-right corner of the transform block after zero-out. If the value of default_last_coeff_enabled_flag is 1, then the position of the last significant coefficient may be determined based on (LastSignificantCoeffX, LastSignificantCoeffY).

In this way, for certain cases, coding is required by default for all coefficients that may need to be coded. That is to say, in usual cases, the coefficient coding method is still the same as the method available in the related art. For example, the certain cases may refer to high bit depth, high quality, or high bitrate video, or lossless compression in video coding. Coding is required by default for all coefficients that may need to be coded, i.e., the position of the last significant coefficient is no longer used, and instead, all the possible significant coefficients of the current block are scanned in the preset scanning order. In other words, the last position of coefficients that need to be coded is set to be the last position of all possible significant coefficients of the current block in the preset scanning order. This position is usually the lower-right corner of the matrix formed by all possible significant coefficients of the current block. Here, the position of the last coefficient to be coded is used instead of the position of the last significant coefficient. This is because the coefficient in the last-coefficient position to be coded may be 0, while the coefficient in the last-significant-coefficient position must not be 0.

In a special case, the position of the last significant coefficient is still used, in which case the position of the last significant coefficient is set to be the last position of all possible significant coefficients of the current block in the preset scanning order.

In addition, all possible significant coefficients of the current block in the preset scanning order are mention herein because besides the last significant coefficient, some coefficients are set default to 0 by some other techniques, e.g., the zero-out as mentioned above.

The modifications to the semantics are illustrated in Table 5.

TABLE 5

| | |
|---|---|
| ... | |
| if(!default_last_coeff_enabled_flag){ | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
| } | |
| ... | |

In embodiments of the present disclosure, a condition may be added before decoding the information required for the last significant coefficient. That is, only when default_last_coeff_enabled_flag is false (i.e., default_last_coeff_enabled_flag is equal to 0), it is necessary to decode syntax elements like last_sig_coeff_x_prefix, last_sig_coeff_y_prefix, last_sig_coeff_x_suffix, and last_sig_coeff_y_suffix. If default_last_coeff_enabled_flag is true (i.e., default_last_coeff_enabled_flag is equal to 1), then there is no need to decode syntax elements like last_sig_coeff_x_prefix, last_sig_coeff_y_prefix, last_sig_coeff_x_suffix, and last_sig_coeff_y_suffix.

Here, default_last_coeff_enabled_flag is a default last-coefficient enabled flag, which is used to indicate whether or not to use the default last coefficient. If the value of default_last_coeff_enabled_flag is 1, it indicates that the default last coefficient position is used, i.e., the last-coefficient position to be coded is set to be the last position of all possible significant coefficients in the current block in the preset scanning order. Otherwise, it indicates that the default last-coefficient position is not used.

If the value of default_last_coeff_enabled_flag is 1, then the last-coefficient position (LastCoeffX, LastCoeffY) is default to the last position of all possible significant coefficients in the current block in the preset scanning order. All coefficients before (LastCoeffX, LastCoeffY) in the preset scanning order need to be scanned. In embodiments of the present disclosure, (LastCoeffX, LastCoeffY) is derived as follows:

LastCoeffX=(1<<log 2ZoTbWidth)−1;

LastCoeffY=(1<<log 2ZoTbHeight)−1.

(LastCoeffX, LastCoeffY) is the coordinate information of the lower-right corner position of the transform block after zero-out.

A special case is to still use the position of the last significant coefficient, which is set to be the last position of all possible significant coefficients in the current block in the preset scanning order. In embodiments of the present disclosure, the position of the last significant coefficient (LastSignificantCoeffX, LastSignificantCoeffY) is derived as follows:

LastSignificantCoeffX=(1<<log 2ZoTbWidth)−1;

LastSignificantCoeffY=(1<<log 2ZoTbHeight)−1.

(LastSignificantCoeffX, LastSignificantCoeffY) is the coordinate information of the lower-right corner of the transform block after zero-out.

It should also be noted that default_last_coeff_enabled_flag may be a sequence-level or higher-level flag, or may also be a picture-level flag, a slice-level flag, a block-level flag, or the like. In addition, the block-level flag may include a LCU-level flag or a CU-level flag or other block-level flag.

In addition, default_last_coeff_enabled_flag may depend on some other flags, such as high bit-depth flag or high bitrate flag. That is, when the value of the high bit-depth flag or the high bitrate flag is 1, it is necessary to decode the default_last_coeff_enabled_flag; otherwise, it is not necessary to decode the default_last_coeff_enabled_flag.

In a specific example, taking the sequence level as an example, assume that there is a sequence-level flag sps_high_bit_depth_flag indicating whether the current video sequence is a high bit-depth sequence. If the value of sps_high_bit_depth_flag is 1, then it indicates that the current video sequence is a high bit-depth sequence; otherwise, it indicates that the current video sequence is not a high bit-depth sequence. At the sequence level, if the value of sps_high_bit_depth_flag is 1, then it is necessary to decode sps_default_last_coeff_enabled_flag. Here, sps_default_last_coeff_enabled_flag is the default last-coefficient enabled flag of the current sequence. If the value of sps_default_last_coeff_enabled_flag is 1, then it indicates that the default last-coefficient is used for blocks in the current sequence; otherwise (i.e., the value of sps_default_last_coeff_enabled_flag is 0), it indicates that default last-coefficient is not used for blocks in the current sequence. The default_last_coeff_enabled_flag in the above syntax table changes to sps_default_last_coeff_enabled_flag.

The syntax elements are as follows (Sequence parameter set RBSP syntax), see Table 6.

TABLE 6

| ... | |
|---|---|
| sps_high_bit_depth_flag | u(1) |
| if( sps_high_bit_depth_flag ) | |
|    sps_default_last_coeff_enabled_flag | u(1) |
| ... | |

In another specific example, taking the slice level as an example, assume that there is a slice-level flag sps_high_bit_depth_flag indicating whether the current video sequence is a high bit-depth sequence or not. If the value of sps_high_bit_depth_flag is 1, then it indicates that the current video sequence is a high bit-depth sequence; otherwise, it indicates that the current video sequence is not a high bit-depth sequence. At the slice level, if the value of sps_high_bit_depth_flag is 1, then it is necessary to decode sh_default_last_coeff_enabled_flag. Here, sh_default_last_coeff_enabled_flag is the default last-coefficient enabled flag of the current slice. If the value of sh_default_last_coeff_enabled_flag is 1, then it means that the default last-coefficient is used for blocks in the current slice; otherwise (i.e., the value of sh_default_last_coeff_enabled_flag is 0), it means that the default last-coefficient is not used for blocks in the current slice. The default_last_coeff_enabled_flag in the above syntax table changes to sh_default_last_coeff_enabled_flag.

The syntax elements are as follows (Slice header syntax), see Table 7.

TABLE 7

| ... | |
|---|---|
| if( sps_high_bit_depth_flag ) | |
|    sh_default_last_coeff_enabled_flag | u(1) |
| ... | |

It is also understood that when the video flag indicates that the video satisfies the preset condition, coding may be required by default for all sub-blocks that are scanned. In this case, there is no need to transmit sb_coded_flag in the bitstream, i.e., neither the encoder nor the decoder needs to process this flag, which can speed up coding. Therefore, in embodiments of the present disclosure, a sub-block default coded flag is introduced for determining whether the sub-block to-be-decoded in the current block defaults to coding.

In some embodiments, when the video flag indicates that the video satisfies the preset condition, the method may further include the following.

The bitstream is parsed to obtain the sub-block default coded flag. When the sub-block default coded flag indicates that the sub-block to-be-encoded defaults to coding, it is determined that a sub-block coded flag has a first value and all coefficients in a sub-block to-be-decoded in the current block are decoded.

It is noted that the sub-block default coded flag may be represented by default_sb_coded_flag. In embodiments of the present disclosure, the sub-block default coded flag is at least a flag of one of: a sequence level, a picture level, a slice level, and a block level, or may even be a flag of a higher level (e.g., VUI, SEI, etc.), which is not limited herein.

That is, the default_sb_coded_flag may be a sequence-level or higher-level flag, or may also be a picture-level flag, a slice-level flag, a block-level flag, or the like. In addition, the block-level flag may include a LCU-level flag or a CU-level flag or other block-level flag, which is not limited herein.

In some embodiments, the method may further include the following.

If the sub-block default coded flag has the first value, it is determined that the sub-block default coded flag indicates that the sub-block to-be-encoded defaults to coding If the sub-block default coded flag has a second value, it is determined that the sub-block default coded flag indicates that the sub-block to-be-encoded does not default to coding.

Here, the first value is 1 and the second value is 0.

It is noted that in another specific example, the first value may also be set to true and the second value may also be set to false. In yet another specific example, the first value may also be set to 0 and the second value may also be set to 1. Optionally, the first value may also be set to false and the second value may also be set to true. The present disclosure is not limited hereto.

Thus, in an example that the first value is 1 and the second value is 0, if default_sb_coded_flag has the value 1, then it can be determined that default_sb_coded_flag indicates that the sub-block to-be-decoded defaults to requiring coding. Alternatively, if default_sb_coded_flag has the value 0, then it can be determined that default_sb_coded_flag indicates that the sub-block to-be-encoded does not default to requiring coding.

In the case that the sub-block to-be-decoded defaults to requiring coding, the value of default_sb_coded_flag is 1, which means that the value of sb_coded_flag is 1, i.e., there is no need to decode sb_coded_flag. In this case, decoding of all coefficients within the sub-block to-be-decoded is required by default.

Further, in the case where the sub-block to-be-decoded does not default to requiring coding, i.e. where the value of default_sb_coded_flag is 0, in some embodiments, the method may further include the following.

The bitstream is parsed to obtain the sub-block coded flag. All coefficients in the sub-block to-be-decoded are decoded when the sub-block coded flag has the first value.

It should be noted that if the sub-block to-be-decoded does not default to requiring coding, then the sub-block coded flag needs to-be-decoded, according to which whether to decode all coefficients within the sub-block to-be-decoded is determined.

Further, for the sub-block coded flag, the method may further include the following.

If the sub-block coded flag has the first value, it is determined to decode all coefficients within the sub-block. Alternatively, if the sub-block coded flag has the second value, it is determined that all coefficients within the sub-block to-be-decoded are zero.

In embodiments of the present disclosure, the sub-block coded flag may be represented by sb_coded_flag. Taking the first value of 1 and the second value of 0 as an example, if the value of sb_coded_flag is 1, then it may be determined that all coefficients within the sub-block to-be-decoded need to be decoded. Alternatively, if the value of sb_coded_flag is 0, then it may be determined that there is no need to decode all coefficients within the sub-block to-be-decoded, in which case all coefficients within the sub-block to-be-decoded are zero.

In this way, for certain cases, during coefficient coding, all scanned sub-blocks default to requiring coding, or all scanned sub-blocks contain significant coefficients by default. That is to say, in usual cases, the coefficient coding method is still the same as the method available in the related art. For example, the certain cases may refer to high bit depth, high quality, or high bitrate video, or lossless compression in video coding. In this case, there are many significant coefficients and almost all of the scanned sub-blocks require to be coded, or in other words, almost all of the scanned sub-blocks contain significant coefficients. As such, there is no need to transmit the sb_coded_flag in the bitstream, and the encoder/decoder does not need to process this flag, thus enabling faster coding speed. There is also a small compression performance gain in this case due to the removal of an almost non-existent flag.

The modifications to the semantics are shown in Table 8.

TABLE 8

```
...
if( i<lastSubBlock && i>0 ) {
    if(!default_sb_coded_flag) {
        sb_coded_flag[xS][yS]           ae(v)
    }
    inferSbDcSigCoeffFlag = 1
}
...
``` default_sb_coded_flag is the flag indicating whether a sub-block defaults to coding. If the value of default_sb_coded_flag is 1, then it can be determined that the value of sb_coded_flag[xS][yS] is 1, in which case there is no need to decode sb_coded_flag[xS][yS] from the bitstream. Otherwise (the value of default_sb_coded_flag is 0), it is still necessary to decode sb_coded_flag[xS][yS] from the bitstream.

It should also be noted that default_sb_coded_flag may be a sequence-level or higher-level flag, or may also be a picture-level flag, a slice-level flag, a block-level flag, or the like. In addition, the block-level flag may include a LCU-level flag or a CU-level flag or other block-level flag.

In addition, default_sb_coded_flag may depend on some other flags, such as high bit-depth flag or high bitrate flag. That is, when the value of the high bit-depth flag or the high bitrate flag is 1, it is necessary to decode the default_sb_coded_flag; otherwise, it is not necessary to decode the default_sb_coded_flag.

In one specific example, taking the sequence level as an example, assume that there is a sequence-level flag sps_high_bit_depth_flag indicating whether the current video sequence is a high bit-depth sequence. If the value of sps_high_bit_depth_flag is 1, then it indicates that the current video sequence is a high bit-depth sequence; otherwise, it indicates that the current video sequence is not a high bit-depth sequence. At the sequence level, if the value of sps_high_bit_depth_flag is 1, then it is necessary to decode sps_default_sb_coded_flag. Here, the sps_default_sb_coded_flag is a flag indicating whether coding is required by default for the sub-blocks for the current sequence. If the value of sps_default_sb_coded_flag is 1, then it means that the sub-blocks of the blocks within the current sequence default to requiring coding; otherwise (i.e., the value of sps_default_sb_coded_flag is 0), it means that the sub-blocks of the blocks within the current sequence do not default to requiring coding. The default_sb_coded_flag in the above syntax table changes to sps_default_sb_coded_flag.

The syntax elements are as follows (Sequence parameter set RBSP syntax), see Table 9.

TABLE 9

| ... | |
| --- | --- |
| sps_high_bit_depth_flag | u(1) |
| if( sps_high_bit_depth_flag ) | |
|     sps_default_sb_coded_flag | u(1) |
| ... | |

In another specific example, taking the slice level as an example, assume that there is a slice-level flag sps_high_bit_depth_flag indicating whether the current video sequence is a high bit-depth sequence or not. If the value of sps_high_bit_depth_flag is 1, then it indicates that the current video sequence is a high bit-depth sequence; otherwise, it indicates that the current video sequence is not a high bit-depth sequence. At the slice level, if the value of sps_high_bit_depth_flag is 1, then sh_default_sb_coded_flag needs to be decoded. Here, sh_default_sb_coded_flag is the flag indicating whether coding is required by default for the sub-blocks for the current slice. If the value of sh_default_sb_coded_flag is 1, then it means that the sub-blocks of the blocks within the current slice default to requiring coding; otherwise (i.e., the value of sh_default_sb_coded_flag is 0), it means that the sub-blocks of the blocks within the current slice do not default to requiring coding. The default_sb_coded_flag in the above syntax table changes to sh_default_sb_coded_flag.

The syntax elements are as follows (Slice header syntax), see Table 10.

TABLE 10

| ... | |
| --- | --- |
| if( sps_high_bit_depth_flag ) | |
|     sh_reverse_last_sig_coeff_flag | u(1) |
| ... | |

It can be understood that the embodiments of the present disclosure relate to three optimization methods, specifically as follows.

Method 1: for certain cases, during coefficient coding, coding is required by default for all coefficients that may need to be coded. That is to say, in usual cases, the coefficient coding method is still the same as the method available in the related art. For example, the certain cases may refer to high bit depth, high quality, or high bitrate video, or lossless compression in video coding. Coding is required by default for all coefficients that may need to be coded, i.e., the position of the last significant coefficient is no longer used, and instead, all the possible significant coefficients of the current block are scanned in the preset scanning order. In other words, the last position of coefficients that need to be coded is set to be the last position of all possible significant coefficients of the current block in the preset scanning order. Here, the position of the last coefficient to be coded is used instead of the position of the last significant coefficient. This is because the coefficient in the last-coefficient position to be coded may be 0, while the coefficient in the last-significant-coefficient position must not be 0.

Further, in a special case, the position of the last significant coefficient is still used, in which case the position of the last significant coefficient is set to be the last position of all possible significant coefficients of the current block in the preset scanning order.

Method 2: for certain cases, during coefficient coding, the method for deriving the position of the last significant coefficient is modified. That is to say, in usual cases, the coefficient coding method is still the same as the method available in the related art. For example, the certain cases may refer to high bit depth, high quality, or high bitrate video, or lossless compression in video coding. Typically, the horizontal coordinate of the position of the last significant coefficient, i.e., the horizontal distance relative to the upper-left corner of the current block, are encoded in last_sig_coeff_x_prefix and last_sig_coeff_x_suffix, while the vertical coordinate of the position of the last significant coefficient, i.e., the vertical distance relative to the upper-left corner of the current block, are encoded in last_sig_coeff_y_prefix and last_sig_coeff_y_suffix. In comparison, in the case of high bit depth, high quality, high bitrate, or lossless compression in video coding, the position of the last significant coefficient is generally close to a lower-right corner of a region of all possible significant coefficients of the current block. In this case, the horizontal distance of the position of the last significant coefficient relative to the lower-right corner of the region of all possible significant coefficients of the current block are encoded in last_sig_coeff_x_prefix and last_sig_coeff_x_suffix, and the vertical distance of the position of last significant coefficient relative to the lower-right corner of the region of all possible significant coefficients of the current block are encoded in last_sig_coeff_y_prefix, last_sig_coeff_y_suffix. For example, if the region of all possible significant coefficients of the current block is a rectangular region from (0, 0) to ((1<<log 2ZoTbWidth)−1, (1<<log 2ZoTbHeight)−1), then the last_sig_coeff_x_prefix and last_sig_coeff_x_suffix are encoded to represent the horizontal distance of the position of the last significant coefficient relative to the current block ((1<<log 2ZoTbWidth)−1, (1<<log 2ZoTbHeight)−1). last_sig_coeff_y_prefix and last_sig_coeff_y_suffix are encoded to represent the vertical distance of the position of the last significant coefficient relative to the current block ((1<<log 2ZoTbWidth)−1, (1<<log 2ZoTbHeight)−1).

Method 3: for certain cases, during coefficient coding, all scanned sub-blocks default to requiring coding, or in other words, all scanned sub-blocks contain significant coefficients by default. That is to say, in usual cases, the coefficient coding method is still the same as the method available in the related art. For example, the certain cases may refer to high bit depth, high quality, or high bitrate video, or lossless compression in video coding. In this case, there are many significant coefficients and almost all of the scanned sub-blocks require to be coded, or in other words, almost all of the scanned sub-blocks contain significant coefficients. As such, there is no need to transmit the sb_coded_flag in the bitstream, and the encoder/decoder does not need to process this flag.

For the above three methods, in the video coding scenarios with high bit depth, high bitrate, high quality, or lossless compression, since the coefficient distribution pattern is different from that of conventional video scenarios, during coefficient coding, by reducing or even eliminating the number of syntax elements coded in context mode, such as syntax elements about the position of the last significant coefficient, the sub-block coded flags, etc., the throughout and coding speed can be improved for coefficient coding. In addition, since these flags have less use in high bit depth, high bitrate, high quality or lossless video coding, removing these flags will not reduce the compression efficiency but improve the compression efficiency to some extent instead.

In addition, in the embodiments of the present disclosure, taking the sequence level as an example, the sequence level flag sps_high_bit_depth_flag indicating whether the current video sequence is a high bit-depth sequence, may also be replaced with the flag sps_high_bit_rate_flag indicating whether the current video sequence is a high bitrate sequence, or may also be replaced with another flag indicating high bit-width, high bitrate, high quality or lossless coding, etc.

It should also be noted that the coefficient decoding methods of the embodiments of the present disclosure are described based on an example that the technical solution is used for all components in the video, where all components refer to, e.g., R, G, and B in the RGB format video, or Y, U, and V (Y, Cb, and Cr) in the YUV format video, and the like. Optionally, the coefficient decoding method of the embodiments of the present disclosure may be used only for a certain component, such as only for the Y component of the YUV format. Optionally, the coefficient decoding method of the embodiments of the present disclosure may be used for each component separately, i.e., whether to use for each component may be controlled separately.

The present embodiments provide a coefficient decoding method applied to a decoder. A bitstream is parsed to obtain a video flag. When the video flag indicates that a video satisfies a preset condition, the bitstream is parsed to obtain a last-significant-coefficient position-reverse flag and coordinate information of a last significant coefficient. When the last-significant-coefficient position-reverse flag indicates that a position of the last significant coefficient is reversed for a current block, the position of the last significant coefficient is determined by calculation with the coordinate information of the last significant coefficient. According to a preset scanning order, all coefficients before the position of the last significant coefficient are decoded to determine coefficients of the current block. In this way, in the video coding scenarios with high bit depth, high bitrate, high quality, or lossless compression, since the coefficient distribution pattern is different from that of conventional video scenarios, during coefficient coding, by reducing or even eliminating the number of syntax elements coded in context mode, such as syntax elements about the position of the last significant coefficient, the sub-block coded flags, etc., or further performing coordinate transformation in the case that the values of the coordinates of the last significant coefficient are too large, the overhead caused by coding in the bitstream can be reduced, and thus the throughput and coding speed of coefficient coding can be improved. In addition, the compression efficiency can also be improved since the reduced or eliminated syntax elements have less impact in the video coding with high bit-depth, high bit-rate, high-quality, or lossless compression.

Figure 11:
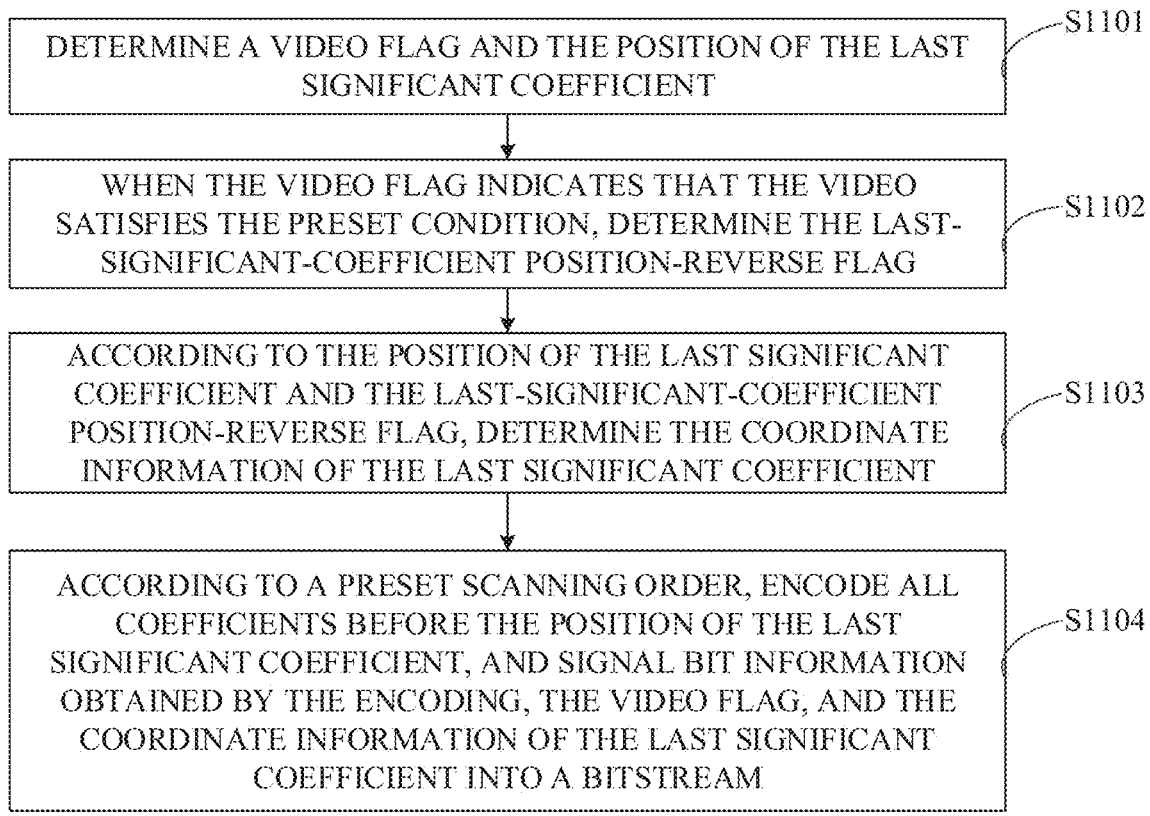
FIG. 11 is a schematic flowchart of a coefficient encoding method provided in embodiments of the disclosure.

In another embodiment of the present disclosure, FIG. 11 illustrates a schematic flowchart of a coefficient encoding method provided in embodiments of the disclosure. As illustrated in FIG. 11, the method may include the following.

At S1101, a video flag and a position of a last significant coefficient is determined.

At S1102, when the video flag indicates that a video satisfies a preset condition, a last-significant-coefficient position-reverse flag is determined.

At S1103, coordinate information of the last significant coefficient is determined according to the position of the last significant coefficient and the last-significant-coefficient position-reverse flag.

At S1104, all coefficients before the position of the last significant coefficient are encoded according to a preset scanning order, and bit information obtained by the encoding, the video flag, and the coordinate information of the last significant coefficient are signalled into a bitstream.

It should be noted that the coefficient encoding method in the embodiments of the present disclosure is applied to an encoder. Specifically, based on the composition structure of the encoder 100 illustrated in FIG. 8A, the coefficient encoding method in the embodiments of the present disclosure is mainly applied to the "entropy encoding unit 115" of the encoder 100. The entropy encoding unit 115 may use an adaptive binary arithmetic coding mode based on a context model or a bypass mode to perform entropy encoding on related flags (or syntax elements) and then signal into the bitstream.

It should also be noted that coefficient coding, as commonly referred to in video standards, may include both encoding and decoding. Thus coefficient coding includes a coefficient encoding method at the encoder side and a coefficient decoding method at the decoder side. The embodiment of the present disclosure is described with respect to the coefficient encoding method at the encoder side.

Typically, such as for conventional video, the coefficient encoding method is the same as the methods available in the related art. However, for a certain case, such as a video coding scenario with high bit depth, high quality, high bit rate, or lossless compression, the embodiments of the present disclosure may modify the method of deriving the position of the last significant coefficient. In this case, in the embodiments of the present disclosure, the video flag and the last-significant-coefficient position-reverse flag need to be introduced to determine the position of the last significant coefficient, and then all coefficients before the position of the last significant coefficient within the current block are encoded according to a preset scanning order In embodiments of the present disclosure, first, it is necessary to determine whether a current video satisfies the preset condition, which may be represented by the video flag. In some embodiments, t the video flag may be determined as follows.

When the video satisfies the preset condition, the video flag is determined to be a first value. Alternatively, when the video does not satisfy the preset condition, the video flag is determined to be a second value.

Here, the first value is 1 and the second value is 0.

It should be noted that in another specific example, the first value may also be set to true and the second value may also be set to false. In yet another specific example, the first value may also be set to 0 and the second value may also be set to 1. Optionally, the first value may also be set to false and the second value may also be set to true. The present disclosure is not limited hereto.

It is also noted that the preset condition includes at least one of: high bit depth, high quality, high bitrate, high frame rate, or lossless compression.

Further, the video flag may be a sequence level flag or even a higher level flag, such as VUI, SEI, etc. Whether the video satisfies the preset condition may be determined by determining whether the video satisfies high bit depth, or whether the video satisfies high bitrate, or whether the video satisfies high quality, or whether the video satisfies lossless compression, etc. The following describes each of these four cases as examples.

In some embodiments, when the video flag is a high bit-depth flag, the method may further include the following.

If the video satisfies high bit depth, it is determined that the high bit-depth flag indicates that the video satisfies the preset condition.

In some embodiments, when the video flag is a high bitrate flag, the method may further include the following.

If the video satisfies high bitrate, it is determined that the high bitrate flag indicates that the video satisfies the preset condition.

In some embodiments, when the video flag is a high quality flag, the method may further include the following.

If the video satisfies high quality, it is determined that the high quality flag indicates that the video satisfies the preset condition.

In some embodiments, when the video flag is a lossless compression flag, the method may further include the following.

If the video satisfies lossless compression, it is determined that the lossless compression flag indicates that the video satisfies the preset condition.

Exemplarily, taking the sequence level as an example, the video flag may be the high bit-depth flag (represented by sps_high_bit_depth_flag) for indicating whether a current video sequence is a high bit-depth sequence. The video flag may also be the high bitrate flag (represented by sps_high_bit_rate_flag) for indicating whether the current video sequence is a high bitrate sequence. The video flag may also be another flag indicating high bit depth, high bitrate, high quality, or lossless compression, which is not specifically limited in the embodiments of the present disclosure.

Further, regarding the last-significant-coefficient position-reverse flag, the last-significant-coefficient position-reverse flag may be determined as following.

If the position of the last significant coefficient is reversed for the current block, the last-significant-coefficient position-reverse flag is determined to be a first value. If the position of the last significant coefficient is not reversed for the current block, the last-significant-coefficient position-reverse flag is determined to be a second value.

In embodiments of the present disclosure, the last-significant-coefficient position-reverse flag may be represented by reverse_last_sig_coeff_flag. Here, the last-significant-coefficient position-reverse flag may be at least a flag of: a sequence level, a picture level, a slice level, or a block level, or even a higher level (e.g., VUI, SEI, etc.) flag, which will not be limited herein.

That is, the reverse_last_sig_coeff_flag may be a sequence-level or higher-level flag, or may also be a picture-level flag, a slice-level flag, a block-level flag, or the like. In addition, the block-level flag may include a LCU-level flag, a CU-level flag, or other block-level flag, which is not limited in the embodiments of the present disclosure.

As such, in an example that the first value is 1 and the second value is 0, if it is determined that the position of the last significant coefficient is reversed for the current block, then reverse_last_sig_coeff_flag has the value 1. Alternatively, if it is determined that the position of the last significant coefficient is not reversed for the current block, then reverse_last_sig_coeff_flag has the value 0.

Further, the position of the last significant coefficient may include an initial horizontal coordinate and an initial vertical coordinate of the last significant coefficient. In a case that the initial horizontal coordinate is a horizontal distance from the position of the last significant coefficient to an upper-left corner of the current block and the initial vertical coordinate is a vertical distance from the position of the last significant coefficient to the upper-left corner of the current block, the coordinate information of the last significant coefficient may be determined according to the position of the last significant coefficient and the last-significant-coefficient position-reverse flag as following.

If the last-significant-coefficient position-reverse flag has a first value, the coordinate information of the last significant coefficient is determined by calculation according to the initial horizontal coordinate and the initial vertical coordinate of the last significant coefficient. Alternatively, if the last-significant-coefficient position-reverse flag has a second value, the coordinate information of the last significant coefficient is determined directly according to the initial horizontal coordinate and the initial vertical coordinate of the last significant coefficient.

In other words, in some embodiments, the method may further include the following.

If the last-significant-coefficient position-reverse flag has a first value, the coordinate information of the last significant coefficient is determined as a horizontal distance and a vertical distance from the position of the last significant coefficient to a lower-right corner of the current block. Alternatively, if the last-significant-coefficient position-reverse flag has a second value, the coordinate information of the last significant coefficient is determined as the horizontal distance and the vertical distance from the position of the last significant coefficient to the upper-left corner of the current block.

In other words, the coordinate information of the last significant coefficient is usually the horizontal distance and the vertical distance between the position of the last significant coefficient and the upper-left corner of the current block. For a conventional video, most of the significant coefficients are concentrated in the upper-left corner, and a large region in the lower-right corner has 0 coefficients. However, for high bit depth, high quality, or high bitrate video coding, a large number of significant coefficients also appear in the lower-right corner, such that the coordinate information of the last significant coefficient usually has larger values. In this case, in order to save overhead, coordinate transformation (which could be coordinate reversing calculation, that is, after the coordinate reversing the coordinate information of the last significant coefficient is the horizontal distance and vertical distance between the position of the last significant coefficient and the lower-right corner of the current block) is needed during coefficient encoding. In this case, coordinate reversing calculation is also needed during the coefficient decoding at the decoder. After reversing again, the coordinate information of the last significant coefficient can be recovered as the horizontal and vertical distances between the position of the last significant coefficient and the upper-left corner of the current block. In this way, the position of the last significant coefficient can be determined.

Further, in some embodiments, the coordinate information of the last significant coefficient may be determined according to the initial horizontal coordinate and the initial vertical coordinate of the last significant coefficient as follows.

A width and a height of the current block are determined. A horizontal coordinate of the last significant coefficient is obtained by subtracting the initial horizontal coordinate of the last significant coefficient from the width of the current block. A vertical coordinate of the last significant coefficient is obtained by subtracting the initial vertical coordinate of the last significant coefficient from the height of the current block. The coordinate information of the last significant coefficient is determined according to the horizontal coordinate of the last significant coefficient and the vertical coordinate of the last significant coefficient.

It should also be noted that the current block here may be a block without zero-out transformation or a block after zero-out transformation. Taking the block after zero-out transformation as an example, the width of the current block is 1<<log 2ZoTbWidth, and the height of the current block is 1<<log 2ZoTbHeight. Then, in the case where reverse_last_sig_coeff_flag indicates that the position of the last significant coefficient is reversed (i.e., the value of reverse_last_sig_coeff_flag is 1):

$$LastSignificantCoeffX=(1<<\log 2ZoTbWidth)-1-LastSignificantCoeffX;$$

$$LastSignificantCoeffY=(1<<\log 2ZoTbHeight)-1-LastSignificantCoeffY.$$

In the above, (LastSignificantCoeffX, LastSignificantCoeffY) on the right side of the equation represents the coordinate information of the last significant coefficient obtained directly (that is, the initial horizontal coordinate and the initial vertical coordinate of the last significant coefficient), and (LastSignificantCoeffX, LastSignificantCoeffY) on the left side of the equation represents the coordinate information of the last significant coefficient after the position reversing (that is, the coordinate information of the last significant coefficient that is signalled into the bitstream in the case that the position of the last significant coefficient is reversed for the current block).

In some embodiments, the coordinate information of the last significant coefficient may be signalled into the bitstream as follows.

Prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient are determined according to the coordinate information of the last significant coefficient. The prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient are signalled into the bitstream.

It should be noted that the prefix information of the horizontal coordinate of the last significant coefficient is represented by last_sig_coeff_x_prefix. The prefix information of the vertical coordinate of the last significant coefficient is represented by last_sig_coeff_y_prefix. The suffix information of the horizontal coordinate of the last significant coefficient is represented by last_sig_coeff_x_suffix. The suffix information of the vertical coordinate of the last significant coefficient is represented by last_sig_coeff_y_suffix. Then last_sig_coeff_x_prefix, last_sig_coeff_x_suffix, last_sig_coeff_y_prefix, and last_sig_coeff_y_suffix are signalled into the bitstream such that the decoder can determine the coordinate information of the last significant coefficient by parsing the bitstream.

In this way, the embodiments of the present disclosure provide a modified method for deriving the position of the last significant coefficient. That is to say, in usual cases, the coefficient coding method is still the same as the method available in the related art. For example, the certain cases may refer to high bit depth, high quality, or high bitrate video, or lossless compression in video coding. Typically, as illustrated in FIG. 10A, the horizontal coordinate of the position of the last significant coefficient, i.e., the horizontal distance relative to the upper-left corner of the current block, are encoded in last_sig_coeff_x_prefix and last_sig_coeff_x_suffix, while the vertical coordinate of the position of the last significant coefficient, i.e., the vertical distance relative to the upper-left corner of the current block, are encoded in last_sig_coeff_y_prefix and last_sig_coeff_y_suffix. In comparison, in the case of high bit depth, high quality, high bitrate, or lossless compression in video coding, the position of the last significant coefficient is generally close to a lower-right corner of a region of all possible significant coefficients of the current block. In this case, as illustrated in FIG. 10B, the horizontal distance of the position of the last significant coefficient relative to the lower-right corner of the region of all possible significant coefficients of the current block are encoded in last_sig_coeff_x_prefix and last_sig_coeff_x_suffix, and the vertical distance of the position of last significant coefficient relative to the lower-right corner of the region of all possible significant coefficients of the current block are encoded in last_sig_coeff_y_prefix, last_sig_coeff_y_suffix. Therefore, in the embodiments of the present disclosure, reverse_last_sig_coeff_flag is introduced so that the problem of greater overhead caused by encoding larger values in the bitstream can be solved.

Further, when the video flag indicates that the video satisfies the preset condition, all the coefficients that may need to be coded may be default to requiring coding. In other words, the position of the last significant coefficient is no longer used, but rather all the possible significant coefficients of the current block are scanned in the preset scanning order. Thus, embodiments of the present disclosure may also introduce a last-coefficient enabled flag for determining whether the last-coefficient position is used for the current block.

In some embodiments, when the video flag indicates that the video satisfies the preset condition, the method may further include the following.

A last-coefficient enabled flag is determined. When the last-coefficient enabled flag indicates that a last-coefficient position is used for the current block, all coefficients before the last-coefficient position are encoded according to the preset scanning order, and bit information obtained by the encoding, the video flag, and the last-coefficient enabled flag are signalled into the bitstream.

It is noted that the last-coefficient enabled flag may be represented by default_last_coeff_enabled_flag. In embodiments of the present disclosure, the last-coefficient enabled flag may be at least a flag of one of: a sequence level, a picture level, a slice level, and a block level; or even higher-level (e.g., VUI, SEI, etc.) flag, which is not limited herein.

It should be noted that regarding the last-coefficient enabled flag, in some embodiments, the last-coefficient enabled flag may be determined as follows.

When the last-coefficient position is used for the current block, the last-coefficient enabled flag is determined to be a first value. Alternatively, when the last-coefficient position is not used for the current block, the last-coefficient enabled flag is determined to be a second value.

That is, in an example that the first value is 1 and the second value is 0, if it is determined that the last-coefficient position is used for the current block, then default_last_coeff_enabled_flag has the value 1. Alternatively, if it is determined that the last-coefficient position is not used for the current block, then default_last_coeff_enabled_flag has the value 0.

Further, for the last-coefficient position, in some embodiments, the last-coefficient position is a position at a lower-right corner of a matrix formed by all possible significant coefficients in the current block. Alternatively, the last-coefficient position is a last position in scanning all possible significant coefficients in the current block according to the preset scanning order.

It should be noted that in the embodiments of the disclosure, the last-coefficient position does not represent the position of the last significant coefficient. This is because the coefficient at the last-coefficient position may be 0, while the coefficient at the last-significant-coefficient position must not be 0.

In a particular example, the method may further include setting the position of the last significant coefficient to be the last-coefficient position.

That is, in the embodiments of the present disclosure, the position of the last significant coefficient can still be used, in which case the position of the last significant coefficient should be set to be the last position of all coefficients that may not be zero within the current block in the preset scanning order.

Further, the last-coefficient position may be represented by (LastCoeffX, LastCoeffY), i.e., the last position of all possible significant coefficients in the current block in the preset scanning order. In some embodiments, the method may further include the following.

A width and a height of a transform block obtained by a preset operation on the current block are determined. Coordinate information of a lower-right corner of the transform block is obtained by coordinate calculation according to the width and height of the transform block. The last-coefficient position is determined according to the coordinate information of the lower-right corner of the transform block.

Here, the preset operation includes at least a zero-out operation.

It should be noted that (LastCoeffX, LastCoeffY) represents the coordinate information of the lower-right corner of the transform block after zero-out, where (LastCoeffX, LastCoeffY) is derived as follows:

LastCoeffX=(1<<log 2ZoTbWidth)−1;

LastCoeffY=(1<<log 2ZoTbHeight)−1.

Thus, if default_last_coeff_enabled_flag has the value 1, then the last-coefficient position may be determined based on (LastCoeffX, LastCoeffY).

In a particular example, the position of the last significant coefficient is still used, in which case the position of the last significant coefficient may be set to be the last position of all possible zero coefficients in the current block in the preset scanning order. In some embodiments, the method may further include the following.

When the position of the last significant coefficient is set to be the last-coefficient position, the position of the last significant efficient is determined according to the coordinate information of the lower-right corner of the transform block.

That is, the position of the last significant coefficient may be represented by (LastSignificantCoeffX, LastSignificantCoeffY), where (LastSignificantCoeffX, LastSignificantCoeffY) is derived as follows:

LastSignificantCoeffX=(1<<log 2ZoTbWidth)−1;

LastSignificantCoeffY=(1<<log 2ZoTbHeight)−1.

In the above, (LastSignificantCoeffX, LastSignificantCoeffY) represents the coordinate information of the lower-right corner of the transform block after zero-out. If the value of default_last_coeff_enabled_flag is 1, then the position of the last significant coefficient may be determined based on (LastSignificantCoeffX, LastSignificantCoeffY).

Further, in the case that the last-coefficient position is not used for the current block, the method may further include the following.

Prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient are determined. The position of the last significant coefficient is determined according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient. All coefficients before the position of the last significant coefficient are encoded according to the preset scanning order, and the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient are signalled into the bitstream.

It should be noted that if the last-coefficient position is not used for the current block, the position of the last significant coefficient needs to be determined. Specifically, last_sig_coeff_x_prefix, last_sig_coeff_x_suffix, last_sig_coeff_y_prefix, and last_sig_coeff_y_suffix need to be determined. Then last_sig_coeff_x_prefix, last_sig_coeff_x_suffix, last_sig_coeff_y_prefix, and last_sig_coeff_y_suffix are signalled into the bitstream.

In this way, during coefficient coding, coding is required by default for all coefficients that may need to be coded. That is to say, in usual cases, the coefficient coding method is still the same as the method available in the related art. For example, the certain cases may refer to high bit depth, high quality, or high bitrate video, or lossless compression in video coding. Coding is required by default for all coefficients that may need to be coded, i.e., the position of the last significant coefficient is no longer used, and instead, all the possible significant coefficients of the current block are scanned in the preset scanning order. In other words, the last position of coefficients that need to be coded is set to be the last position of all possible significant coefficients of the current block in the preset scanning order. This position is usually the lower-right corner of the matrix formed by all possible significant coefficients of the current block. Therefore, in the embodiments of the present disclosure, default_last_coeff_enabled_flag may be introduced, so that syntax elements related to the position of the last significant coefficient can be reduced or even eliminated, which can reduce overhead and avoid wastes.

Further, when the video flag indicates that the video satisfies the preset condition, coding may be required by default for all sub-blocks that are scanned. In this case, there is no need to transmit sb_coded_flag in the bitstream, i.e., neither the encoder nor the decoder needs to process this flag, which can speed up coding. Therefore, in embodiments of the present disclosure, a sub-block default coded flag is introduced for determining whether the sub-block to-be-decoded in the current block defaults to coding.

In some embodiments, when the video flag indicates that the video satisfies the preset condition, the method may further include the following.

A sub-block default coded flag for a sub-block to-be-encoded in the current block is determined. When the sub-block default coded flag indicates that the sub-block to-be-encoded defaults to coding, all coefficients in the sub-block to-be-encoded are encoded, and bit information obtained by the encoding and the sub-block default coded flag are signalled into the bitstream.

It is noted that the sub-block default coded flag may be represented by default_sb_coded_flag. In embodiments of the present disclosure, the sub-block default coded flag is at least a flag of one of: a sequence level, a picture level, a slice level, and a block level, or may even be a flag of a higher level (e.g., VUI, SEI, etc.), which is not limited herein.

It is also noted that for the sub-block default flag, in some embodiments, the sub-block default coded flag for the sub-block to-be-encoded may be determined as follows.

If the sub-block to-be-encoded defaults to coding, the sub-block default coded flag is determined to be a first value. Alternatively, if the sub-block to-be-encoded does not default to coding, the sub-block default coded flag is determined to be a second value.

As such, in an example that the first value is 1 and the second value is 0, if it is determined that the sub-block to-be-encoded defaults to requiring coding, then default_sb_coded_flag has the value 1. Alternatively, if it is determined that the sub-block to-be-encoded does not default to requiring coding, then default_sb_coded_flag has the value 0.

In the case that the sub-block to-be-decoded defaults to requiring coding, the value of default_sb_coded_flag is 1, which means that the value of sb_coded_flag is 1, i.e., there is no need to decode sb_coded_flag. However, in the case that the sub-block to-be-decoded does not default to requiring coding, that is, the sub-block default coded flag indicates that the sub-block to-be-encoded does not default to coding, in some embodiments, the method may further include determining a sub-block coded flag for the sub-block to-be-encoded and signalling the sub-block coded flag into the bitstream.

Further, in some embodiments, the sub-block default coded flag for the sub-block to-be-encoded may be determined as follows.

If coding is required for the sub-block to-be-encoded, the sub-block default coded flag is determined to be a first value.

Alternatively, if all coefficients in the sub-block are 0, the sub-block default coded flag is determined to be a second value.

In embodiments of the present disclosure, the sub-block coded flag may be represented by sb_coded_flag. Taking the first value of 1 and the second value of 0 as an example, if it is determined that the sub-block to-be-encoded needs to be encoded, which means that the sub-block to-be-encoded contains non-zero coefficients to-be-encoded, then sb_coded_flag has the value 1. Alternatively, if t is determined that no encoding is required for the sub-block to-be-encoded, which means that all coefficients within the sub-block to-be-encoded are 0, then sb_coded_flag has the value 0.

In this way, for certain cases, during coefficient coding, all scanned sub-blocks default to requiring coding, or all scanned sub-blocks contain significant coefficients by default. That is to say, in usual cases, the coefficient coding method is still the same as the method available in the related art. For example, the certain cases may refer to high bit depth, high quality, or high bitrate video, or lossless compression in video coding. In this case, there are many significant coefficients and almost all of the scanned sub-blocks require to be coded, or in other words, almost all of the scanned sub-blocks contain significant coefficients. As such, there is no need to transmit the sb_coded_flag in the bitstream, and the encoder/decoder does not need to process this flag, thus enabling faster coding speed. There is also a small compression performance gain in this case due to the removal of an almost non-existent flag.

The present embodiments further provide a coefficient encoding method applied to the encoder. A video flag and a position of a last significant coefficient are determined. When the video flag indicates that a video satisfies a preset condition, a last-significant-coefficient position-reverse flag is determined. Coordinate information of the last significant coefficient is determined according to the position of the last significant coefficient and the last-significant-coefficient position-reverse flag. All coefficients before the position of the last significant coefficient are encoded according to a preset scanning order, and bit information obtained by the encoding, the video flag, and the coordinate information of the last significant coefficient are signalled into a bitstream. In this way, in the video coding scenarios with high bit depth, high bitrate, high quality, or lossless compression, since the coefficient distribution pattern is different from that of conventional video scenarios, during coefficient coding, by reducing or even eliminating the number of syntax elements coded in context mode, such as syntax elements about the position of the last significant coefficient, the sub-block coded flags, etc., or further performing coordinate transformation in the case that the values of the coordinates of the last significant coefficient are too large, the overhead caused by coding in the bitstream can be reduced, and thus the throughput and coding speed of coefficient coding can be improved. In addition, the compression efficiency can also be improved since the reduced or eliminated syntax elements have less impact in the video coding with high bit-depth, high bit-rate, high-quality, or lossless compression.

Figure 12:
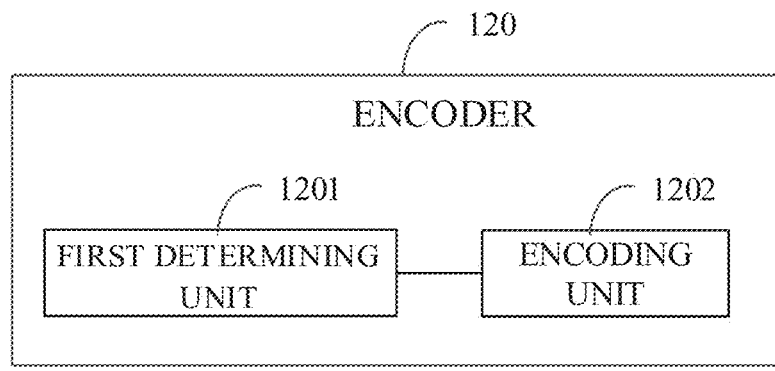
FIG. 12 is a schematic structural diagram of an encoder provided in embodiments of the disclosure.

In another embodiment of the present disclosure, based on the same concept as the foregoing embodiments, FIG. 12 illustrates a schematic structural diagram of an encoder 120 provided in embodiments of the disclosure. As illustrated in FIG. 12, the encoder 120 may include a first determining unit 1201 and an encoding unit 1202.

The first determining unit 1201 is configured to determine a video flag and a position of a last significant coefficient, and determine a last-significant-coefficient position-reverse flag when the video flag indicates that a video satisfies a preset condition.

The first determining unit 1201 is further configured to determine coordinate information of the last significant coefficient according to the position of the last significant coefficient and the last-significant-coefficient position-reverse flag.

The encoding unit 1202 is configured to encode all coefficients before the position of the last significant coefficient according to a preset scanning order, and signal bit information obtained by the encoding, the video flag, and the coordinate information of the last significant coefficient into a bitstream.

In some embodiments, the first determining unit 1201 is further configured to determine the video flag to be a first value when the video satisfies the preset condition, or to determine the video flag to be a second value when the video does not satisfy the preset condition.

In some embodiments, the preset condition includes at least one of: high bit depth, high quality, high bitrate, high frame rate, or lossless compression.

In some embodiments, the first determining unit 1201 is further configured to determine the last-significant-coefficient position-reverse flag to be a first value when the position of the last significant coefficient is reversed for the current block, or to determine the last-significant-coefficient position-reverse flag to be a second value when the position of the last significant coefficient is not reversed for the current block.

In some embodiments, the position of the last significant coefficient includes an initial horizontal coordinate and an initial vertical coordinate of the last significant coefficient, where the initial horizontal coordinate is a horizontal distance from the position of the last significant coefficient to an upper-left corner of the current block and the initial vertical coordinate is a vertical distance from the position of the last significant coefficient to the upper-left corner of the current block.

Correspondingly, the first determining unit 1201 is further configured to: when the last-significant-coefficient position-reverse flag has a first value, determine the coordinate information of the last significant coefficient by calculation according to the initial horizontal coordinate and the initial vertical coordinate of the last significant coefficient, or when the last-significant-coefficient position-reverse flag has a second value, determine the coordinate information of the last significant coefficient directly according to the initial horizontal coordinate and the initial vertical coordinate of the last significant coefficient.

In some embodiments, the first determining unit 1201 is further configured to: determine a width and a height of the current block; obtain a horizontal coordinate of the last significant coefficient by subtracting the initial horizontal coordinate of the last significant coefficient from the width of the current block; obtain a vertical coordinate of the last significant coefficient by subtracting the initial vertical coordinate of the last significant coefficient from the height of the current block; and determine the coordinate information of the last significant coefficient according to the horizontal coordinate of the last significant coefficient and the vertical coordinate of the last significant coefficient.

In some embodiments, the first determining unit 1201 is further configured to: when the last-significant-coefficient position-reverse flag has a first value, determine the coordinate information of the last significant coefficient as a horizontal distance and a vertical distance from the position of the last significant coefficient to a lower-right corner of the current block; or when the last-significant-coefficient position-reverse flag has a second value, determine the coordinate information of the last significant coefficient as the horizontal distance and the vertical distance from the position of the last significant coefficient to the upper-left corner of the current block.

In some embodiments, the encoding unit 1202 is further configured to determine prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient according to the coordinate information of the last significant coefficient, and to signal the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient into the bitstream.

In some embodiments, the last-significant-coefficient position-reverse flag is at least a flag of one of: a sequence level, a picture level, a slice level, or a block level.

In some embodiments, the first determining unit 1201 is further configured to determine a last-coefficient enabled flag when the video flag indicates that the video satisfies the preset condition.

The encoding unit 1202 is further configured to: when the last-coefficient enabled flag indicates that a last-coefficient position is used for the current block, encode all coefficients before the last-coefficient position according to the preset scanning order, and signal bit information obtained by the encoding, the video flag, and the last-coefficient enabled flag into the bitstream.

In some embodiments, the first determining unit 1201 is further configured to: when the last-coefficient position is used for the current block, determine the last-coefficient enabled flag to be a first value; or when the last-coefficient position is not used for the current block, determine the last-coefficient enabled flag to be a second value.

In some embodiments, the last-coefficient position is a position at a lower-right corner of a matrix formed by all possible significant coefficients in the current block, or the last-coefficient position is a last position in scanning all possible significant coefficients in the current block according to the preset scanning order.

In some embodiments, the first determining unit 1201 is further configured to set the position of the last significant coefficient to be the last-coefficient position.

In some embodiments, the first determining unit 1201 is further configured to determine a width and a height of a transform block obtained by a preset operation on the current block, to obtain coordinate information of a lower-right corner of the transform block by coordinate calculation according to the width and the height of the transform block, and to determine the last-coefficient position according to the coordinate information of the lower-right corner of the transform block.

In some embodiments, the preset operation at least includes a zero-out operation.

In some embodiments, the first determining unit 1201 is further configured to determine the position of the last significant efficient according to the coordinate information of the lower-right corner of the transform block when the position of the last significant coefficient is set to be the last-coefficient position.

In some embodiments, the first determining unit 1201 is further configured to: when the last-coefficient position is not used for the current block, determine prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient, and determine the position of the last significant coefficient according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient.

In some embodiments, the encoding unit 1202 is further configured to encode all coefficients before the position of the last significant coefficient according to the preset scanning order, and signal the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient into the bitstream.

In some embodiments, the last-coefficient enabled flag is at least a flag of one of: a sequence level, a picture level, a slice level, or a block level.

In some embodiments, the first determining unit 1201 is further configured to: when the video flag indicates that the video satisfies the preset condition, determine a sub-block default coded flag for a sub-block to-be-encoded in the current block.

The encoding unit 1202 is further configured to: when the sub-block default coded flag indicates that the sub-block to-be-encoded defaults to coding, encode all coefficients in the sub-block to-be-encoded and signal bit information obtained by the encoding and the sub-block default coded flag into the bitstream.

In some embodiments, the first determining unit 1201 is further configured to: when the sub-block default coded flag indicates that the sub-block to-be-encoded does not default to coding, determine a sub-block coded flag for the sub-block to-be-encoded and signal the sub-block coded flag into the bitstream.

In some embodiments, the first determining unit 1201 is further configured to determine the sub-block default coded flag to be a first value when the sub-block to-be-encoded defaults to coding, or to determine the sub-block default coded flag to be a second value when the sub-block to-be-encoded does not default to coding.

In some embodiments, the first determining unit 1201 is further configured to determine the sub-block coded flag to be a first value when coding is required for the sub-block, or to determine the sub-block coded flag to be a second value when all coefficients in the sub-block are 0.

In some embodiments, the sub-block default coded flag is at least a flag of one of: a sequence level, a picture level, a slice level, or a block level.

In some embodiments, the first value is 1 and the second value is 0.

In some embodiments, the first determining unit 1201 is further configured to: when the video flag is a high bit-depth flag, determine that the high bit-depth flag indicates that the video satisfies the preset condition if the video satisfies high bit depth.

In some embodiments, the first determining unit 1201 is further configured to: when the video flag is a high bitrate flag, determine that the high bitrate flag indicates that the video satisfies the preset condition if the video satisfies high bitrate.

In some embodiments, the first determining unit 1201 is further configured to: when the video flag is a high quality flag, determine that the high quality flag indicates that the video satisfies the preset condition if the video satisfies high quality.

In some embodiments, the first determining unit 1201 is further configured to: when the video flag is a lossless compression flag, determine that the lossless compression flag indicates that the video satisfies the preset condition if the video satisfies lossless compression.

It can be understood that in the embodiments of the present disclosure, the "unit" may be part of a circuit, part of a processor, part of a program or software, etc., and may also be a module, or may be non-modular. Moreover, each component in the embodiment may be integrated into one processing unit, or each unit may exist physically alone, or two or more units may be integrated into one unit. The above integrated units may be implemented in the form of hardware or software function modules.

The integrated unit, when implemented as a software function module and not sold or used as a stand-alone product, may be stored in a computer-readable storage medium. Based on such understanding, the technical solution of the present disclosure, or part or all or part of the technical solution that essentially contributes to the prior art, may be embodied in the form of a software product. The computer software product is stored in a storage medium and includes a number of instructions to enable a computer device (which may be a personal computer, server, or network device, etc.) or processor to perform all or some of the operations of the method of this disclosure. The aforementioned storage medium includes: USB flash drives, removable hard drives, read only memory (ROM), random access memory (RAM), disks or CD-ROMs, and other media that can store program codes.

Thus, embodiments of the present disclosure provide a computer storage medium which is applied to the encoder 120. The computer storage medium stores a computer program which, when executed by a first processor, implements the method described in any of the foregoing embodiments.

Figure 13:
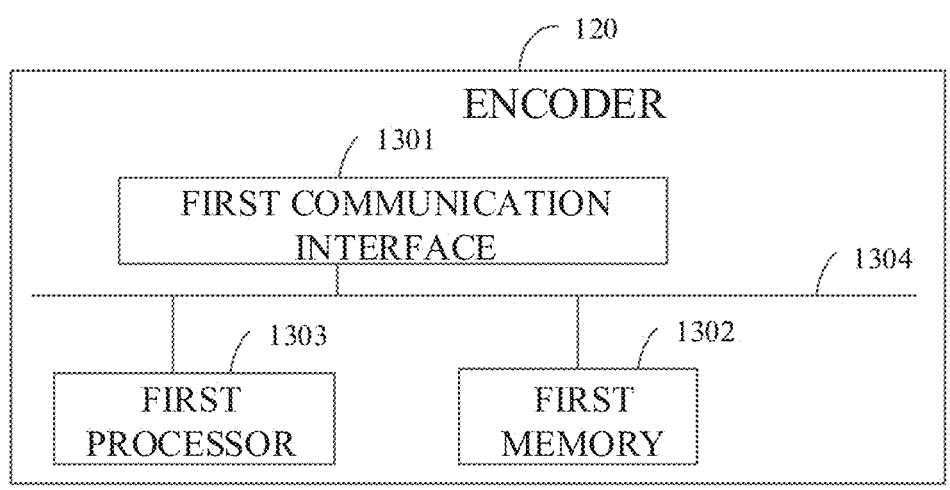
FIG. 13 is a schematic diagram of a specific hardware structure of an encoder provided in embodiments of the disclosure.

Based on the composition of the above-mentioned encoder 120 and the computer storage medium, referring to FIG. 13, FIG. 13 is a schematic diagram of the specific hardware structure of the encoder 120 provided in embodiment of the present disclosure. As illustrated in FIG. 13, the encoder 120 may include a first communication interface 1301, a first memory 1302 and a first processor 1303. The components are coupled together through a first bus system 1304. It can be understood that the first bus system 1304 is configured to implement connection communication between these components. In addition to the data bus, the first bus system 1304 also includes a power bus, a control bus and a status signal bus. However, for the sake of clear explanation, various buses are labeled as the first bus system 1304 in FIG. 13.

The first communication interface 1301 is configured to receive and send signals during the process of sending and receiving information with other external network elements.

The first memory 1302 is configured to store a computer program capable of running on the first processor 1303.

The first processor 1303 is configured to perform the following operations when executed the computer program.

A video flag and a position of a last significant coefficient are determined. When the video flag indicates that a video satisfies a preset condition, a last-significant-coefficient position-reverse flag is determined. Coordinate information of the last significant coefficient is determined according to the position of the last significant coefficient and the last-significant-coefficient position-reverse flag. All coefficients before the position of the last significant coefficient are encoded according to a preset scanning order, and bit information obtained by the encoding, the video flag, and the coordinate information of the last significant coefficient are signalled into a bitstream.

It will be appreciated that the first memory 1302 in embodiments of the present disclosure may be volatile memory or non-volatile memory, or may include both volatile and non-volatile memory. The non-volatile memory may be read-only memory (ROM), programmable read-only memory (PROM), erasable programmable read-only memory (EPROM), electrically erasable programmable read-only memory (EEPROM), or electrically EPROM, EEPROM) or flash memory. The volatile memory may be random access memory (RAM), which is used as an external cache. By way of illustration, but not limitation, many forms of RAM are available, such as Static RAM (SRAM), Dynamic RAM (DRAM), Synchronous DRAM (SDRAM), Double Data Rate SDRAM (SDRAM), and Flash memory. DRAM, Synchronous DRAM (SDRAM), Double Data Rate SDRAM (DDRSDRAM), Enhanced Synchronous SDRAM (ESDRAM), Synchlink DRAM (SLDRAM) and Direct Rambus RAM (DRRAM). The first memory 1302 of the systems and methods described in this disclosure is intended to include, but is not limited to, these and any other suitable types of memory.

Furthermore, the first processor 1303 may be an integrated circuit chip with a signal processing capability. During implementation, operations of the foregoing methods may be completed by an integrated logical circuit in a hardware form in the first processor 1003 or an instruction in a software form. The first processor 1303 may be a general-purpose processor, a digital signal processor (DSP), an application specific integrated circuit (ASIC), a field programmable gate array (FPGA), or another programmable logic device, a discrete gate or a transistor logic device, a discrete hardware component, or the like. The methods, operations and logical block diagrams disclosed in the embodiments of the disclosure may be implemented or performed by the first processor. The general-purpose processor may be a microprocessor, or the processor may be any conventional processor or the like. Operations of the methods disclosed in combination with the embodiments of the disclosure may be directly embodied to be executed and completed by a hardware decoding processor or executed and completed by a combination of hardware in the decoding processor and software modules. The software module may be located in a mature storage medium in the art, such as RAM, a flash memory, ROM, PROM, EEPROM, a register, or the like. The storage medium is located in the first memory 1302, and the first processor 1303 reads information in the first memory 1302, and completes operations of the above methods in combination with the hardware thereof.

It may be understood that these embodiments described in the disclosure may be implemented by hardware, software, firmware, middleware, microcode, or a combination thereof. For implementation based on hardware, the processing unit may be implement in one or more ASICs, DSP, a DSP Device (DSPD), a programmable logic device (PLD), FPGA, a general-purpose processor, a controller, a microcontroller, a microprocessor, other electronic units configured to perform the functions described in the disclosure, or a combination thereof. For implementation based on software, technologies described in the disclosure may be implemented by modules (e.g., processes, functions, or the like) performing the functions described in the disclosure. Software codes may be stored in the memory and executed by the processor. The memory may be implemented in the processor or outside the processor.

Optionally, in another embodiment, the first processor 1303 is further configured to perform the method according to any one of the foregoing embodiments when executing the computer program.

The embodiments provide the encoder which includes the first determining unit and the encoding unit. In this way, in the video coding scenarios with high bit depth, high bitrate, high quality, or lossless compression, since the coefficient distribution pattern is different from that of conventional video scenarios, during coefficient coding, by reducing or even eliminating the number of syntax elements coded in context mode, the overhead caused by coding in the bitstream can be reduced, and thus the throughput and coding speed of coefficient coding can be improved. In addition, the compression efficiency can also be improved since the reduced or eliminated syntax elements have less impact in the video coding with high bit-depth, high bit-rate, high-quality, or lossless compression.

Figure 14:
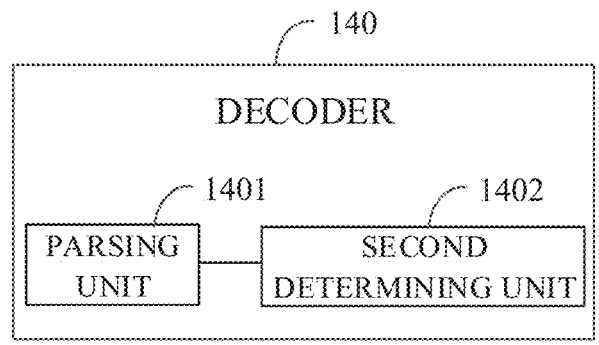
FIG. 14 is a schematic structural diagram of a decoder provided in embodiments of the disclosure.

In another embodiment of the present disclosure, based on the same concept as the foregoing embodiments, FIG. 14 illustrates a schematic structural diagram of a decoder 140 provided in embodiments of the disclosure. As illustrated in FIG. 14, the decoder 140 may include a parsing 1401 and a second determining unit 1402.

The parsing unit 1401 is configured to parse a bitstream to obtain a video flag, and to parse the bitstream to obtain a last-significant-coefficient position-reverse flag and coordinate information of a last significant coefficient when the video flag indicates that a video satisfies a preset condition.

The second determining unit 1402 is configured to determine a position of the last significant coefficient by calculation with the coordinate information of the last significant coefficient when the last-significant-coefficient position-reverse flag indicates that the position of the last significant coefficient is reversed for a current block.

The parsing unit 1401 is further configured to decode, according to a preset scanning order, all coefficients before the position of the last significant coefficient to determine coefficients of the current block.

In some embodiments, the second determining unit 1402 is further configured to determine the position of the last significant coefficient directly according to the coordinate information of the last significant coefficient when the last-significant-coefficient position-reverse flag indicates that the position of the last significant coefficient is not reversed for the current block.

The parsing unit 1402 is further configured to decode, according to the preset scanning order, all coefficients before the position of the last significant coefficient to determine the coefficients of the current block.

In some embodiments, the second determining unit 1402 is further configured to: when the video flag has a first value, determine that the video flag indicates that the video satisfies the preset condition, or when the video flag has a second value, determine that the video flag indicates that the video does not satisfy the preset condition.

In some embodiments, the preset condition comprises at least one of: high bit depth, high quality, high bitrate, high frame rate, or lossless compression.

In some embodiments, the second determining unit 1402 is further configured to: when the last-significant-coefficient position-reverse flag has a first value, determine that the last-significant-coefficient position-reverse flag indicates that the position of the last significant coefficient is reversed for the current block, or when the last-significant-coefficient position-reverse flag has a second value, determine that the last-significant-coefficient position-reverse flag indicates that the position of the last significant coefficient is not reversed for the current block.

In some embodiments, the parsing unit 1401 is further configured to parse the bitstream to obtain prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient.

The second determining unit 1402 is further configured to determine the horizontal coordinate of the last significant coefficient according to the prefix information of the horizontal coordinate of the last significant coefficient and the suffix information of the horizontal coordinate of the last significant coefficient, to determine the vertical coordinate of the last significant coefficient according to the prefix information of the vertical coordinate of the last significant coefficient and the suffix information of the vertical coordinate of the last significant coefficient, and to determine the coordinate information of the last significant coefficient according to the horizontal coordinate of the last significant coefficient and the vertical coordinate of the last significant coefficient.

In some embodiments, the second determining unit 1402 is further configured to determine the coordinate information of the last significant coefficient as a horizontal distance and a vertical distance from the position of the last significant coefficient to a lower-right corner of the current block, when the last-significant-coefficient position-reverse flag indicates that the position of the last significant coefficient is reversed for the current block.

Further, the second determining unit 1402 is further configured to determine a width and a height of the current block; obtain a horizontal coordinate of the last significant coefficient by subtracting, from the width of the current block, the horizontal distance from the position of the last significant coefficient to the lower-right corner of the current block; obtain a vertical coordinate of the last significant coefficient by subtracting, from the height of the current block, the vertical distance from the position of the last significant coefficient to the lower-right corner of the current block; and determine the position of the last significant coefficient according to the horizontal coordinate of the last significant coefficient and the vertical coordinate of the last significant coefficient.

In some embodiments, the second determining unit 1402 is further configured to determine the coordinate information of the last significant coefficient as a horizontal distance and a vertical distance from the position of the last significant coefficient to a upper-left corner of the current block, when the last-significant-coefficient position-reverse flag indicates that the position of the last significant coefficient is not reversed for the current block; and to determine the position of the last significant coefficient according to the horizontal distance and the vertical distance from the position of the last significant coefficient to the upper-left corner of the current block.

In some embodiments, the last-significant-coefficient position-reverse flag is at least a flag of one of: a sequence level, a picture level, a slice level, or a block level.

In some embodiments, the parsing unit 1401 is further configured to parse the bitstream to obtain a last-coefficient enabled flag, and decode, according to the preset scanning order, all coefficients before a last-coefficient position to determine the coefficients of the current block, when the last-coefficient enabled flag indicates that the last-coefficient position is used for the current block.

In some embodiments, the second determining unit 1402 is further configured to: when the last-coefficient enabled flag has a first value, determine that the last-coefficient enabled flag indicates the last-coefficient position is used for the current block; or when the last-coefficient enabled flag has a second value, determine that the last-coefficient enabled flag indicates the last-coefficient position is not used for the current block.

In some embodiments, the parsing unit 1401 is further configured to parse the bitstream to obtain prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient.

The second determining unit 1402 is further configured to determine the position of the last significant coefficient according to the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient; and decode, according to the preset scanning order, all coefficients before the position of the last significant coefficient to determine the coefficients of the current block.

In some embodiments, the second determining unit 1402 is further configured to the last-coefficient position is a position at a lower-right corner of a matrix formed by all possible significant coefficients in the current block; or the last-coefficient position is a last position in scanning all possible significant coefficients in the current block according to the preset scanning order.

In some embodiments, the second determining unit 1402 is further configured to set the position of the last significant coefficient to be the last-coefficient position.

In some embodiments, the second determining unit 1402 is further configured to: determine a width and a height of a transform block obtained by a preset operation on the current block; obtain coordinate information of a lower-right corner of the transform block by coordinate calculation according to the width and height of the transform block; and determine the last-coefficient position according to the coordinate information of the lower-right corner of the transform block.

In some embodiments, the preset operation at least includes a zero-out operation.

In some embodiments, the second determining unit 1402 is further configured to determine the position of the last significant efficient according to the coordinate information of the lower-right corner of the transform block when the position of the last significant coefficient is set to be the last-coefficient position.

In some embodiments, the last-coefficient enabled flag is at least a flag of one of: a sequence level, a picture level, a slice level, or a block level.

In some embodiments, the parsing unit 1401 is further configured to: when the video flag indicates that the video satisfies the preset condition, parse the bitstream to obtain a sub-block default coded flag; and determine that a sub-block coded flag has a first value and decoding all coefficients in a sub-block to-be-decoded in the current block, when the sub-block default coded flag indicates that the sub-block to-be-decoded defaults to coding.

In some embodiments, the parsing unit 1401 is further configured to: when the sub-block default coded flag indicates that the sub-block to-be-decoded does not default to coding, parse the bitstream to obtain the sub-block coded flag, and decode all coefficients in the sub-block to-be-decoded when the sub-block coded flag has the first value.

In some embodiments, the second determining unit 1402 is further configured to: when the sub-block default coded flag has the first value, determine that the sub-block default coded flag indicates that the sub-block to-be-decoded defaults to coding; or when the sub-block default coded flag has a second value, determine that the sub-block default coded flag indicates that the sub-block to-be-decoded does not default to coding.

In some embodiments, the second determining unit 1402 is further configured to: determine to decode all coefficients in the sub-block to-be-decoded when the sub-block coded flag has the first value; or determine all coefficients in the sub-block to-be-decoded as 0 when the sub-block coded flag has a second value.

In some embodiments, the sub-block default coded flag is at least a flag of one of: a sequence level, a picture level, a slice level, or a block level.

In some embodiments, the first value is 1 and the second value is 0.

In some embodiments, the second determining unit 1402 is further configured to: when the video flag is a high bit-depth flag, determine that the video satisfies the preset condition when the high bit-depth flag indicates that the video satisfies high bit depth.

In some embodiments, the second determining unit 1402 is further configured to: when the video flag is a high bitrate flag, determine that the video satisfies the preset condition when the high bitrate flag indicates that the video satisfies high bitrate.

In some embodiments, the second determining unit 1402 is further configured to: when the video flag is a high quality flag, determine that the video satisfies the preset condition when the high quality flag indicates that the video satisfies high quality.

In some embodiments, the second determining unit 1402 is further configured to: when the video flag is a lossless compression flag, determine that the video satisfies the preset condition when the lossless compression flag indicates that the video satisfies lossless compression.

It can be understood that in the embodiments of the present disclosure, the "unit" may be part of a circuit, part of a processor, part of a program or software, etc., and may also be a module, or may be non-modular. Moreover, each component in the embodiment may be integrated into one processing unit, or each unit may exist physically alone, or two or more units may be integrated into one unit. The above integrated units may be implemented in the form of hardware or software function modules.

The integrated unit, when implemented as a software function module and not sold or used as a stand-alone product, may be stored in a computer-readable storage medium. Based on such understanding, the technical solution of the present disclosure, or part or all or part of the technical solution that essentially contributes to the prior art, may be embodied in the form of a software product. The computer software product is stored in a storage medium and includes a number of instructions to enable a computer device (which may be a personal computer, server, or network device, etc.) or processor to perform all or some of the operations of the method of this disclosure. The aforementioned storage medium includes: USB flash drives, removable hard drives, ROM, RAM, disks or CD-ROMs, and other media that can store program codes.

Thus, embodiments of the present disclosure provide a computer storage medium which is applied to the decoder 140. The computer storage medium stores a computer program which, when executed by a second processor, implements the method described in any of the foregoing embodiments.

Figure 15:
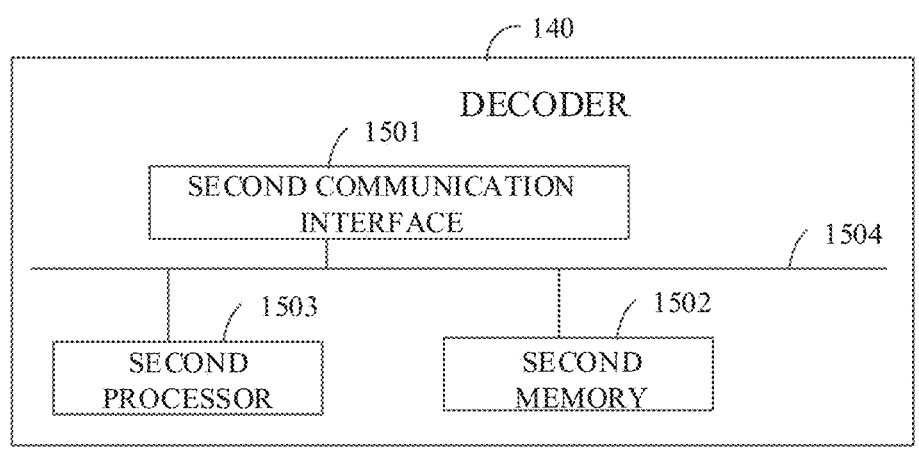
FIG. 15 is a schematic diagram of a specific hardware structure of a decoder provided in embodiments of the disclosure.

Based on the composition of the above-mentioned decoder 140 and the computer storage medium, referring to FIG. 15, FIG. 15 is a schematic diagram of the specific hardware structure of the decoder 140 provided in embodiment of the present disclosure. As illustrated in FIG. 15, the decoder 140 may include a second communication interface 1501, a second memory 1502 and a second processor 1503. The components are coupled together through a second bus system 1504. It can be understood that the second bus system 1504 is configured to implement connection communication between these components. In addition to the data bus, the second bus system 1504 also includes a power bus, a control bus and a status signal bus. However, for the sake of clear explanation, various buses are labeled as the second bus system 1504 in FIG. 15.

The second communication interface 1501 is configured to receive and send signals during the process of sending and receiving information with other external network elements.

The second memory 1502 is configured to store a computer program capable of running on the second processor 1503.

The second processor 1503 is configured to perform the following operations when executed the computer program.

A bitstream is parsed to obtain a video flag. When the video flag indicates that a video satisfies a preset condition, the bitstream is parsed to obtain a last-significant-coefficient position-reverse flag and coordinate information of a last significant coefficient. When the last-significant-coefficient position-reverse flag indicates that a position of the last significant coefficient is reversed for a current block, the position of the last significant coefficient is determined by calculation with the coordinate information of the last significant coefficient. According to a preset scanning order, all coefficients before the position of the last significant coefficient are decoded to determine coefficients of the current block.

Optionally, in another embodiment, the second processor 1503 is further configured to perform the method according to any one of the foregoing embodiments when executing the computer program.

It can be understood that the hardware functions of the second memory 1502 and the first memory 1302 are similar, and the hardware functions of the second processor 1503 and the first processor 1303 are similar, which will not be detailed herein.

The embodiments provide the decoder which includes the parsing unit and the second determining unit. In this way, in the video coding scenarios with high bit depth, high bitrate, high quality, or lossless compression, since the coefficient distribution pattern is different from that of conventional video scenarios, during coefficient coding, by reducing or even eliminating the number of syntax elements coded in context mode, the overhead caused by coding in the bitstream can be reduced, and thus the throughput and coding speed of coefficient coding can be improved. In addition, the compression efficiency can also be improved since the reduced or eliminated syntax elements have less impact in the video coding with high bit-depth, high bit-rate, high-quality, or lossless compression.

It should be noted that in this disclosure, the terms "comprising", "including" or any other variation thereof are intended to cover non-exclusive inclusion, so that a process, method, article or device that includes a series of elements not only includes those elements and also includes other elements not expressly listed or inherent in such process, method, article or apparatus. Without further limitation, an element defined by the statement "comprises a . . . " does not exclude the presence of additional identical elements in a process, method, article or apparatus that includes that element.

The above serial numbers of the embodiments of the present disclosure are only for description and do not represent the advantages and disadvantages of the embodiments.

The methods disclosed in several method embodiments provided in this disclosure can be arbitrarily combined without conflict to obtain new method embodiments.

The features disclosed in several product embodiments provided in this disclosure can be arbitrarily combined without conflict to obtain new product embodiments.

The features disclosed in several method or device embodiments provided in this disclosure can be combined arbitrarily without conflict to obtain new method embodiments or device embodiments.

The above is only the specific implementations of the present disclosure, but the protection scope of the present disclosure is not limited thereto. Any changes or substitutions that can be easily imagined by those skilled in the art within the technical scope disclosed in this disclosure should be included in the protection scope of this disclosure. Therefore, the protection scope of this disclosure should be subject to the protection scope of the claims.

INDUSTRIAL APPLICABILITY

In embodiments of the present disclosure, whether for the encoder or the decoder, in the video coding scenarios with high bit depth, high bitrate, high quality, or lossless compression, since the coefficient distribution pattern is different from that of conventional video scenarios, during coefficient coding, by reducing or even eliminating the number of syntax elements coded in context mode, such as syntax elements about the position of the last significant coefficient, the sub-block coded flags, etc., or further performing coordinate transformation in the case that the values of the coordinates of the last significant coefficient are too large, the overhead caused by coding in the bitstream can be reduced, and thus the throughput and coding speed of coefficient coding can be improved. In addition, the compression efficiency can also be improved since the reduced or eliminated syntax elements have less impact in the video coding with high bit-depth, high bit-rate, high-quality, or lossless compression.

What is claimed is:

1. A coefficient decoding method, applied to a decoder and comprising:
   parsing a bitstream to obtain a sequence level flag;
   parsing the bitstream to obtain a last-significant-coefficient position-reverse flag when the sequence level flag indicates that a video satisfies a preset condition;
   parsing the bitstream to obtain prefix information of a horizontal coordinate of a last significant coefficient, prefix information of a vertical coordinate of the last significant coefficient, suffix information of the horizontal coordinate of the last significant coefficient, and suffix information of the vertical coordinate of the last significant coefficient;
   determining the horizontal coordinate of the last significant coefficient according to the prefix information of the horizontal coordinate of the last significant coefficient and the suffix information of the horizontal coordinate of the last significant coefficient;
   determining the vertical coordinate of the last significant coefficient according to the prefix information of the vertical coordinate of the last significant coefficient and the suffix information of the vertical coordinate of the last significant coefficient; and
   determining coordinate information of the last significant coefficient according to the horizontal coordinate of the last significant coefficient and the vertical coordinate of the last significant coefficient;
   determining a position of the last significant coefficient by calculation with the coordinate information of the last significant coefficient when the last-significant-coefficient position-reverse flag indicates that the position of the last significant coefficient is reversed for a current block; and
   decoding, according to a preset scanning order, all coefficients before the position of the last significant coefficient to determine coefficients of the current block,
   wherein a value of the horizontal coordinate of the last significant coefficient in the preset scanning order within the current block is derived as follows:
   if last_sig_coeff_x_suffix is not present, then:

LastSignificantCoeffX=last_sig_coeff_x_prefix;

if last_sig_coeff_x_suffix is present, then:

LastSignificantCoeffX=(1<<((last_sig_coeff_x_prefix>>1)−1))*(2+(last_sig_coeff_x_prefix&1))+last_sig_coeff_x_suffix; and if reverse_last_sig_coeff_flag is equal to 1, then:

LastSignificantCoeffX=(1<<log 2ZoTbWidth)−1−LastSignificantCoeffX; and a value of the vertical coordinate of the last significant coefficient in the preset scanning order within the current block is derived as follows:
   if last_sig_coeff_y_suffix is not present, then:

LastSignificantCoeffY=last_sig_coeff_y_prefix;

if last_sig_coeff_y_suffix is present, then:

LastSignificantCoeffY=(1<<((last_sig_coeff_y_prefix>>1)−1))*(2+(last_sig_coeff_y_prefix&1))+last_sig_coeff_y_suffix; and if reverse_last_sig_coeff_flag is equal to 1, then:

LastSignificantCoeffY=(1<<log 2ZoTbHeight)−1−LastSignificantCoeffY;

wherein LastSignificantCoeffX represents the value of the horizontal coordinate of the last significant coefficient in the preset scanning order within the current block, LastSignificantCoeffY represents the value of the vertical coordinate of the last significant coefficient in the preset scanning order within the current block, last_sig_coeff_x_prefix represents the prefix information of the horizontal coordinate of the last significant coefficient, last_sig_coeff_y_prefix represents the prefix information of the vertical coordinate of the last significant coefficient, last_sig_coeff_x_suffix represents the suffix information of the horizontal coordinate of the last significant coefficient, the last_sig_coeff_y_suffix represents suffix information of the vertical coordinate of the last significant coefficient, and reverse_last_sig_coeff_flag represents the last-significant-coefficient position-reverse flag.

2. The method of claim 1, further comprising:
   determining the position of the last significant coefficient directly according to the coordinate information of the last significant coefficient when the last-significant-coefficient position-reverse flag indicates that the position of the last significant coefficient is not reversed for the current block; and
   decoding, according to the preset scanning order, all coefficients before the position of the last significant coefficient to determine the coefficients of the current block.

3. The method of claim 1, further comprising:
   when the sequence level flag has a first value, determining that the sequence level flag indicates that the video satisfies the preset condition; or
   when the sequence level flag has a second value, determining that the sequence level flag indicates that the video does not satisfy the preset condition.

4. The method of claim 3, wherein the preset condition comprises at least one of:
   high bit depth, high quality, high bitrate, high frame rate, or lossless compression.

5. The method of claim 1, further comprising:
   when the last-significant-coefficient position-reverse flag has a first value, determining that the last-significant-coefficient position-reverse flag indicates that the position of the last significant coefficient is reversed for the current block; or
   when the last-significant-coefficient position-reverse flag has a second value, determining that the last-significant-coefficient position-reverse flag indicates that the position of the last significant coefficient is not reversed for the current block.

6. The method of claim 1, wherein the method further comprises:
   determining the coordinate information of the last significant coefficient as a horizontal distance and a vertical distance from the position of the last significant coefficient to a lower-right corner of the current block, when the last-significant-coefficient position-reverse flag indicates that the position of the last significant coefficient is reversed for the current block; and
   correspondingly, determining the position of the last significant coefficient by calculation with the coordinate information of the last significant coefficient comprises:

determining a width and a height of the current block;
obtaining a horizontal coordinate of the last significant coefficient by subtracting, from the width of the current block, the horizontal distance from the position of the last significant coefficient to the lower-right corner of the current block;
obtaining a vertical coordinate of the last significant coefficient by subtracting, from the height of the current block, the vertical distance from the position of the last significant coefficient to the lower-right corner of the current block; and
determining the position of the last significant coefficient according to the horizontal coordinate of the last significant coefficient and the vertical coordinate of the last significant coefficient.

7. The method of claim 1, further comprising:
determining the coordinate information of the last significant coefficient as a horizontal distance and a vertical distance from the position of the last significant coefficient to a upper-left corner of the current block, when the last-significant-coefficient position-reverse flag indicates that the position of the last significant coefficient is not reversed for the current block; and
determining the position of the last significant coefficient according to the horizontal distance and the vertical distance from the position of the last significant coefficient to the upper-left corner of the current block.

8. The method of claim 1, wherein the last-significant-coefficient position-reverse flag is at least a flag of one of: a sequence level, a picture level, a slice level, or a block level.

9. A coefficient encoding method, applied to an encoder and comprising:
determining a sequence level flag and a position of a last significant coefficient;
determining a last-significant-coefficient position-reverse flag when the sequence level flag indicates that a video satisfies a preset condition;
determining coordinate information of the last significant coefficient according to the position of the last significant coefficient and the last-significant-coefficient position-reverse flag;
determining prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient according to the coordinate information of the last significant coefficient; and
encoding all coefficients before the position of the last significant coefficient according to a preset scanning order, and signalling bit information obtained by the encoding, the sequence level flag, the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient into a bitstream,
wherein a value of the horizontal coordinate of the last significant coefficient in the preset scanning order within a current block is derived as follows:
if last_sig_coeff_x_suffix is not present, then:

LastSignificantCoeffX=last_sig_coeff_x_prefix;

if last_sig_coeff_x_suffix is present, then:

LastSignificantCoeffX=(1<<((last_sig_coeff_x_prefix>>1)−1))*(2+(last_sig_coeff_x_prefix&1))+last_sig_coeff_x_suffix; and if reverse_last_sig_coeff_flag is equal to 1, then:

LastSignificantCoeffX=(1<<log 2ZoTbWidth)−1−LastSignificantCoeffX; and a value of the vertical coordinate of the last significant coefficient in the preset scanning order within the current block is derived as follows:
if last_sig_coeff_y_suffix is not present, then:

LastSignificantCoeffY=last_sig_coeff_y_prefix;

if last_sig_coeff_y_suffix is present, then:

LastSignificantCoeffY=(1<<((last_sig_coeff_y_prefix>>1)−1))*(2+(last_sig_coeff_y_prefix&1))+last_sig_coeff_y_suffix; and if reverse_last_sig_coeff_flag is equal to 1, then:

LastSignificantCoeffY=(1<<log 2ZoTbHeight)−1−LastSignificantCoeffY;

wherein LastSignificantCoeffX represents the value of the horizontal coordinate of the last significant coefficient in the preset scanning order within the current block, LastSignificantCoeffY represents the value of the vertical coordinate of the last significant coefficient in the preset scanning order within the current block, last_sig_coeff_x_prefix represents the prefix information of the horizontal coordinate of the last significant coefficient, last_sig_coeff_y_prefix represents the prefix information of the vertical coordinate of the last significant coefficient, last_sig_coeff_x_suffix represents the suffix information of the horizontal coordinate of the last significant coefficient, the last_sig_coeff_y_suffix represents suffix information of the vertical coordinate of the last significant coefficient, and reverse_last_sig_coeff_flag represents the last-significant-coefficient position-reverse flag.

10. The method of claim 9, wherein determining the sequence level flag comprises:
determining the sequence level flag to be a first value when the video satisfies the preset condition; or
determining the sequence level flag to be a second value when the video does not satisfy the preset condition.

11. The method of claim 10, wherein the preset condition comprises at least one of: high bit depth, high quality, high bitrate, high frame rate, or lossless compression.

12. The method of claim 9, wherein determining the last-significant-coefficient position-reverse flag comprises:
determining the last-significant-coefficient position-reverse flag to be a first value when the position of the last significant coefficient is reversed for the current block; or
determining the last-significant-coefficient position-reverse flag to be a second value when the position of the last significant coefficient is not reversed for the current block.

13. The method of claim 12, wherein the position of the last significant coefficient comprises an initial horizontal coordinate and an initial vertical coordinate of the last significant coefficient, wherein the initial horizontal coordinate is a horizontal distance from the position of the last significant coefficient to an upper-left corner of the current block and the initial vertical coordinate is a vertical distance from the position of the last significant coefficient to the upper-left corner of the current block; and correspondingly, determining the coordinate information of the last significant coefficient according to the position of the last significant coefficient and the last-significant-coefficient position-reverse flag comprises:
when the last-significant-coefficient position-reverse flag has a first value, determining the coordinate information of the last significant coefficient by calculation according to the initial horizontal coordinate and the initial vertical coordinate of the last significant coefficient; or
when the last-significant-coefficient position-reverse flag has a second value, determining the coordinate information of the last significant coefficient directly according to the initial horizontal coordinate and the initial vertical coordinate of the last significant coefficient.

14. The method of claim 13, wherein determining the coordinate information of the last significant coefficient by calculation according to the initial horizontal coordinate and the initial vertical coordinate of the last significant coefficient comprises:
determining a width and a height of the current block;
obtaining a horizontal coordinate of the last significant coefficient by subtracting the initial horizontal coordinate of the last significant coefficient from the width of the current block;
obtaining a vertical coordinate of the last significant coefficient by subtracting the initial vertical coordinate of the last significant coefficient from the height of the current block; and
determining the coordinate information of the last significant coefficient according to the horizontal coordinate of the last significant coefficient and the vertical coordinate of the last significant coefficient.

15. The method of claim 13, further comprising:
when the last-significant-coefficient position-reverse flag has a first value, determining the coordinate information of the last significant coefficient as a horizontal distance and a vertical distance from the position of the last significant coefficient to a lower-right corner of the current block; or
when the last-significant-coefficient position-reverse flag has a second value, determining the coordinate information of the last significant coefficient as the horizontal distance and the vertical distance from the position of the last significant coefficient to the upper-left corner of the current block.

16. An encoder, comprising a processor and a memory storing a computer program which, when executed by the processor, causes the processor to:
determine a sequence level flag and a position of a last significant coefficient;
determine a last-significant-coefficient position-reverse flag when the sequence level flag indicates that a video satisfies a preset condition;
determine coordinate information of the last significant coefficient according to the position of the last significant coefficient and the last-significant-coefficient position-reverse flag;
determine prefix information of a horizontal coordinate of the last significant coefficient, prefix information of a vertical coordinate of the last significant coefficient, suffix information of the horizontal coordinate of the last significant coefficient, and suffix information of the vertical coordinate of the last significant coefficient according to the coordinate information of the last significant coefficient; and
encode all coefficients before the position of the last significant coefficient according to a preset scanning order, and signal bit information obtained by the encoding, the sequence level flag, the prefix information of the horizontal coordinate of the last significant coefficient, the prefix information of the vertical coordinate of the last significant coefficient, the suffix information of the horizontal coordinate of the last significant coefficient, and the suffix information of the vertical coordinate of the last significant coefficient into a bitstream,
wherein a value of the horizontal coordinate of the last significant coefficient in the preset scanning order within a current block is derived as follows:
if last_sig_coeff_x_suffix is not present, then:

LastSignificantCoeffX=last_sig_coeff_x_prefix;

if last_sig_coeff_x_suffix is present, then:

LastSignificantCoeffX=(1<<((last_sig_coeff_x_prefix>>1)−1))*(2+(last_sig_coeff_x_prefix&1))+last_sig_coeff_x_suffix; and if reverse_last_sig_coeff_flag is equal to 1, then:

LastSignificantCoeffX=(1<<log 2ZoTbWidth)−1−LastSignificantCoeffX; and a value of the vertical coordinate of the last significant coefficient in the preset scanning order within the current block is derived as follows:
if last_sig_coeff_y_suffix is not present, then:

LastSignificantCoeffY=last_sig_coeff_y_prefix;

if last_sig_coeff_y_suffix is present, then:

LastSignificantCoeffY=(1<<((last_sig_coeff_y_prefix>>1)−1))*(2+(last_sig_coeff_y_prefix&1))+last_sig_coeff_y_suffix; and if reverse_last_sig_coeff_flag is equal to 1, then:

LastSignificantCoeffY=(1<<log 2ZoTbHeight)−1−LastSignificantCoeffY;

wherein LastSignificantCoeffX represents the value of the horizontal coordinate of the last significant coefficient in the preset scanning order within the current block, LastSignificantCoeffY represents the value of the vertical coordinate of the last significant coefficient in the preset scanning order within the current block, last_sig_coeff_x_prefix represents the prefix information of the horizontal coordinate of the last significant coefficient, last_sig_coeff_y_prefix represents the prefix information of the vertical coordinate of the last significant coefficient, last_sig_coeff_x_suffix represents the suffix information of the horizontal coordinate of the last significant coefficient, the last_sig_coeff_y_suffix represents suffix information of the vertical coordinate of the last significant coefficient, and reverse_last_sig_coeff_flag represents the last-significant-coefficient position-reverse flag.

17. A decoder, comprising a processor and a memory storing a computer program which, when executed by the processor, causes the processor to:
parse a bitstream to obtain a sequence level flag;
parse the bitstream to obtain a last-significant-coefficient position-reverse flag when the sequence level flag indicates that a video satisfies a preset condition;
parse the bitstream to obtain prefix information of a horizontal coordinate of a last significant coefficient, prefix information of a vertical coordinate of the last significant coefficient, suffix information of the horizontal coordinate of the last significant coefficient, and suffix information of the vertical coordinate of the last significant coefficient;

determine the horizontal coordinate of the last significant coefficient according to the prefix information of the horizontal coordinate of the last significant coefficient and the suffix information of the horizontal coordinate of the last significant coefficient;

determine the vertical coordinate of the last significant coefficient according to the prefix information of the vertical coordinate of the last significant coefficient and the suffix information of the vertical coordinate of the last significant coefficient; and determine coordinate information of the last significant coefficient according to the horizontal coordinate of the last significant coefficient and the vertical coordinate of the last significant coefficient;

determine a position of the last significant coefficient by calculation with the coordinate information of the last significant coefficient when the last-significant-coefficient position-reverse flag indicates that the position of the last significant coefficient is reversed for a current block; and decode, according to a preset scanning order, all coefficients before the position of the last significant coefficient to determine coefficients of the current block, wherein a value of the horizontal coordinate of the last significant coefficient in the preset scanning order within the current block is derived as follows:

if last_sig_coeff_x_suffix is not present, then:

$\text{LastSignificantCoeff}X = \text{last\_sig\_coeff\_}x\text{\_prefix};$ if last_sig_coeff_x_suffix is present, then:

$\text{LastSignificantCoeff}X = (1 << ((\text{last\_sig\_coeff\_}x\text{\_prefix} >> 1) - 1)) * (2 + (\text{last\_sig\_coeff\_}x\text{\_prefix} \& 1)) + \text{last\_sig\_coeff\_}x\text{\_suffix};$ and if reverse_last_sig_coeff_flag is equal to 1, then:

$\text{LastSignificantCoeff}X = (1 << \log 2\text{ZoTbWidth}) - 1 - \text{LastSignificantCoeff}X;$ and a value of the vertical coordinate of the last significant coefficient in the preset scanning order within the current block is derived as follows:

if last_sig_coeff_y_suffix is not present, then:

$\text{LastSignificantCoeff}Y = \text{last\_sig\_coeff\_}y\text{\_prefix};$ if last_sig_coeff_y_suffix is present, then:

$\text{LastSignificantCoeff}Y = (1 << ((\text{last\_sig\_coeff\_}y\text{\_prefix} >> 1) - 1)) * (2 + (\text{last\_sig\_coeff\_}y\text{\_prefix} \& 1)) + \text{last\_sig\_coeff\_}y\text{\_suffix};$ and if reverse_last_sig_coeff_flag is equal to 1, then:

$\text{LastSignificantCoeff}Y = (1 << \log 2\text{ZoTbHeight}) - 1 - \text{LastSignificantCoeff}Y;$ wherein LastSignificantCoeffX represents the value of the horizontal coordinate of the last significant coefficient in the preset scanning order within the current block, LastSignificantCoeffY represents the value of the vertical coordinate of the last significant coefficient in the preset scanning order within the current block, last_sig_coeff_x_prefix represents the prefix information of the horizontal coordinate of the last significant coefficient, last_sig_coeff_y_prefix represents the prefix information of the vertical coordinate of the last significant coefficient, last_sig_coeff_x_suffix represents the suffix information of the horizontal coordinate of the last significant coefficient, the last_sig_coeff_y_suffix represents suffix information of the vertical coordinate of the last significant coefficient, and reverse_last_sig_coeff_flag represents the last-significant-coefficient position-reverse flag.

\* \* \* \* \*